United States Patent
Shibata et al.

(10) Patent No.: US 9,650,928 B2
(45) Date of Patent: May 16, 2017

(54) HONEYCOMB FILTER

(71) Applicant: IBIDEN CO., LTD., Ogaki-shi (JP)

(72) Inventors: Toshiaki Shibata, Ibi-gun (JP); Yuki Miwa, Ibi-gun (JP)

(73) Assignee: IBIDEN CO., LTD., Ogaki-shi (JP)

( * ) Notice: Subject to any disclaimer, the term of this patent is extended or adjusted under 35 U.S.C. 154(b) by 248 days.

(21) Appl. No.: 14/448,951

(22) Filed: Jul. 31, 2014

(65) Prior Publication Data

US 2015/0033686 A1    Feb. 5, 2015

(30) Foreign Application Priority Data

Jul. 31, 2013   (JP) .................................. 2013-159934

(51) Int. Cl.
*B01D 50/00* (2006.01)
*B01D 39/14* (2006.01)
(Continued)

(52) U.S. Cl.
CPC .......... *F01N 3/0222* (2013.01); *B01D 46/247* (2013.01); *B01D 46/2429* (2013.01);
(Continued)

(58) Field of Classification Search
CPC .............. B01D 53/869; B01D 46/2455; B01D 46/2466; B01D 46/247; B01D 2046/2496;
(Continued)

(56) References Cited

U.S. PATENT DOCUMENTS

| 4,417,908 A | 11/1983 | Pitcher, Jr. |
| 4,420,316 A | 12/1983 | Frost et al. |

(Continued)

FOREIGN PATENT DOCUMENTS

| DE | 102008042372 | 4/2009 |
| EP | 1795262 | 6/2007 |

(Continued)

OTHER PUBLICATIONS

Office Action with Form PTO-892 Notice of References Cited issued by the United States Patent and Trademark Office for the co-pending U.S. Appl. No. 14/448,882, Sep. 21, 2016.

(Continued)

*Primary Examiner* — Amber R Orlando
(74) *Attorney, Agent, or Firm* — Mori & Ward, LLP

(57) ABSTRACT

A honeycomb filter includes a plurality of cells and porous cell walls. The plurality of cells include exhaust gas introduction cells and exhaust gas emission cells. The porous cell walls each have a porosity of 55% or acre but not more than 70%. The porous cell walls include pores with a pore diameter of 40 μm or more. The pores have a pore volume occupying 10% or more of a total pore volume of the porous cell walls. The exhaust gas emission cells have an average cross sectional area larger than an average cross sectional area of the exhaust gas introduction cells in the cross section perpendicular to the longitudinal direction of the plurality of cells. A total volume of the exhaust gas introduction cells is larger than a total volume of the exhaust gas emission cells.

20 Claims, 23 Drawing Sheets

(51) Int. Cl.
*B01D 39/06* (2006.01)
*B01D 39/20* (2006.01)
*F01N 3/022* (2006.01)
*B01D 46/24* (2006.01)
*C04B 38/00* (2006.01)
*C04B 111/00* (2006.01)
*F01N 3/035* (2006.01)

(52) U.S. Cl.
CPC ...... *B01D 46/2474* (2013.01); *C04B 38/0006* (2013.01); *C04B 38/0009* (2013.01); *B01D 2046/2433* (2013.01); *B01D 2046/2437* (2013.01); *B01D 2046/2481* (2013.01); *B01D 2046/2496* (2013.01); *C04B 2111/00793* (2013.01); *F01N 3/035* (2013.01); *F01N 2330/06* (2013.01); *F01N 2330/30* (2013.01); *F01N 2510/00* (2013.01); *Y02T 10/20* (2013.01)

(58) Field of Classification Search
CPC ............... F01N 3/0222; F01N 2330/06; F01N 2330/34; F01N 2340/00
See application file for complete search history.

(56) References Cited

U.S. PATENT DOCUMENTS

| | | | |
|---|---|---|---|
| 4,519,820 A | 5/1985 | Oyobe et al. | |
| 5,962,103 A | 10/1999 | Luthra et al. | |
| 6,395,370 B1 | 5/2002 | Noda et al. | |
| 6,669,751 B1* | 12/2003 | Ohno et al. | B01D 39/2075 55/385.3 |
| 7,208,214 B2 | 4/2007 | Ichikawa | |
| 7,247,184 B2 | 7/2007 | Frost | |
| 7,452,591 B2 | 11/2008 | Tabuchi et al. | |
| 7,556,782 B2 | 7/2009 | Ohno et al. | |
| 7,585,471 B2 | 9/2009 | Oshimi | |
| 7,601,194 B2 | 10/2009 | Beall et al. | |
| 7,892,308 B2 | 2/2011 | Mizutani | |
| 8,062,603 B2 | 11/2011 | Komori et al. | |
| 8,283,019 B2 | 10/2012 | Ohno et al. | |
| 9,080,479 B2 | 7/2015 | Sakashita et al. | |
| 9,080,484 B2 | 7/2015 | Miyairi | |
| 9,289,711 B2 | 3/2016 | Hirakawa et al. | |
| 2003/0021949 A1 | 1/2003 | Tomita et al. | |
| 2003/0041574 A1* | 3/2003 | Noguchi et al. | B01D 39/2068 55/523 |
| 2004/0161373 A1 | 8/2004 | Ichikawa et al. | |
| 2004/0170803 A1 | 9/2004 | Ichikawa | |
| 2004/0261384 A1 | 12/2004 | Merkel et al. | |
| 2005/0016141 A1 | 1/2005 | Hong et al. | |
| 2005/0076627 A1 | 4/2005 | Itou et al. | |
| 2005/0102987 A1 | 5/2005 | Kudo | |
| 2006/0029768 A1 | 2/2006 | Furukawa et al. | |
| 2006/0159602 A1 | 7/2006 | Ohno et al. | |
| 2007/0119135 A1 | 5/2007 | Miao et al. | |
| 2007/0184240 A1 | 8/2007 | Ichikawa | |
| 2007/0231535 A1 | 10/2007 | Mizutani | |
| 2008/0190083 A1 | 8/2008 | Oshimi | |
| 2008/0311340 A1 | 12/2008 | Kasai et al. | |
| 2009/0205301 A1 | 8/2009 | Komori et al. | |
| 2009/0246453 A1 | 10/2009 | Yamaguchi | |
| 2010/0058725 A1 | 3/2010 | Konomi et al. | |
| 2010/0216634 A1 | 8/2010 | Ohno et al. | |
| 2010/0218473 A1 | 9/2010 | Kikuchi et al. | |
| 2010/0300291 A1 | 12/2010 | Vincent et al. | |
| 2011/0085953 A1 | 4/2011 | Ogyu et al. | |
| 2011/0135873 A1 | 6/2011 | Okazaki et al. | |
| 2011/0224069 A1 | 9/2011 | Goto et al. | |
| 2012/0093697 A1 | 4/2012 | Iwakura et al. | |
| 2012/0251402 A1 | 10/2012 | Goto et al. | |
| 2013/0316129 A1 | 11/2013 | Yabuki et al. | |
| 2015/0013284 A1 | 1/2015 | Ota et al. | |
| 2015/0072104 A1* | 3/2015 | Iwasaki et al. | B01D 46/2459 428/117 |

FOREIGN PATENT DOCUMENTS

| | | |
|---|---|---|
| EP | 2011775 | 1/2009 |
| EP | 2 312 133 | 4/2011 |
| EP | 2 335 797 | 6/2011 |
| JP | 2005-324154 | 11/2005 |
| JP | 2009-095827 | 5/2009 |
| JP | 2009-537741 | 10/2009 |
| WO | WO 2004/024294 | 3/2004 |
| WO | WO 2006/035822 | 4/2006 |
| WO | 2007/102561 | 9/2007 |
| WO | 2010-013509 | 2/2010 |
| WO | WO 2011/042992 | 4/2011 |
| WO | WO2013150970 | * 10/2013 |

OTHER PUBLICATIONS

Office Action with Form PTO-892 Notice of References Cited issued by the United States Patent and Trademark Office for the co-pending U.S. Appl. No. 14/449,008, Sep. 22, 2016.

Office Action with Form PTO-892 Notice of References Cited issued by the United States Patent and Trademark Office for the co-pending U.S. Appl. No. 14/449,023, Oct. 18, 2016.

Notice of Allowance issued by the United States Patent and Trademark Office for the co-pending U.S Appl. No. 14/448,989, Sep. 12, 2016.

Office Action with Form PTO-892 Notice of References Cited issued by the United States Patent and Trademark Office for the co-pending U.S. Appl. No. 14/448,989, May 9, 2016.

Office Action issued by the United States Patent and Trademark office for the co-pending U.S. Appl. No. 14/449,023, Feb. 22, 2017.

* cited by examiner

A-A line cross sectional view

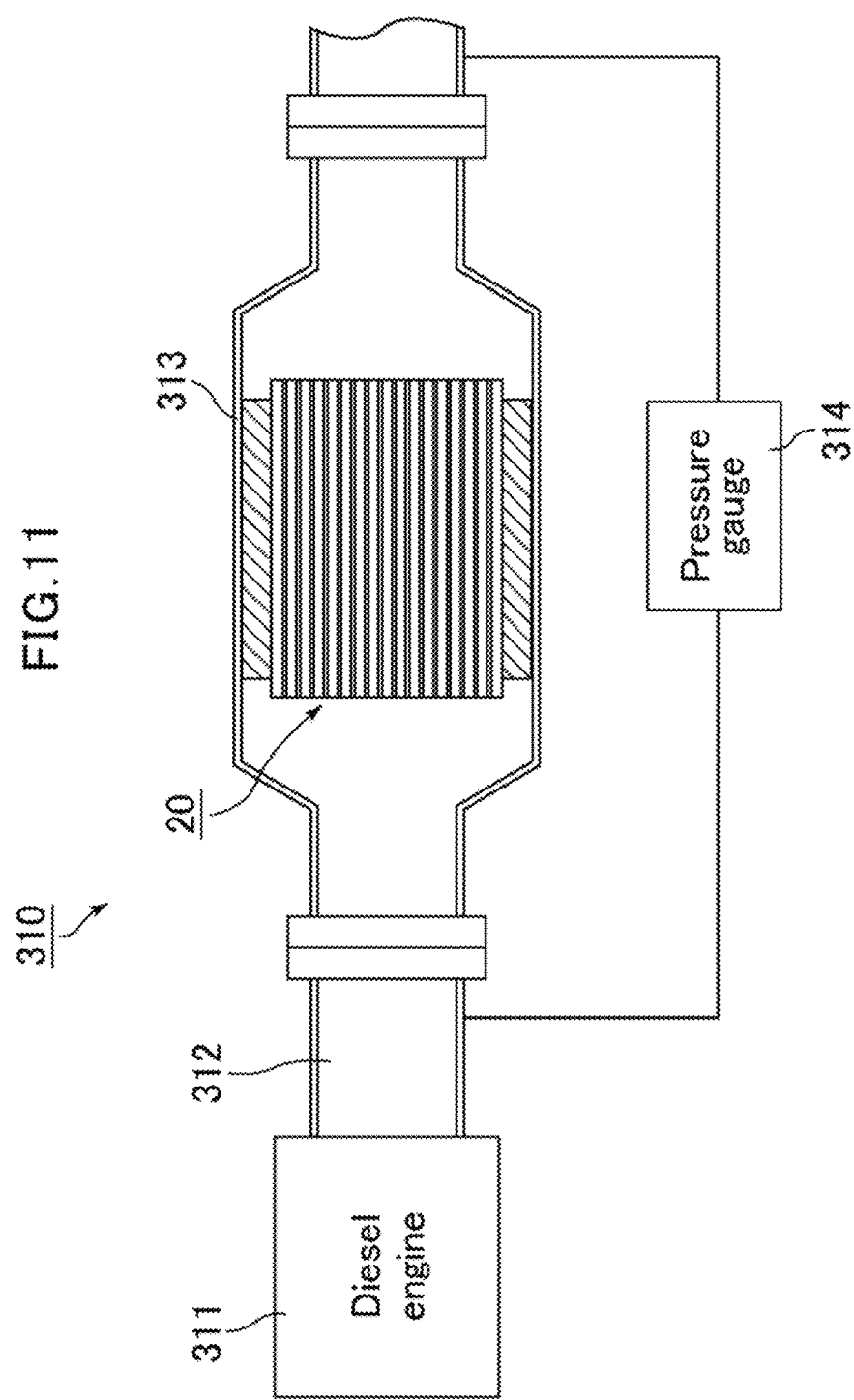

B-B line cross sectional view

FIG.15A
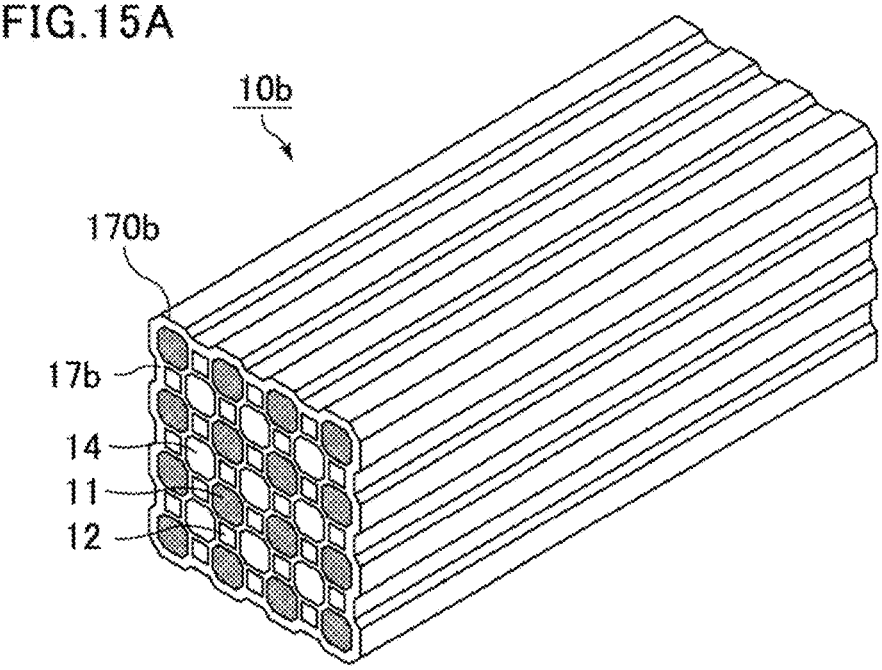
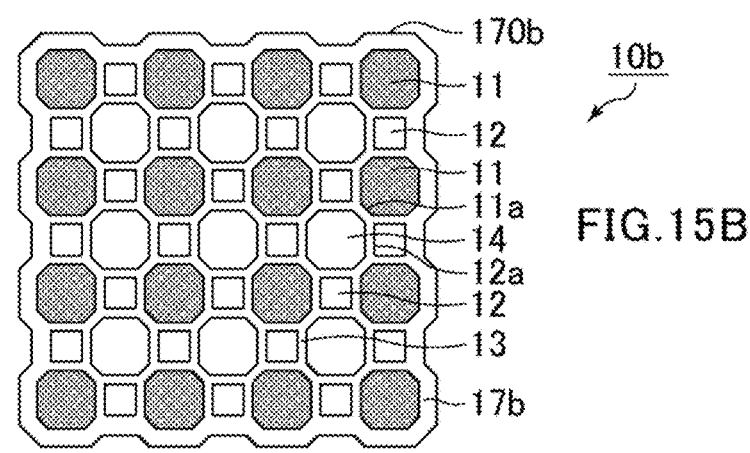
FIG.15B
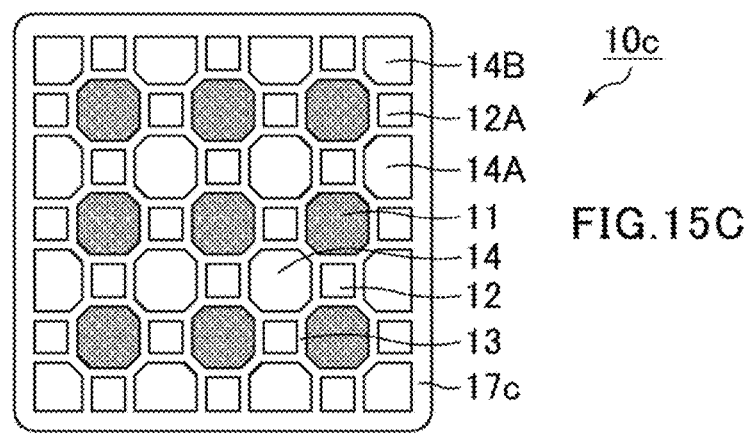
FIG.15C

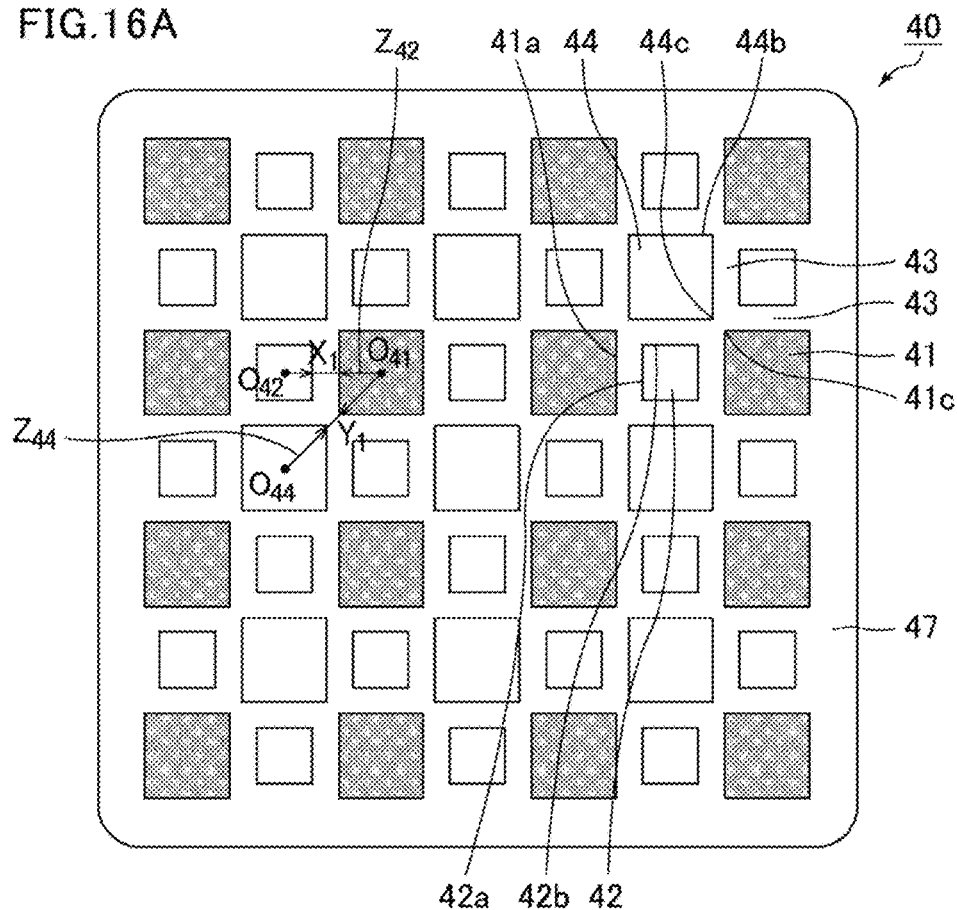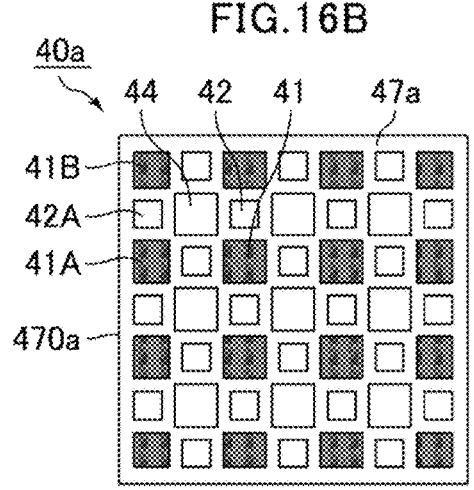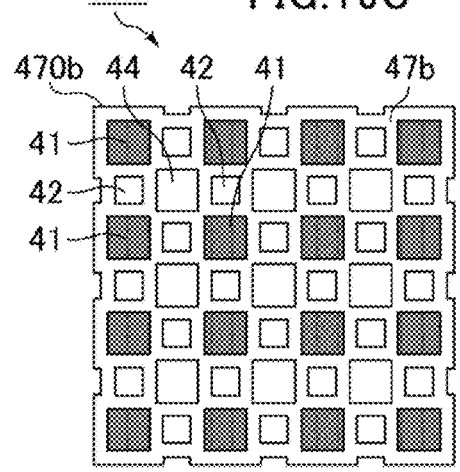

BACKGROUND ART

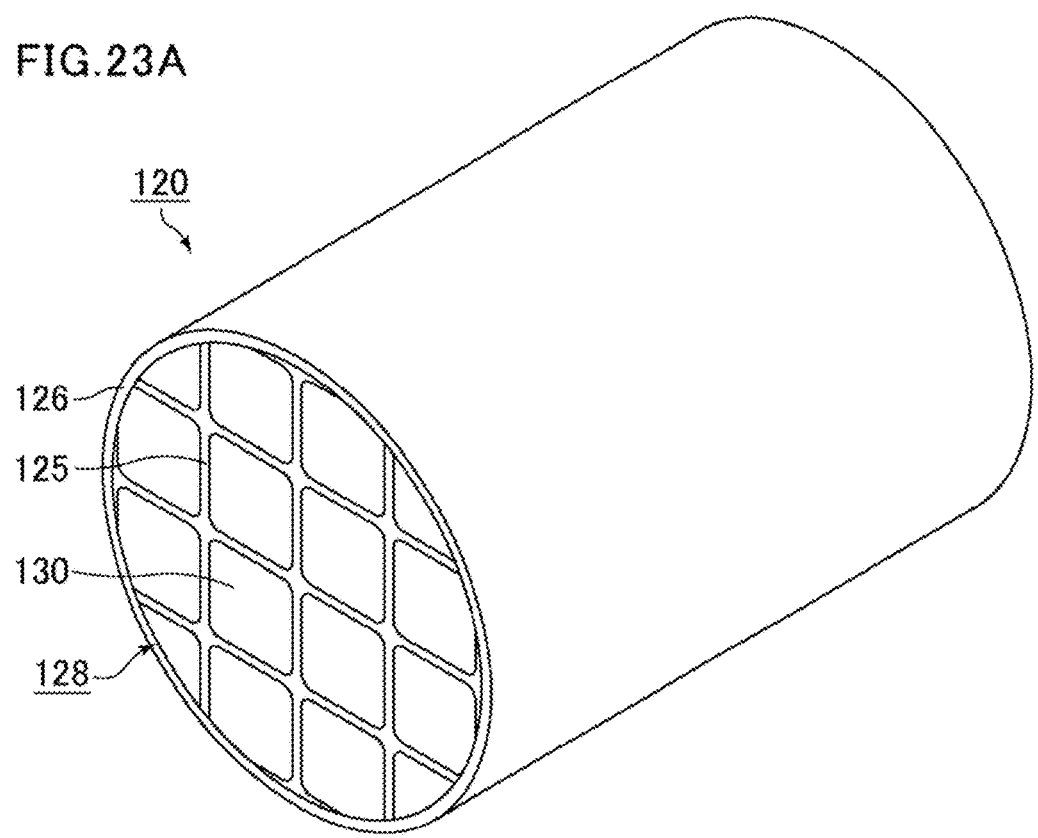
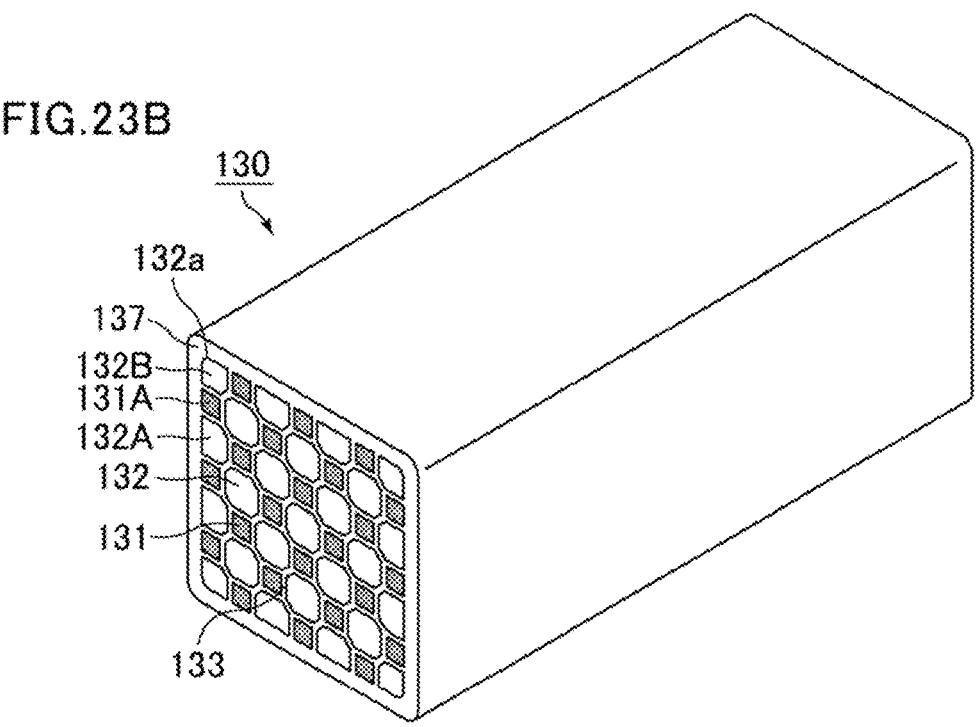

HONEYCOMB FILTER

CROSS-REFERENCE TO RELATED APPLICATIONS

The present application claims priority under 35 U.S.C. §119 to Japanese Patent Application No. 2013-159934, filed Jul. 31, 2013. The contents of this application are incorporated herein by reference in their entirety.

BACKGROUND OF THE INVENTION

Technical Field

The present indention relates to a honeycomb filter.

Background Art

Particulates (hereinafter also referred to as PMs or soot) such as soot in exhaust gas discharged from internal combustion engines including diesel engines cause damage to environment and human bodies, and these days people have paid attention to this problem. Since exhaust gas contains tonic gas components such as CO, HC, and NOx, people also worry about the influences of the toxic gas components on the environment and human bodies.

To overcome this problem, various filters having honeycomb structures (honeycomb filters) formed of porous ceramics such as cordierite and silicon carbide have been proposed as exhaust gas purifying apparatus. Such honeycomb filters are connected to internal combustion engines to capture PMs in exhaust gas, or to convert the toxic gas components such as CO, HC, and NOx in the exhaust gas into nontoxic gas.

For enhancing the fuel economy of internal combustion engines and avoiding troubles derived from an increase in the pressure loss during operation, various honeycomb filters have been proposed including those in which the initial pressure loss is lowered by improvement of the cell structure and those in which the rate of increase in the pressure loss is low when a certain amount of PM is accumulated.

Such filters are disclosed for example in WO 2011/042992, WO 2006/035822, JP-T 2009-537741, WO 2004/024294, and U.S. Pat. No. 4,417,908.

WO 2011/042992 discloses a honeycomb filter coated with zeolite as a catalyst with an aim of capturing PMs and purifying Nox. WO 2006/035822 discloses a honeycomb filter in which the porosity is increased and the pore volume ratio of pores with a pore diameter of 10 μm or less is reduced with an aim of lowering the pressure loss after coating with a catalyst.

JP-T 2009-537741 discloses a honeycomb filter in which six exhaust gas introduction cells having a hexagonal cross sectional shape are arranged to surround an exhaust gas emission cell having a hexagonal cross sectional shape, and each exhaust gas introduction cell has a larger cross sectional area than each of the exhaust gas emission cells.

FIG. 21A is a perspective view schematically illustrating a honeycomb filter disclosed in WO 2004/024294. FIG. 21B is a perspective view schematically illustrating a honeycomb fired body forming the honeycomb filter.

As shown in FIGS. 21A and 21B, WO 2004/024204 discloses a honeycomb filter 90 that includes a plurality of honeycomb fired bodies 100 combined with one another with adhesive layers 105 residing therebetween, and an periphery coat layer 106 formed on the periphery of the combined honeycomb fired bodies, wherein the honeycomb fired bodies 100 each include exhaust gas introduction cells 102 each having an open end at an exhaust gas introduction side and a plugged end at an exhaust gas emission side, and exhaust gas emission cells 101 each having an open end at the exhaust gas emission side and a plugged end at the exhaust gas introduction side; the exhaust gas emission cells 101 each have a square cross section perpendicular to the longitudinal direction of the cells; the exhaust gas introduction cells 102 each have an octagonal cross section perpendicular to the longitudinal direction of the cells; and the exhaust gas emission cells 101 and the exhaust gas introduction cells 102 are alternately (in a grid-like pattern) arranged.

Hereinafter, in the explanation of the embodiments of the present invention and background arts, a cell having an open end at an exhaust gas emission side and a plugged end at an exhaust gas introduction side is simply described as an exhaust gas emission cell. Moreover, a cell having an open end at an exhaust gas introduction side and a plugged end at an exhaust gas emission side is simply described as an exhaust gas introduction cell, a first exhaust gas introduction cell, or a second exhaust gas introduction cell.

The term just described as "cell" means both of the exhaust gas emission cell and exhaust gas introduction cell.

Moreover, a cross section perpendicular to the longitudinal direction of cells including exhaust gas introduction cells, exhaust gas emission cells, or the like is simply described as a cross section of the exhaust gas introduction cells, exhaust gas emission cells, or the like.

FIG. 22A is a perspective view schematically illustrating a honeycomb filter disclosed in U.S. Pat. No. 4,417,908. FIG. 22B is a view schematically illustrating an end face of the honeycomb filter.

U.S. Pat. No. 4,417,908 discloses a honeycomb filter 110 in which all cells have the same square cross-sectional shape as shown in FIGS. 22A and 22B. In the honeycomb filter 110, exhaust gas emission cells 111 each having an open end at an exhaust gas emission side and a plugged end at an exhaust gas introduction side are adjacently surrounded fully by exhaust gas introduction cells 112 and 114 each having an open end at the exhaust gas introduction side and a plugged end at the exhaust gas emission side across cell walls 113. In the cross section, a side of the exhaust gas introduction cell 112 faces the exhaust gas emission cell 111 across the cell wall 113, whereas the corners of the exhaust gas introduction cells 114 respectively face the corners of the exhaust gas emission cells 111. Thus, none of the sides forming the cross sections of the exhaust gas introduction cells 114 faces the exhaust gas emission cells 111.

SUMMARY OF THE INVENTION

According to one aspect of the present invention, a honeycomb filter includes a plurality of cells and porous cell walls. Exhaust gas is to flow through the plurality of cells. The plurality of cells include exhaust gas introduction cells and exhaust gas emission cells. The exhaust gas introduction cells each have an open end at an exhaust gas introduction side and a plugged end at an exhaust gas emission side. The exhaust gas emission cells each have an open end at the exhaust gas emission side and a plugged end at the exhaust gas introduction side. The porous cell walls define rims of the plurality of cells. The porous cell walls each have a porosity of 55% or more but not more than 70%. The porous cell walls include pores with a pore diameter of 40 μm or more. The pores have a pore volume occupying 10% or more of a total pore volume of the porous cell walls. The porous cell walls are free from pores with a pore diameter of 10 μm or less or include pores with the pore diameter of 10 μm or less which have a pore volume occupying 10% or less of the total pore volume. The exhaust gas introduction cells and the exhaust gas emission cells each have a uniform cross sectional shape except for a plugged portion in a cross section perpendicular to a longitudinal direction of the plurality of cells thoroughly from the exhaust gas introduction side to the exhaust gas emission side. The exhaust gas emission cells have an average cross sectional area larger than an average cross sectional area of the exhaust gas introduction cells in the cross section perpendicular to the longitudinal direction of the plurality of cells. A total volume of the exhaust gas introduction cells is larger than a total volume of the exhaust gas emission cells.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 7 illustrates how each cell unit (cell structure) as two-dimensionally, i.e. in X and Y directions, repeated in the case where the second exhaust gas introduction cells and the exhaust gas emission cells are octagonal and the first exhaust gas introduction cells are square in the cross section of the cells, and also illustrates now the first exhaust gas introduction cells and the second exhaust gas introduction cells are shared between the cell units (cell structure).

FIG. 11 is an explanatory diagram schematically illustrating a method for measuring the pressure loss.

FIG. 15A is a perspective view schematically illustrating one modified example of a honeycomb fired body forming the honeycomb fitter according to the third embodiment of the present invention. FIG. 15B is an end face view of the honeycomb fired body forming the honeycomb filter in FIG. 15A. FIG. 15C is an end face view illustrating another modified example of a honeycomb fired body forming the honeycomb filter according to the third embodiment of the present invention.

FIG. 16A is an end face view schematically illustrating one example of the cell arrangement at an end face of a honeycomb fired body forming the honeycomb filter according to a fourth embodiment of the present invention. FIG. 16B is an end face view illustrating one modified example of a honeycomb fired body forming the honeycomb filter according to the fourth embodiment of the present invention. FIG. 16C is an end face view illustrating another modified example of a honeycomb fired body forming the honeycomb filter according to the fourth embodiment of the present invention.

FIG. 17 illustrates how each cell unit (cell structure) is two-dimensionally, i.e. in X and Y directions, repeated in the case where the first exhaust gas introduction cells, the second exhaust gas introduction cells, and the exhaust gas emission cells are square in the cross section of the cells, and also illustrates how the first exhaust gas introduction cells and the second exhaust gas introduction cells are shared between the cell units (cell structure).

FIG. 23A is a perspective view schematically illustrating a honeycomb filter according to comparative examples. FIG. 23B is a perspective view schematically illustrating a honeycomb fired body forming the honeycomb filter shown in FIG. 23A.

DESCRIPTION OP THE EMBODIMENTS

Figure 1:
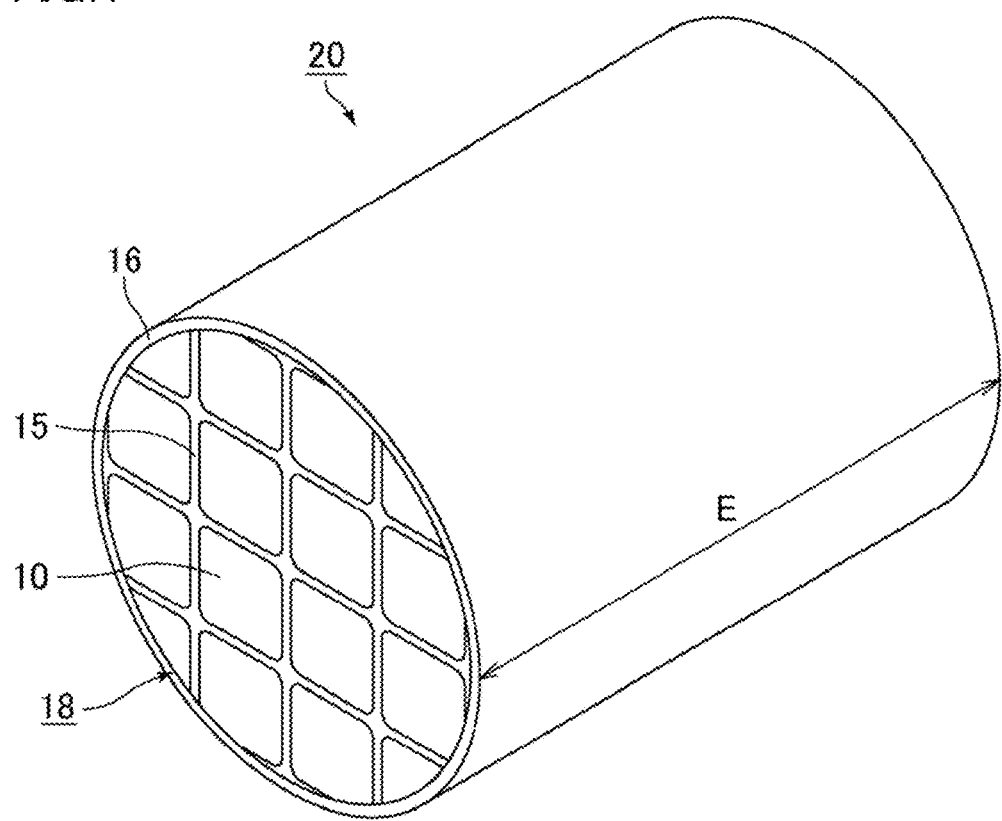
FIG. 1 is a perspective view schematically illustrating one example of a honeycomb filter according to a first embodiment of the present invention.

The embodiments of the present invention provide a honeycomb filter including a plurality of cells for allowing exhaust gas to flow therethrough, the cells including exhaust gas introduction cells and exhaust gas emission cells, and porous cell walls defining rims of the plurality of cells, the exhaust gas introduction cells each having an open end at an exhaust gas introduction side and a plugged end at an exhaust gas emission side, the exhaust gas emission cells each having an open end at the exhaust gas emission side and a plugged end at the exhaust gas introduction side, wherein the cell walls have a porosity of 55% or more but not more than 70%, pores with a pore diameter of 40 μm or more have a pore volume occupying 10% or more of the total pore volume, and pores with a pore diameter of 10 μm or less are not present or, in a case of being present, have a pore volume occupying 10% or less of the total pore volume, the exhaust gas introduction cells and the exhaust, gas emission cells each having a uniform cross sectional shape except for the plugged portion in a direction perpendicular to the longitudinal direction of the cells thoroughly from the end at the exhaust gas introduction, side to the end at the exhaust gas emission side;

the exhaust gas emission cells have an average cross sectioned area larger than the exhaust gas introduction cells in a direction perpendicular to the longitudinal direction of the cells; and the total volume of the exhaust gas introduction cells is larger than the total volume of the exhaust gas emission cells.

In the honeycomb filter of the embodiments of the present invention, cell walls have a porosity of 55% or more, and the pore volume of pores having a size of 40 μm or more occupies 10% or more of the total pore volume. In such a case, the volume of pores is large and the pores are less likely to be clogged by coating with zeolite even if 100 g/L (100 g of zeolite per liter of the apparent volume of the honeycomb filter) or more of zeolite as a SCR catalyst is used in coatings. Here, 100 g/L is an amount needed for purification of NOx. Accordingly, a space through which exhaust gas passes is sufficiently kept, thereby suppressing an increase in the pressure loss upon PM capturing. For achieving sufficient NOx purification performance without increasing the size of the honeycomb filter, zeolite is required to be used in coating in an amount of 100 g/L or more, and preferably 120 g/L or more. The present inventors performed a pretest to confirm the capacity (maximum permissible amount) of the coating in terms of the pressure loss is 100 g/L for a honeycomb filter having a porosity of 55% and 140 g/L for a honeycomb filter having a porosity of 63%.

Additionally, since the porosity is not more than 70%, the mechanical strength can be maintained to prevent occurrence of cracks or the like upon regeneration treatment, In the embodiments of the present invention, the cell nails have a porosity of preferably 55 to 65%, and more preferably 57 to 63%. In the pore diameter distribution in the cell walls, the proportion of pores having a pore diameter of 40 μm or more is preferably 12% or more and the proportion of pores having a pore diameter of 10 μm or less is preferably 8% or less.

In the honeycomb filter of the embodiments of the present invention, since the average cross sectional area of the exhaust gas emission cells is larger than the average cross sectional area of the exhaust gas introduction cells in a direction perpendicular to the longitudinal direction of the cells, exhaust gas having flexed into exhaust gas introduction cells easily pass through the cell walls into the exhaust gas emission cells. Moreover, since the total volume of exhaust gas introduction cells is larger than the total volume of exhaust gas emission cells, the area of inner walls through which exhaust gas can pass increases in the exhaust gas introduction cells. In addition, since the proportion, of pores having a pore diameter of 10 μm or less, through which exhaust gas is less likely to pass, is low, a local increase in the passage rate of exhaust gas passing through the cell walls is avoided. A honeycomb filter having such a structure has a high PM capturing efficiency.

The pore diameter of the cell walls is measured by a mercury injection method under conditions of the contact angle of 130 degrees and the surface tension of 485 mN/m. The porosity is similarly measured by a mercury injection method under the same conditions.

The inventors of the present application see that the pressure loss occurs due to (a) inflow resistance caused by exhaust gas flowing into the honeycomb filter, (b) flow-through resistance in the exhaust gas introduction cells, (c) passage resistance in the cell walls, (d) passage resistance caused by exhaust gas upon passing through a layer of accumulated PMs, (e) flow-through resistance in the exhaust gas emission cells, and (f) outflow resistance caused by exhaust gas flowing out of the honeycomb filter. The inventors of the present application found out that exhaust gas having flowed into exhaust gas introduction cells is likely to flow toward the other end of the exhaust gas introduction cells, and pass through a local part of cell walls comparatively near the other end of the honeycomb filter to flow into exhaust gas emission cells. Especially in the case of the cell walls having a high porosity, this tendency is more significant because passage resistance in the cell, walls of the factor (c) is low. Moreover, the presence of a part with pores having a small pore diameter leads to the presence of a part with high passage resistance in the cell walls of the factor (c), so that the exhaust gas easily flows into exhaust gas emission cells more locally. In the honeycomb filter of the embodiments of the present invention, the above structure aliens the factor (b) the flow-through resistance in each exhaust gas introduction cell to be greater than the factor (e) the flow-through resistance in each exhaust gas emission cell. Further, the outflow resistance caused by exhaust gas flowing out of the honeycomb filter is lowered and the proportion of pores having a pore diameter of 10 μm or less is reduced. In such a case, the exhaust gas having flowed into the exhaust gas introduction cells easily floe into the exhaust gas emission cells, and therefore, the exhaust gas can pass through the entire cell walls from end to end in the longitudinal direction to flow into the exhaust gas emission cells. Accordingly, a local increase in the passage rate of exhaust gas passing through the cell walls is avoided, leading to higher capturing efficiency.

The proportion of pores having a pore diameter of 40 μm or more in she total volume of pores is herein referred to as a proportion of pores having a pore diameter of 40 μm or more. Similarly, the proportion of pores having a pore diameter of 10 μm or less in the total volume of pores is herein referred to as a proportion of pores having a pore diameter of 10 μm or less.

In the honeycomb filter of the embodiments of the present invention, in addition to the above structure, preferably, each exhaust gas emission cell is adjacently surrounded fully by the exhaust gas introduction cells across the porous cell walls, the exhaust gas introduction calls include first exhaust gas introduction cells and second exhaust gas introduction cells each having a larger cross sectional area than each first exhaust gas introduction cell in a direction perpendicular to the longitudinal direction of the cells, each exhaust gas emission cell has an equal or larger cross sectional area than each second exhaust gas introduction cell in a direction perpendicular to the longitudinal direction of the cells, and in the cross section perpendicular to the longitudinal direction of the cells, the exhaust gas introduction cells and the exhaust gas emission cells are each polygonal, and a side forming the cross sectional shape of each first exhaust gas introduction cell faces one of the exhaust gas emission cells, a side forming the cross sectional shape of each second exhaust gas introduction cell faces one of the exhaust gas emission cells, and the side of the first exhaust gas introduction cell is longer than the side of the second exhaust gas introduction cell, or a side forming the cross sectional shape of each first exhaust gas introduction cell faces one of the exhaust gas emission cells, and none of the sides forming the cross sectional shape of each second exhaust gas introduction cell faces the exhaust gas emission cells.

The honeycomb filter having the above configuration may have a smaller initial pressure loss compared to conventional honeycomb filters. Even after accumulation of a large amount of PMs on the cell walls, the pressure loss is less likely to increase. As a result, the pressure loss is improved over the entire period from the initial stage to after accumulation of PMs in close to the limit amount.

In the view of the pressure loss broken down to the resistances of (a) to (f), the study of the inventors has revealed that the factors (c), (e), and (f) are controlling factors of the initial pressure loss that occurs before accumulation of PMs, and that the factors (a), (b), and (d) are controlling factors of the transitional pressure loss that occurs after accumulation of a certain amount of PMs. One of the controlling factors of the initial pressure loss is not the factor (b) flow-through resistance in the exhaust gas introduction cells but the factor (e) flow-through resistance in the exhaust gas emission cells because the aperture ratio of the honeycomb filter based on the exhaust gas emission cells is smaller than the aperture ratio of the honeycomb filter based on the exhaust gas introduction cells. Similarly, the inventors consider the factor (f) outflow resistance caused by exhaust gas flowing out of the honeycomb filter, not the factor (a) inflow resistance caused by exhaust gas flowing into the honeycomb filter, as one of the controlling factors of the initial pressure loss because they suppose that the resistance due to compression of the gas is smaller than the resistance due to disturbance of emission of the exhaust gas caused by eddying flow of the gas that occurs near the emission end when the gas rapidly expands upon emission from the cells.

Since the honeycomb filter of the embodiments of the present invention has the exhaust gas introduction cells arranged to fully surround the exhaust gas emission cells across cell walls, there are no other openings from which exhaust gas can flow cut around each exhaust gas emission cell on the exhaust gas emission side. This structure is less likely to cause large eddying flow upon emission of exhaust gas. This lowers the outflow resistance of the factor (f). Moreover, since the entire area of the cell walls can be used for filtration, PMs are likely to be thinly and uniformly accumulated on the inner walls of the exhaust gas introduction cells, lowering the passage resistance of the factor (d). Thus, in the provided honeycomb filter, the pressure loss is small at the initial stage and is less likely to increase even after accumulation of PMs.

The phrase "cross sectional shape of a cell" herein refers to a shape formed by an inner cell wall of the exhaust gas emission cell, first exhaust gas introduction cell, or second exhaust gas introduction cell in the direction perpendicular to the longitudinal direction of the cell.

The phrase "arose sectional area of a cell" herein refers to an area of a cross sectional shape formed by an inner cell wall of each exhaust gas emission cell, first exhaust gas introduction cell, or second exhaust gas introduction cell is a cross section perpendicular to the longitudinal direction of the cell. The term "inner cell wall" refers to a surface on the inner side of a cell among surfaces of cell walls defining rims of cells.

Moreover, the term "side" herein refers to a segment between vertices of a polygon in the case where cross sectional shapes formed by inner cell walls or the exhaust gas emission cells, the first exhaust gas introduction cells, or the second exhaust gas introduction cells are polygons in a direction perpendicular to the longitudinal direction of the cells.

The phrase "volume of a cell" refers to a volume of a part surrounded by inner walls except for the plugged portion of the cell. The term "total volume" refers to the total sum of the volumes. The volume of the cell is calculated by multiplying the cross sectional area of the cell and the length of the cell excluding the length of the plugged portion.

Furthermore, the term "length of a side" means the length of the segment. In the case of roundly-cornered shapes with the vertex portions formed by curved lines (so-called chamfered shape), the length of a side means the length of a straight line excluding the curved line portions for the following reasons.

In the case where the vertex portions are formed by curved lines, the cell walls separating the cells are thick in the curve portions, and thus the curve portions have high passage resistance. This causes exhaust gas to preferentially flow into straight line portions, and thus the length of the straight portions needs to be controlled. Hence, it is reasonable to exclude the curve portions from consideration.

Provided that the straight portions of a polygon are hypothetically extended, and intersections of the hypothetical straight lines are given as hypothetical vertices, the length of the straight portion of the side excluding the curve portion is preferably not less than 80% the length of a hypothetical side given by connecting the hypothetical vertices. In the case of the cell having a polygonal cross sectional shape in which the sides have not less than 80% the length of the hypothetical sides, a main-channel-switching effect, which is a functional effect of the embodiments of the present invention, can be achieved by adjusting the length of the sides.

In the honeycomb filter according to the embodiments of the present invention, a side forming the cross sectional shape of a first exhaust gas introduction cell or a second exhaust gas introduction cell is considered to face an exhaust gas emission cell when the following condition is satisfied.

Provided that, in the cross section perpendicular to the longitudinal direction of cells, a hypothetical perpendicular line (hereinafter referred to as a perpendicular bisector) which bisects a side of a polygon formed by the inner cell wall of a first exhaust gas introduction cell or a second exhaust gas introduction cell is given from the side to outside the first exhaust gas introduction cell or the second exhaust gas introduction cell, the perpendicular bisector crosses a shape region defined by the inner cell wall of an exhaust gas emission cell which is adjacent to the first exhaust gas introduction cell or a second exhaust gas introduction cell across a cell wall.

In such a case, at first exhaust gnus introduction cell or second exhaust gas introduction, cell having a side facing an exhaust gas emission cell is considered to face the exhaust gas emission cell.

In the honeycomb filter according to the embodiments of the present invention, a side forming the cross sectional shape of an exhaust gas emission cell is considered to face a first exhaust gas introduction cell or a second exhaust gas introduction cell when the following condition is satisfied. Provided that, in the cross section perpendicular to the longitudinal direction of cells, a hypothetical perpendicular line (hereinafter referred to as a perpendicular bisector) which bisects a side of a polygon formed by the inner cell wall of an exhaust gas emission cell is given from the side to outside the exhaust gas emission cell, the perpendicular bisector crosses a shape region defined by the inner cell wall of a first exhaust gas introduction cell or a second exhaust gas introduction cell which is adjacent to the exhaust gas emission cell across a cell wall.

In such a case, an exhaust gas emission cell having a side facing a first exhaust gas introduction cell or a second exhaust gas introduction cell is considered to face the first exhaust gas introduction cell, or the second exhaust gas introduction cell.

Moreover, in the honeycomb filter according to the embodiments of the present invention, a side forming a first exhaust gas introduction cell is considered to face a second exhaust gas introduction cell when the following condition is satisfied. Provided that, in the cross section perpendicular to the longitudinal direction of cells, a hypothetical perpendicular line (hereinafter referred to as a perpendicular bisector) which bisects a side of a polygon formed by the inner cell wall of a first exhaust gas introduction cell is given from the side to outside the first exhaust gas introduction cell, the perpendicular bisector crosses a shape region defined by the inner cell wall of a second exhaust gas introduction cell which is adjacent to the first exhaust gas introduction cell across a cell wall.

In such a case, a first exhaust gas introduction cell having a side facing a second exhaust gas introduction cell is considered to face the second exhaust gas introduction cell.

Furthermore, in the honeycomb filter according to the embodiments of the present invention, a side forming a second exhaust gas introduction cell is considered to face a first exhaust gas introduction cell when the following condition is satisfied. Provided that, in the cross section perpendicular to the longitudinal direction of cells, a hypothetical perpendicular line (hereinafter referred to as a perpendicular bisector) which bisects a side of a polygon formed by the inner cell wall of a second exhaust gas introduction cell is given from the side to outside the second exhaust gas introduction cell, the perpendicular bisector crosses a shape region defined by the inner cell wall of a first exhaust gas introduction cell which is adjacent to the second exhaust gas introduction cell across a cell wall.

In such, a case, the second exhaust gas introduction cell having a side facing a first exhaust gas introduction cell is considered to face the first exhaust gas introduction cell.

In the honeycomb filter of the embodiments of the present invention, the thickness of a cell wall separating two cells is defined as follows.

Namely, in one cross section perpendicular to the longitudinal direction of cells, provided that a hypothetical straight line is given which connects geometric centers of gravity of cross sectional figures defined by the inner cell walls of two cells, the length of a segment of the straight line overlapping the cell wall area is defined as the thickness of the cell wall. Although cells are void, the centers of gravity herein refer to geometric centers of gravity of cross sectional figures defined by inner cell walls. Thus, the center of gravity can be defined even for cross sectional figures of void such as cells.

The word "adjacent" herein is equivalent to the word "adjacent" in Japanese. The word "adjacent" is used not only for a case where exhaust gas introduction cells are arranged to face exhaust gas emission cells across porous cell walls, but also for a case where exhaust gas introduction cells are not facing but arranged diagonally to exhaust gas emission cells across porous cell walls. In Japanese, the expression "Lattices are diagonally adjacent to each other" is accepted as an exemplary expression using "adjacent".

Figure 18:
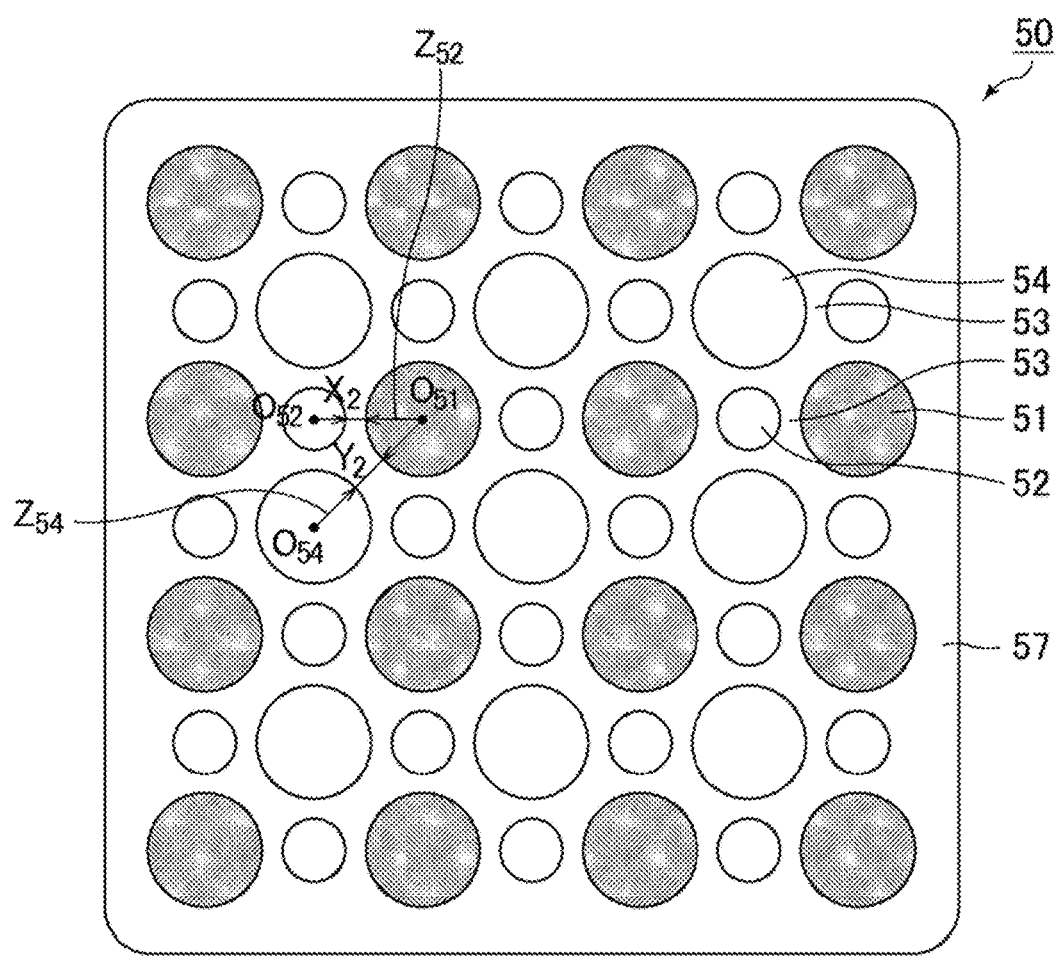
FIG. 18 is an end face view schematically illustrating one example of the cell arrangement in an end face of a honeycomb fired body forming the honeycomb filter according to a fifth embodiment of the present invention.

The case where exhaust gas introduction cells and exhaust gas emission cells each have a polygonal cross sectional shape and are arranged to face each other across porous cell walls is specifically illustrated in FIGS. 2A to 3B. In FIGS. 2A to 3B, second exhaust gas introduction cells 14 face exhaust gas emission cells 11 across porous cell walls 13. In a case where exhaust gas introduction cells and exhaust gas emission cells each have a round or elliptical cross sectional shape and a single porous cell wall is formed by curves of the cross sectional shapes of an exhaust gas introduction cell and an exhaust gas emission cell (a case where a curve of the inner wall of an exhaust gas emission cell and a curve of the inner wall of an exhaust gas introduction cell form the front side and the rear side of a single cell wall in a three-dimensional view), the exhaust gas introduction cell and the exhaust gas emission cell are considered to be arranged to face each other across a porous cell wall according to the case where exhaust gas introduction cells and exhaust gas emission cells each have a polygonal cross sectional shape. Specifically, such a case is illustrated in FIG. 18. In FIG. 18, exhaust gas introduction cells 54 are considered to face exhaust gas emission cells 51 across porous cell walls 53.

The case where exhaust gas introduction cells and exhaust gas emission cells each have a polygonal cross sectional shape and are not arranged to face each other but arranged diagonally across porous cell walls is specifically illustrated in FIGS. 16A to 16C. In FIGS. 16A to 16C, second exhaust gas introduction cells 44 and exhaust gas emission cells 41 do not face each other and are arranged diagonally across porous cell walls 43.

In a case where exhaust gas introduction cells and exhaust gas emission cells each have a shape formed by curved lines, except for a round or elliptical shape, an intersection of two curved lines is considered to be a vertex and a curved line between two vertices is considered to be a side. Here, a side (curved line) of an exhaust gas emission cell or exhaust gas introduction cell is considered to face an exhaust gas introduction cell or exhaust gas emission cell when the following condition is satisfied. Provided that a hypothetical perpendicular line which bisects a segment between vertices at the both ends of a side (curved line) forming the cross sectional shape of an exhaust gas emission cell or an exhaust gas introduction cell (A) is given from the side toward the outside the exhaust gas emission cell or the exhaust gas in trod act ion cell (A), the perpendicular bisector crosses a shape region defined by the inner cell wall of an exhaust gas introduction cell or an exhaust gas emission cell (B) that is closest to the cell (A) across a cell wall. Moreover, the exhaust gas emission cell or the exhaust gas introduction cell (A) is described to face the exhaust gas introduction cell or the exhaust gas emission cell (B). In the case of the vertex portions formed by curved lines (so-called chamfered shape), the carved lines are extended, and the hypothetical intersection of the extended lines is considered to be a vertex.

Figure 19:
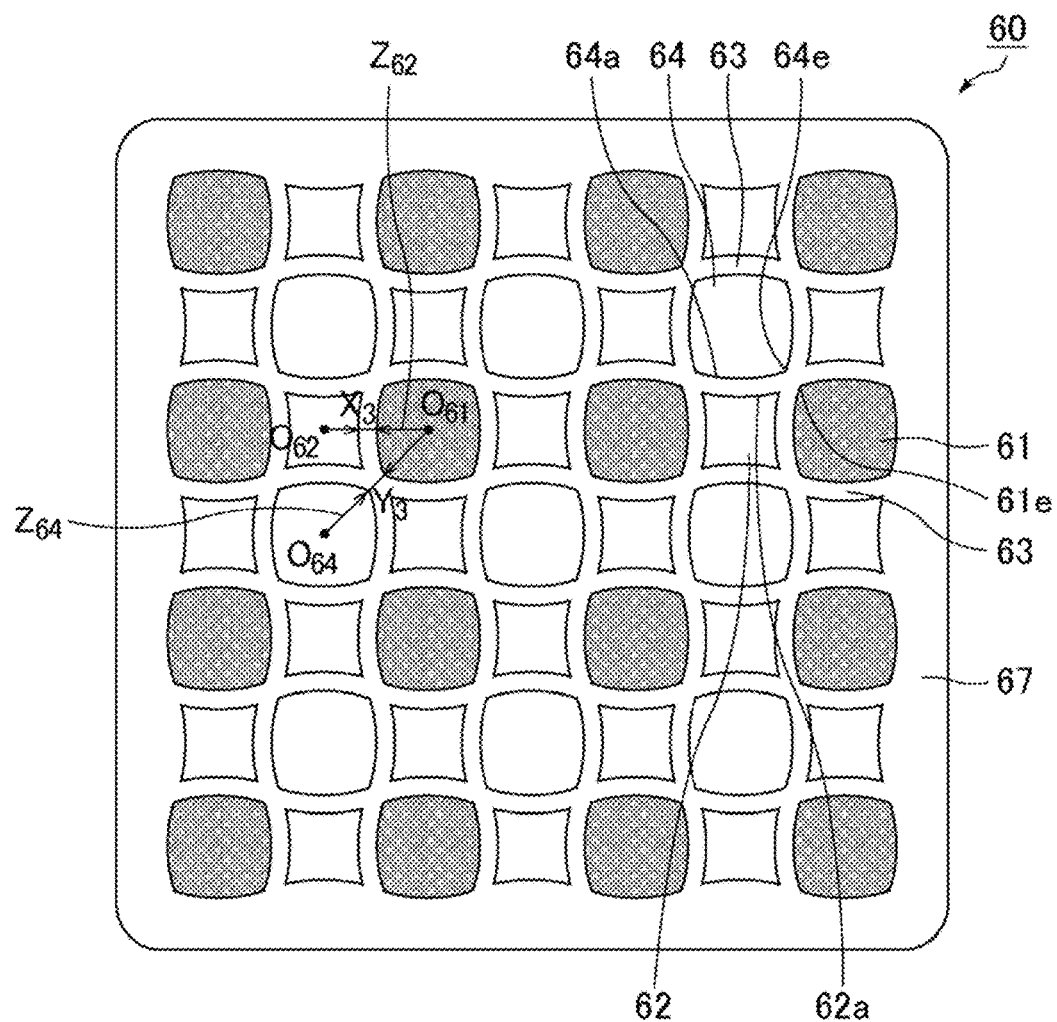
FIG. 19 is an end face view schematically illustrating one example of a honeycomb fired body forming a honeycomb filter according to a sixth embodiment of the present invention.

In a case where exhaust gas introduction cells and exhaust gas emission cells each have a shape formed by curved lines, except for a round or elliptical shape, a case where exhaust gas introduction cells and exhaust gas emission cells do not face each other and arranged diagonally across porous cell walls is specifically illustrated in FIG. 19. In FIG. 19, second exhaust gas introduction cells 64 and exhaust gas emission cells 61 do not face each other and are arranged diagonally across porous cell walls 63.

The sentence "each of the exhaust gas emission cells is adjacently surrounded fully by the exhaust gas introduction cells across the porous cell walls" can encompass "each exhaust gas emission cell is enclosed all around by the adjacent exhaust gas introduction cells across the porous cell walls" in the present application.

Here, the phrase "arranged diagonally" refers to the arrangement in which exhaust gas introduction cells and exhaust gas emission cells do not face each other and satisfy the following condition. In a cross section perpendicular to the longitudinal direction of an exhaust gas emission cell, a hypothetical segment between the geometrical center of gravity and a vertex (in the case of chamfered vertex portions, sides (straight or curved lines) forming the cross sectional figure are hypothetically extended and an intersection of the extended lines is considered to be a vertex) of a cross sectional figure formed by the inner cell wall of the exhaust gas emission cell is provided. In a cross section perpendicular to the longitudinal direction of an exhaust gas introduction cell, a hypothetical segment between the geometrical center of gravity and a vertex (in the case of chamfered vertex portions, sides (straight or curved lines) forming the cross sectional figure are hypothetically extended and an intersection of the extended lines is considered to be a vertex) of a cross sectional figure formed by the inner cell wall of the exhaust gas introduction cell is provided. Here, the provided hypothetical segments are parallel with each other or overlapped with each other. It is to be noted that, if a pair of hypothetical lines among plural hypothetical lines is parallel or overlapped with each other, the other hypothetical lines may be across with each other at a predetermined angle (e.g., 90°).

In the description of the term "adjacent", the term "exhaust gas introduction cell" refers to both the first exhaust gas introduction cell and the second exhaust gas introduction cell.

Next, a side which faces a cell and the thickness of a cell wall separating two cells are explained below based on figures.

Figure 3A:
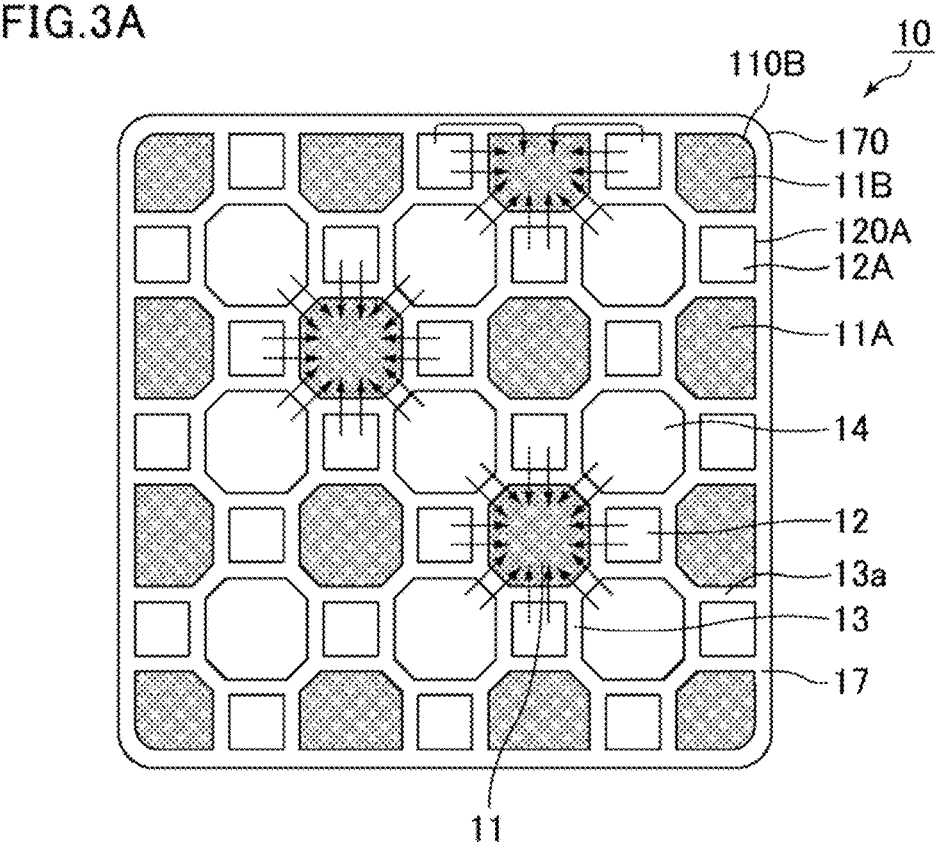
FIG. 3A is an end face view illustrating an end of a honeycomb filter according to one embodiment of the present invention.
Figure 3B:
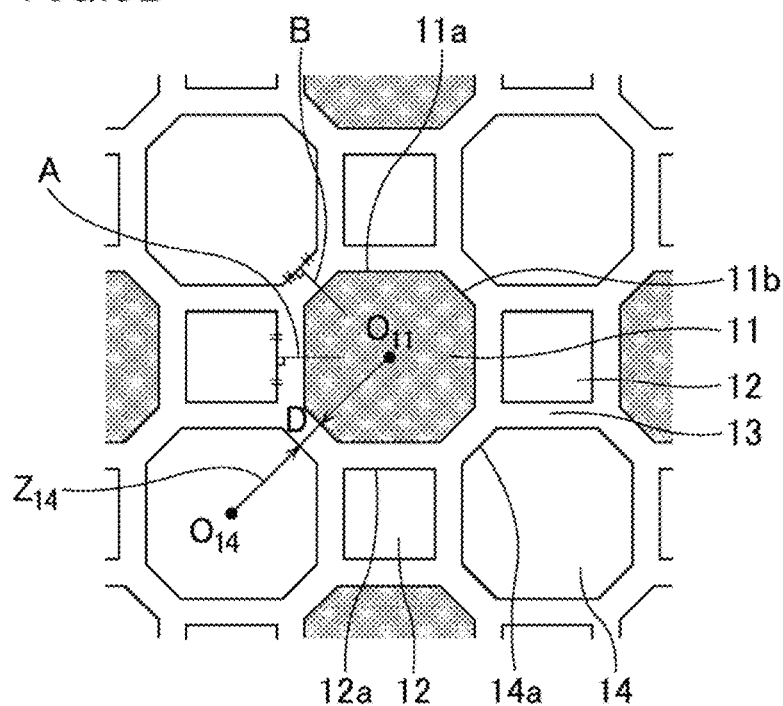
FIG. 3B is an enlarged end face view illustrating an enlarged image of a part of an end face of a honeycomb filter according to one embodiment of the present invention.

FIG. 3B is an enlarged end face view illustrating an enlarged image of a part of an end face of the honeycomb filter according to one embodiment of the present invention. FIG. 3B illustrates exhaust gas emission cells 11, and first exhaust gas introduction cells 12 and second exhaust gas introduction cells 14 surrounding the exhaust gas emission cells 11.

A side forming the cross sectional shape of a first exhaust gas introduction cell 12 or a second exhaust gas introduction cell 14 is considered to face an exhaust gas emission cell 11 when the following condition is satisfied. Provided that, in the cross section perpendicular to the longitudinal direction of the cells shown in FIGS. 3A and 3B, a hypothetical perpendicular line (hereinafter referred to as a perpendicular bisector) which bisects a side 12a of a polygon formed by the inner cell wall of a first exhaust gas introduction cell 12 or a side 14a of a polygon formed by the inner cell wall of a second exhaust gas introduction cell 14 is given from the side to outside the first exhaust gas introduction cell 12 or the second exhaust gas introduction cell 14, the perpendicular bisector A or the perpendicular bisector B crosses a shape region (side 11a, side 11b) defined by the inner cell wall of an exhaust gas emission cell 11 which is adjacent to the side 12a of the first exhaust gas introduction cell 12 or the side 14a of the second exhaust gas introduction cell 14 across a cell wall as shown in FIGS. 3A and 3B.

The reason why the crossing of the bisector is set as a condition for the facing in the embodiments of the present invention is that the passage resistance caused upon allowing exhaust gas to pass through at or around the center of the side in the length direction, i.e. at or around the center of the cell wall separating the exhaust gee introduction cell and the exhaust gas emission cell, represents a pressure loss caused upon allowing exhaust gas to pass through the entire wall.

According to the embodiments of the present invention, in the case where the cross sectional shape defined by the inner cell wall of each exhaust gas emission cell, first exhaust gas introduction cell, or second exhaust gas introduction cell is a polygon, and the vertex portions of the polygon are chamfered, i.e. formed by curved lines in the cross section perpendicular to the longitudinal direction of the cells, the bisectors of respective sides are bisectors of segments excluding the curved lines.

Moreover, in the case where the vertex portions are roundly-cornered, i.e. formed by curved lines, the curved lines are not included in the sides. In the case where the vertex portions are chamfered in the cross sectional shape, the sides forming the cross sectional shape are hypothetically extended, and intersections of the extended sides are considered as hypothetical vertices. Hence, the cross sectional shape is treated as a polygon.

This is based on the following intention. For manufacturing a honeycomb filter including cells having polygonal cross sectional shapes in the cross section perpendicular to the longitudinal direction of the cells by extrusion molding, the vertex portions of the polygonal cross sectional shapes may be formed by curved lines to prevent concentration of stress at the vertex portions. Such cross sections in which the vertex portions are formed by curved lines are considered as polygons.

The thickness of a cell wall separating two cells is defined as follows.

Namely, in the cross section perpendicular to the longitudinal direction of the cells shown in FIGS. 3A and 3B, provided that a hypothetical line $Z_{14}$ is given which connects geometric centers of gravity of the cross sectional figures defined by the inner cell walls of the two cells (the center of gravity of the exhaust gas emission cell 11 is $O_{11}$, and the center of gravity of the second exhaust gas introduction cells is $O_{14}$ in FIG. 3B), the length D of the segment of the line $Z_{14}$ overlapping the cell wall area is defined as the thickness of the cell wall. Although cells are voids, the centers of gravity herein refer to geometric centers of gravity of cross sectional figures defined by inner cell walls. Thus, the center of gravity can be defined, even for cross sectional figures of voids such as cells.

The thickness of the cell wall is defined as above for the following reasons. The passage resistance caused upon allowing gas to pass through the cell walls is the highest at a portion of the cell wall where the gas passes through at the highest flow rate, and the passage resistance at the portion may represent the passage resistance of the cell wall. The flow rate of gas in the longitudinal direction of the honeycomb filter is the highest at positions corresponding to the geometric centers of gravity of the cross sectional shapes defined by the inner cell walls. The flow rate concentrically decreases from the center of gravity toward the circumference of the cross sectional shape of the cells. Thus, the flow rate of gas passing through a cell, well is the highest at an intersection or the cell wall and a line connecting the center of gravity of an exhaust gas introduction cell and the center of gravity of an exhaust gas emission cell. In view of the pressure loss as described above, it is reasonable to define a length D of the segment of a portion where a straight line connecting the centers of gravity overlaps the cell wall area, as the thickness of a cell wall.

According to the embodiments of the present invention, electron microscope pictures are used for measurement of the length of sides and the thickness of cell walls, and identification of the cress sectional shapes of cells. The electron microscope pictures are taken with an electron microscope (FE-SEM: High resolution field emission scanning electron microscope S-4800, manufactured by Hitachi High-Technologies Corporation).

The electron microscope pictures are preferably those taken by the electron microscope at a magnification of 30×. This is because, at a magnification of 30×, irregularities due to particles or pores on the surface (inner wall) of cell walls defining the rims of cells do not disturb identification of the cross sectional shapes of the cells, measurement of the lengths of sides, thicknesses of cell walls, and cross sectional area of the cells. Also, at a magnification of 30×, the cross sectional shapes of the cells can be identified, and the lengths of sides, thicknesses of cell walls, and cross sectional area of the cells can be measured.

In other words, the lengths of the respective sides of the cell are measured us rug the scale of the electron microscope photographs based on the above definitions of the length of the cells and the thickness of the cell walls. The cross sectional area is arithmetically determined based on the obtained values including the length of the cells. If arithmetic calculation of the cross sectional area is complicated, the cross sectional area can also be determined by cutting a square piece (a square with a side having a scale length) corresponding to a unit area out of the electron microscope photograph, and weighing the cut-out piece, while separately cutting the cross section of the cell out along the cross sectional shape of the cell (along curved lines in the case of a polygonal cross section rich the vertex portions formed by curved lines), and weighing the cut-out piece, and then calculating the cross sectional area of the cell based on the weight ratio.

Figure 4A:
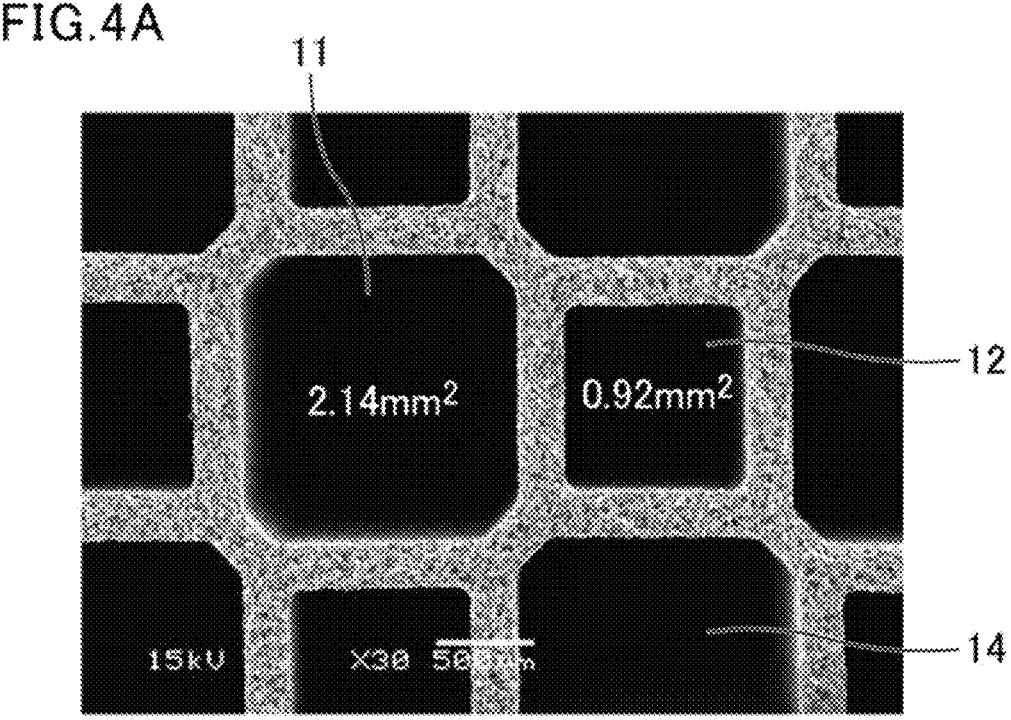
FIGS. 4A and 4B are each a scanning electron microscope photograph (SEM photograph) stoning one example of the cross sections of cells.

For example, in FIG. 4A, the cross sectional shapes defined by the inner walls of the exhaust gas emission cells and the second exhaust gas introduction cells are octagons having the same cross sectional area from one another, and the cross sectional shapes defined by the respective inner walls of the first exhaust gas introduction cells are square (although the vertex portions hare so-called roundly-cornered shape (i.e. formed by curved lines), the cross sectional shapes are each considered as a square having four sides and four vertices at four intersections of straight lines extended from the four sides forming the cross sectional shape in the embodiments of the present invention). In the photograph, a 500 μm scale is displayed. A square (corresponding to a unit area) having each side in a length corresponding to 500 μm in the photograph is cut out of the photograph, and the cut-out piece is weighed. Next, the octagon and the square are cut out of the photograph (the four vertex portions formed by curved lines in the square are cut along the curved lines), and the cut-out pieces are weighed. The cross sectional area is calculated based on the weight ratio between the cut-out piece and the 500 μm scale square. In the case of measuring only the cross sectional area ratio of the cells, the area ratio can be obtained directly from the weight ratio between the octagon and the square.

According to the embodiments of the present invention, the measurement of the lengths of the cells, the thicknesses of the cell walls, and the cross sectional areas can be changed from the above manual measurement to an electronic measurement by scanning the electron microscope photograph as image data, or using the image data directly output from the electron microscope and entering the scale of the photograph. The manual measurement and the electronic measurement are both based on the scale of the electron microscope image, and are an accordance with the same principle. Thus, surely no discrepancies are found between the measurement results of the respective measurements.

For example, the electronic measurement may be performed by using an image analysis and grain size distribution measurement software (Mac-View (Version 3.5), produced by Mountech Co. Ltd.). This software measures a cross sectional area by scanning an electron microscope photograph as image data, or using the image data directly output from the electron microscope, entering the scale of the photograph, and specifying the area along the inner wall of the cell. Moreover, the distance between any two points in the image can be measured based on the scale of the electron microscope photograph.

A photograph of the cross section of the cells is taken with the electron microscope by cutting a filter in a direction perpendicular to the longitudinal direction of the cells to prepare a 1 cm×1 cm×1 cm sample including the cut face and ultrasonic cleaning the out section of the sample, or coating a filter with resin and cutting the coated filter in a direction perpendicular to the longitudinal direction of the cells, and then taking an electron microscope photograph of the sample. The resin coating does not affect measurement of the lengths of the sides of the cells and the thicknesses of the cell walls.

Figure 4B:
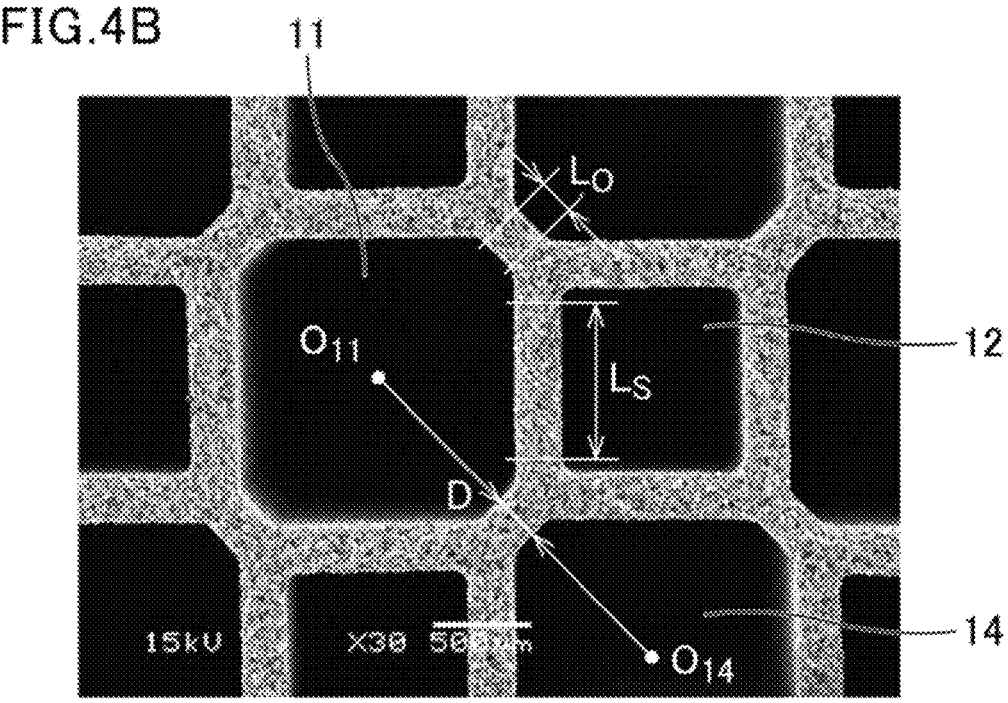

FIGS. 4A and 4B are each a photograph showing one example of the shape of the cross section of cells taken with a scanning electron microscope.

FIG. 4A reveals that the cross sectional shapes of the exhaust gas emission cells 11 and the second exhaust gas introduction cells 14 are each octagonal. The cross sectional shape of the first exhaust gas introduction cells 12 is square. The vertex portions of each first exhaust gas introduction cell 12 are formed by slightly cursed lines; however, extension of the four sides, which are straight lines, of the first exhaust gas introduction cell 12 intersect at four intersections to form a square having the intersections as vertices.

Thus, the cross section of the cell is considered square according to the definition of the embodiments of the present invention.

Moreover, calculation with MAC-View (Version3.5) reveals that the area of the cross sectional shape (cross sectioned, area) of the exhaust gas emission cell 11 and the second exhaust gas introduction cell 14 is 2.14 mm$^2$, and the area of the cross sectional shape (cross sectional area) of the first exhaust gas introduction cell 12 is 0.92 mm$^2$.

Furthermore, as shown in FIG. 4B, since the four vertex portions of the first exhaust gas introduction cell 12 are formed by curved lines, the length of a side Ls facing the exhaust gas emission cell 11 among the sides forming the cross sectional shape of the first exhaust gas introduction cell 12 is the length excluding the cursed portions. Additionally, the length Lo of a side facing the exhaust gas emission cell among the sides forming the cross sectional shape of the second exhaust gas introduction cell 14 corresponds to the distance between the vertices of the octagon.

As described above, the lengths of the sides Ls and Lo, and the cross sectional area can be measured using the electron microscope photograph.

Figure 5A:
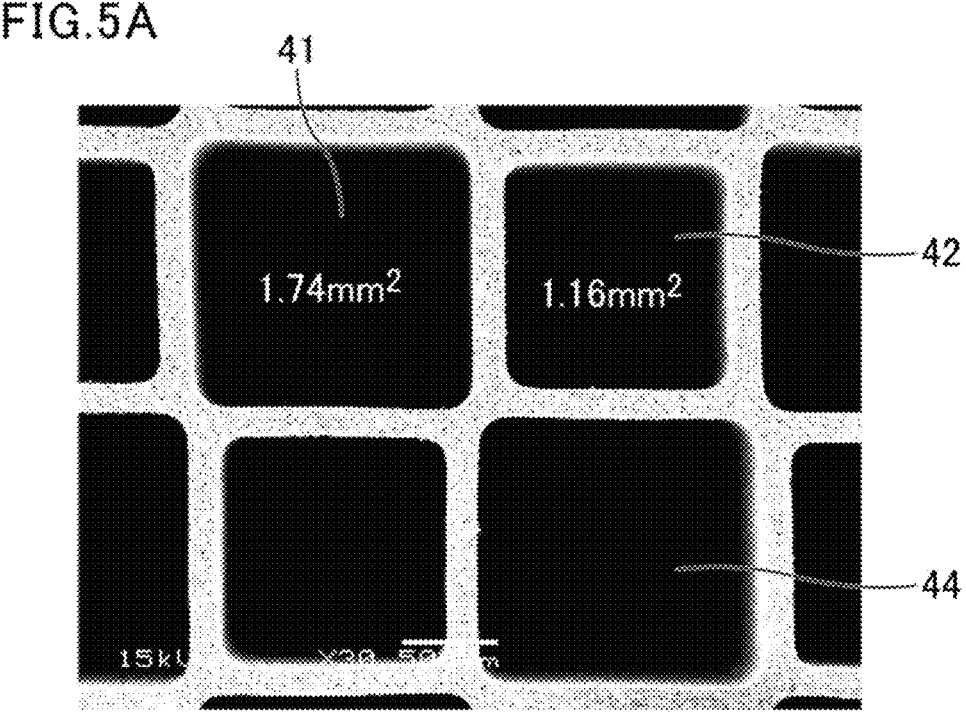
FIGS. 5A and 5B are each a scanning electron microscope photograph (SEM photograph) stoning one example of the cross sectional shapes of cells that are different from the cells shown in FIGS. 4A and 4B.
Figure 5B:
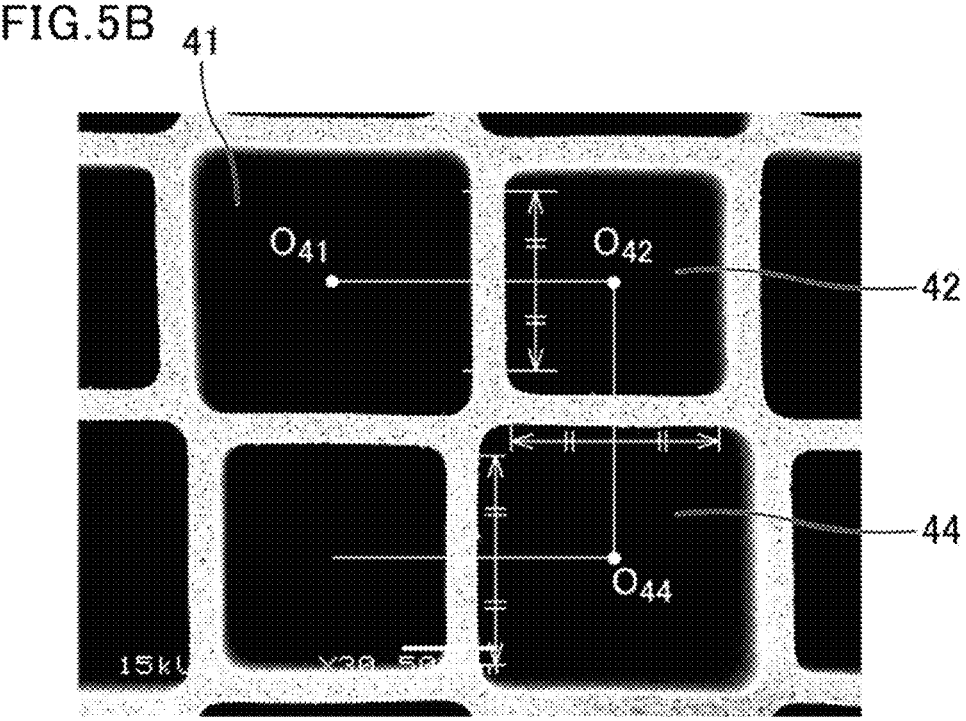

FIGS. 5A and 5B are each a scanning electron microscope photograph (SEM photograph) showing one example of the cross sectional shapes of cells that are different from the cells shown in FIGS. 4A and 4B.

FIG. 5A shows that the cross sectional, areas of the respective exhaust gas emission cell 41, the second exhaust gas introduction cell 44, and the first exhaust gas introduction cells 42 are each in a shape in which straight lines hypothetically extended from the four sides having equal length perpendicularly intersect one another at intersections (vertices), and the vertex portions are formed by curved lines. Although the vertex portions of the cross sectional shape of the cell are formed by cursed lines, lines extended, from the four straight lines forming each cell intersect at four intersections. Supposing that the intersections are hypothetical vertices, the four distances between the vertices are the same from one another to form a square. Thus, the cross sectional shapes of the respective cells are considered square according to the definition of the embodiments of the present invention.

Moreover, as is understood from FIG. 5B, a perpendicular bisector of a side forming the first exhaust gas introduction cell 42 crosses the exhaust gas emission cell 41. Thus, the side forming the first exhaust gas introduction cell 42 faces the exhaust gas emission cell 41. In contrast, a perpendicular bisector of a side forming the second exhaust gas introduction cell 44 does not intersect with the exhaust gas emission cell 41. Thus, the side forming the second exhaust gas introduction cell 44 does not face the exhaust gas emission cell 41. As described above, whether a side forming the second exhaust gas introduction cell 44 or the first exhaust gas introduction cell 42 faces the exhaust gas emission cell 41 can be determined from the electron microscope photograph.

A convex square according to the embodiments of the present invention is a shape formed by four outwardly curved lines of the same length. The square looks as if its sides bulge from the geometric center of gravity to the outside. A concave square is a shape formed by four inwardly curved lines of the same length. The square looks as if its sides concave toward the geometric center of gravity.

In the cross section perpendicular to the longitudinal direction of the cells forming the honeycomb filter according to the embodiments of the present invention, the first exhaust gas introduction cells, the second exhaust gas introduction cells, and the exhaust gas emission cells each have a uniform cross sectional shape thoroughly from the exhaust gas introduction end to the exhaust gas emission end except for the plugged portion. Namely, taking the first exhaust gas introduction cell as an example, in a cross sectional view perpendicular to the longitudinal direction, the cross sectional shape defined by the inner wall thereof has the same shape at any part from the exhaust gas introduction end to the exhaust gas emission end except for the plugged portion. The same shape means a congruent shape, and excludes similar shapes. Namely, a similar shape means a different shape. The explanation for the first exhaust gas introduction cell also applies to the second exhaust gas introduction cell and the exhaust gas emission cell. The plugged portions are excluded because the cross sectional shape defined by the inner cell wall does not physically exist at the plugged portions due to the presence of the plugs.

The honeycomb filter of the embodiments of the present invention can comprehensively reduce the pressure loss thoroughly from the initial stage to the stage after accumulation of PMs in close to the limit amount, as compared to conventional honeycomb filters.

In consideration of the above-described pressure loss broken down to respective resistance components, the flow-through resistance and the outflow resistance need to be reduced for reducing the initial pressure loss. Thus, the cross sectional area of the exhaust gas emission cells needs to be equal to or relatively larger than the cross sectional area of the exhaust gas introduction cells for suppressing the rapid expansion. Wide and thin accumulation of PMs is necessary for reducing the transitional pressure loss. Thus, the cross sectional area of the exhaust gas introduction cells needs to be relatively larger than the cross sectional area of the exhaust gas emission cells.

It has been considered impossible to reduce both of the transitional pressure loss and the initial pressure loss. The inventors of the present invention further studied and completed the present invention described below.

That is, exhaust gas is preferentially introduced firstly into the first exhaust gas introduction cells when the honeycomb filter has the following structures: two kinds of the exhaust gas introduction cells including the exhaust gees introduction cells each having a larger cross sectional area (second exhaust gas introduction cells) and the exhaust gas introduction cells each having a smaller cross sectional area (first exhaust gas introduction cells) are employed as the exhaust gas introduction cells; each exhaust gas emission cell has an equal or larger cross sectional area than each second exhaust gas introduction cell; each exhaust gas emission cell is fully surrounded by the two kinds of the exhaust gas introduction cells; and the length of the inner wall separating the first exhaust gas introduction cell and the exhaust gas emission cell is relatively longer than the length of the inner wall separating the second exhaust gas introduction cell and the exhaust gas emission cell, or the thickness of the wall separating the first exhaust gas introduction cell and the exhaust gas emission cell is relatively smaller than the thickness of the wall separating the second exhaust gas introduction cell and the exhaust gas emission cell.

The wall separating the first exhaust gas introduction cell and the exhaust gas emission cell has a larger passage area (in the case of polygonal cells, sides are long in the cross sectional shape) or the thickness of the wall is smaller. Exhaust gas can thus pass through such an advantageous wall so that the passage resistance of the factor (c) can be reduced. Also, the flow-through resistance of the factor (e) can be reduced as the cross sectional area of the exhaust gas emission cells is relatively larger than the cross sectional area of the first exhaust gas introduction cells. Namely, both of the passage resistance of the factor (c) and the flow-through resistance of the factor (e) can be reduced, and thereby the initial pressure less can be reduced. After accumulation of a certain amount of PMs, since the cross sectional area of the first exhaust gas introduction cells is smaller than the cross sectional area of the second exhaust gas introduction cells, an increase in the passage resistance occurs earlier in a layer of the accumulated PMs in the first exhaust gas introduction cells. This leads to "switching" of the main flow channel of exhaust gas in a manner that a larger amount of the exhaust gas is naturally (i.e. autonomously) introduced to the second exhaust gas introduction cells. Consequently, PMs are widely and thinly accumulated in the second exhaust gas introduction cells each having a large cross sectional area. Hence, both of the flow-through resistance of the factor (b) and the passage resistance of the factor (d) can be reduced so that the transitional pressure loss can be reduced even after accumulation of PMs.

As described above, the embodiments of the present invention has achieved a surprising effect, which has been considered impossible, of reducing both of the transitional pressure loss and the initial pressure loss by the autonomous switching of the main flow channel.

The aforementioned effect of reducing both of the initial pressure loss and the transitional pressure loss by "switching" of the main flow channel to which a larger amount of exhaust gas is introduced is exerted only when all the aforementioned features work integrally. Such structures or effects are not disclosed in any publicly known document.

Figure 21A:
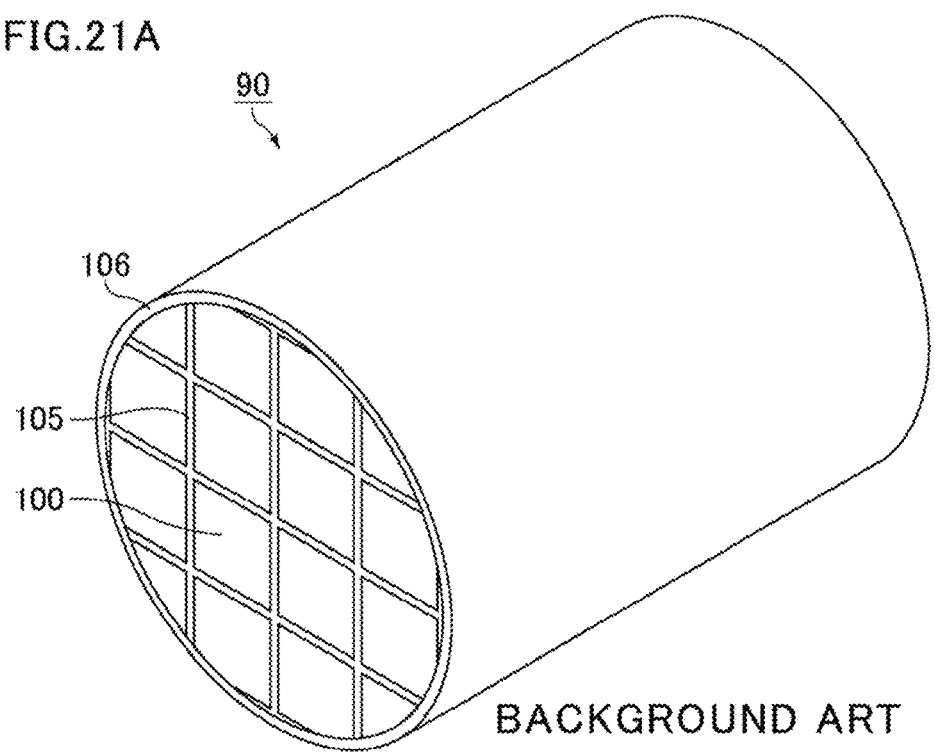
FIG. 21A is a perspective view schematically illustrating a honeycomb filter disclosed in WO 2004/024294.
Figure 21B:
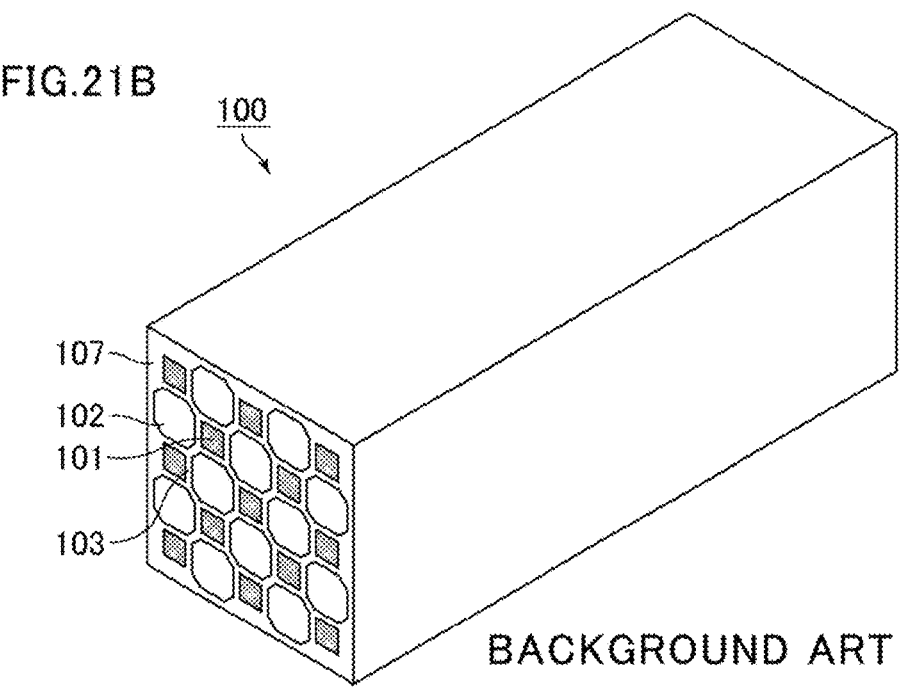
FIG. 21B is a perspective view schematically illustrating a honeycomb fired body forming the honeycomb filter.

The aforementioned international application: WO 2004/024294 discloses a honeycomb filter including exhaust gas introduction cells 102 each having an octagonal cross sectional shape and exhaust gas emission cells 101 each having a rectangular cross sectional shape as shown in FIG. 21B. WO 2004/024294 discloses that an increase in the cross sectional area of the exhaust gas introduction cells 102 enables wide and thin accumulation of PMs, and thus the transitional pressure loss can be reduced. However, for achieving the present invention in view of WO 2004/024294, some of the exhaust gas emission cells 101 each having a smaller cross sectional area need to be changed to the exhaust gas introduction cells 102, and some of the exhaust gas introduction cells 102 each having a larger cross sectional area need to be changed to the exhaust gas emission cells 101. Such changes deny the inventive concept of the invention of WO 2004/024294.

Figure 22A:
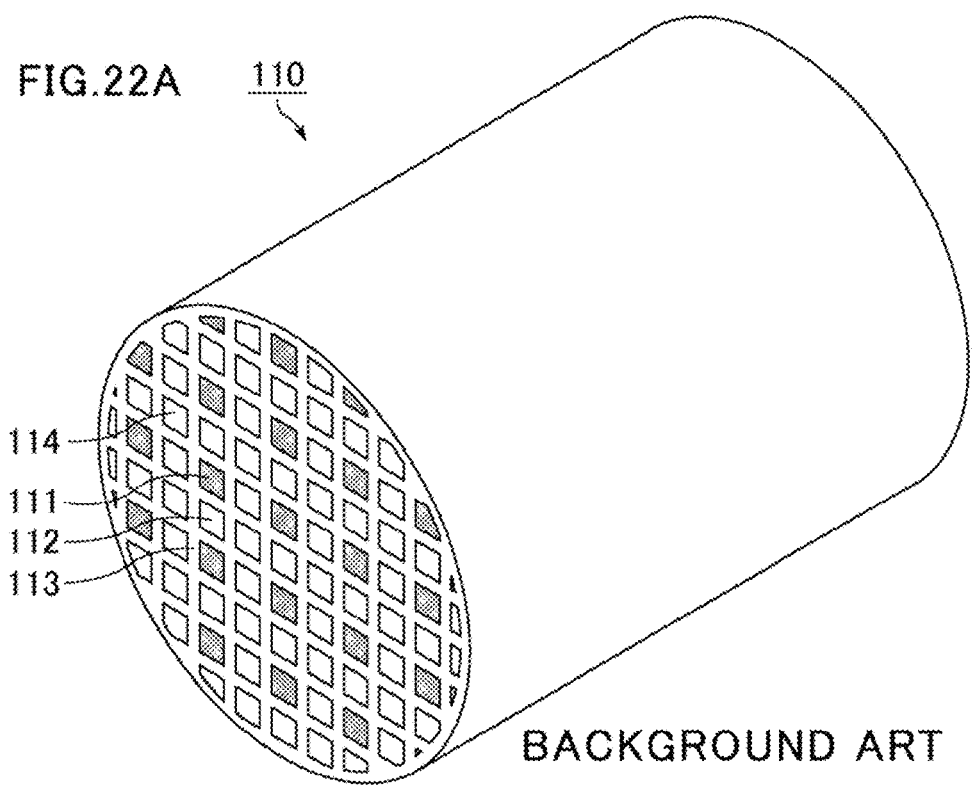
FIG. 22A is a perspective view schematically illustrating a honeycomb filter disclosed in U.S. Pat. No. 4,417,908.
Figure 22B:
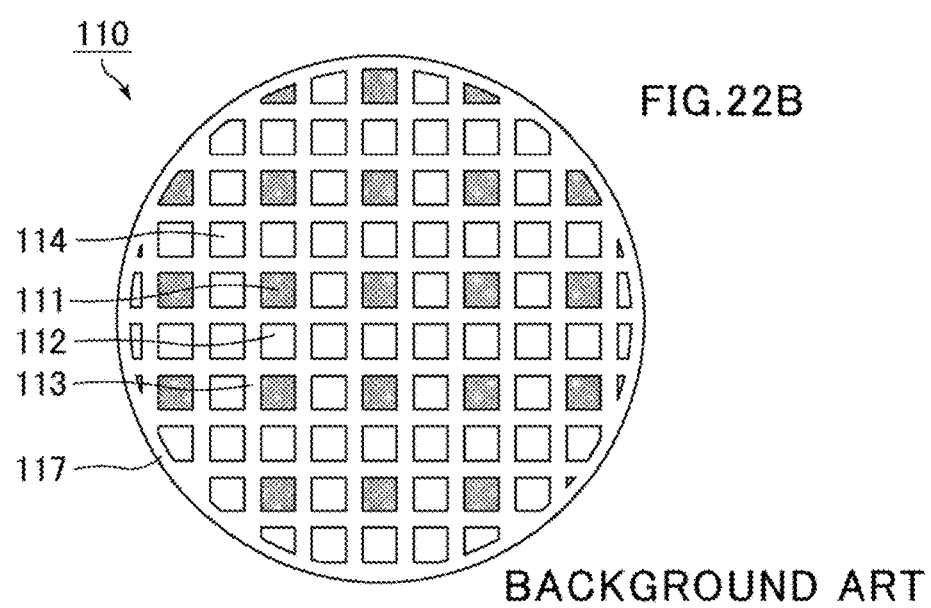
FIG. 22B is an end face view schematically illustrating an end face of the honeycomb filter.

Also, as explained earlier based on FIGS. 22A and 22B, U.S. Pat. No. 4,417,908 discloses a honeycomb filter which can reduce the transitional pressure loss by increasing the number of exhaust gas introduction cells having the same cross sectional area to increase the total area of the exhaust gas introduction cells so that PMs are allowed to widely and thinly accumulate.

However, for achieving the present invention in view of U.S. Pat. No. 4,417,908, some of the exhaust gas introduction cells need to be changed to cells having a smaller cross sectional area. Such a change reduces the cross sectional area of the exhaust gas introduction cells, and thus denies the inventive concept of U.S. Pat. No. 4,417,908.

The following will explain the details of the effects of the embodiments of the present invention by exemplifying an embodiment.

Figure 6A:
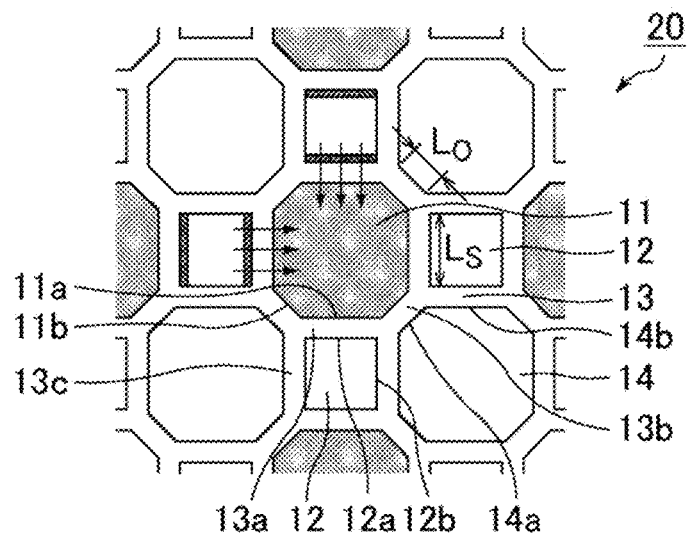
FIGS. 6A to 6C are each an enlarged end face view illustrating an enlarged image of a part of an end face of a honeycomb filter according to one embodiment of the present invention.
Figure 6B:
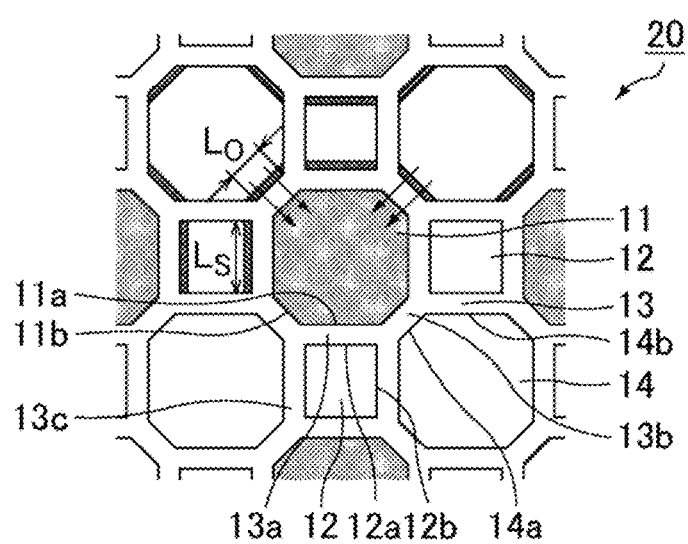
Figure 6C:
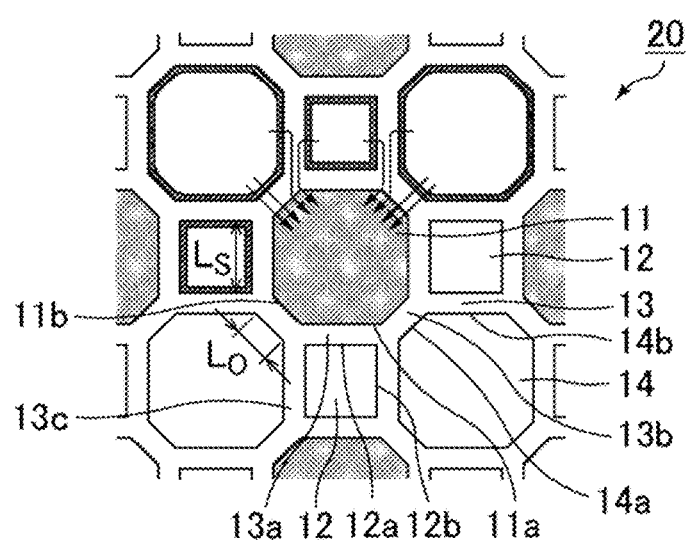

FIGS. 6A to 6C are each an enlarged end face view illustrating an enlarged image of a part of an end face of the honeycomb filter according to one embodiment of the present invention.

As shown in FIG. 6A, in a honeycomb filter 20, each exhaust gas emission cell 11 having an open end at an exhaust gas emission side and a plugged end at an exhaust gas introduction side is adjacently surrounded fully by first exhaust gas introduction cells 12 and second exhaust gas introduction cells 14 each having an open end at the exhaust gas introduction side and a plugged end at the exhaust gas emission side across porous cell walls 13.

In the cross section perpendicular to the longitudinal direction of the cells, the exhaust gas emission cell 11 has an octagonal cross section that is the same as or similar to that of the exhaust gas introduction cell 102 shown in FIG. 21B, the first exhaust gas introduction cell 12 has a square cross section, and the second exhaust gas introduction cell 14 has an octagonal cross section that is the same as that of the exhaust gas emission cell 11. The second exhaust gas introduction cell 14 has a larger cress sectional area than the first exhaust gas introduction cell 12, and the cross sectional area is the same as the exhaust gas emission cell 11. That is, the second exhaust gas introduction cell 14 has the same cross sectional area as the exhaust gas emission cell 11, and the exhaust gas emission cell 11 has a larger cross sectional area than the first exhaust gas introduction cell 12. Thus, the resistance caused by flowing of exhaust gas through the exhaust, gas emission cells 11 and the resistance caused by outflow of exhaust gas to outside the filter are reduced to low levels, and thereby the pressure loss can be reduced to a low level.

Moreover, a side 12a facing the exhaust gas emission cell 11 among the sides forming the cross sectional shape of the first exhaust gas introduction cell 12 is longer than a side 14a facing the exhaust gas emission cell 11 among the sides forming the cross sectional shape of the second exhaust gas introduction cell 14.

Exhaust gas flowing toward the honeycomb filter 20 flows into the first exhaust gas introduction cells 12 each having an open end at the exhaust gas introduction side and the second exhaust gas introduction cells 14 each having an open end at the exhaust gas introduction side. The exhaust gas flows in the filter in order from a part allowing easier flow and then evenly flows in the entire filter. In the honeycomb filter according to the embodiments of the present invention, the length (Ls) of the side 12a of the first exhaust gas introduction cell 12 is larger than the length (Lo) of the side 14a of the second exhaust gas introduction cell 14. Thus, the surface area of a cell wall 13a separating the exhaust gas emission cell 11 and the first exhaust gas introduction cell 12 is larger than the surface area of a cell wall 13b separating the exhaust gas emission cell 11 and the second exhaust gas introduction cell 14, leading to easier exhaust gas passage through the cell wall 13a. Consequently, PMs accumulate on the cell walls 13a at an initial stage.

As described above, both of the flow-through resistance of the exhaust gas emission cells and the outflow resistance upon emission of exhaust gas from the honeycomb filter can be reduced. Thus, the initial pressure loss before accumulation of PMs can be reduced.

The relation between the length of a side forming a cell and the surface area mentioned above is attributed to the following reasons.

The surface area of the cell wall 13a separating the exhaust gas emission cell 11 and the first exhaust gas introduction cell 12 corresponds to the surface area of the inner wall of the first exhaust gas introduction cell 12. The surface area of the inner wall of the first exhaust gas introduction cell 12 is expressed as Ls×Le, where Le represents an effective length of the filter excluding the length of the plugged portions at the introduction side from the exhaust gas introduction end and at the emission side from the exhaust gas emission end (see FIG. 2B). Similarly, the surface area of the cell wall 13b separating the exhaust gas emission cell 11 and the second exhaust gas introduction cell 14 corresponds to the surface area of the inner wall of the second exhaust gas introduction cell 14. The surface area of the inner wall of the second exhaust gas introduction cell 14 is expressed as Lo×Le, where Le represents an effective length of the filter excluding the length of the plugged portions at the introduction side from the exhaust gas introduction end and at the emission side from the exhaust gas emission end. The effective length of the filter is defined as a length measured from the tip of a plug in FIG. 2B.

Thus, if the length (Ls) of the side 12a is larger than the length (Lo) of the side 14a, the surface area value of Ls×Le is relatively larger than the surface area value of Lo×Le. Namely, the length of the side is equivalent to the surface area. Thus, if the length (Ls) of the side 12a of the first exhaust gas introduction cell 12 is larger than the length (Lo) of the side 14a of the second exhaust gas introduction cell 14, the surface area of the cell wall 13a separating the exhaust gas emission cell 11 and the first exhaust gas introduction cell 12 is larger than the surface area of the cell wall 13b separating the exhaust gas emission cell 11 and the second exhaust gas introduction cell 14.

In FIGS. 6A to 6C, insertions relating to the effects are only partially illustrated. The same is true to FIGS. 3A and 3B.

Next, as shown in FIG. 6B, when a certain amount of PMs are accumulated on the cell walls 13a corresponding to the inner walls of the first exhaust gas introduction cells 12, an accumulated layer of the PMs gets thick due to the small cross sectional area of the first exhaust gas introduction cells 12. Consequently, resistance due to the accumulation of PMs increases to make the passage of exhaust gas through the cell walls 13a difficult. Under such conditions, exhaust gas turns to pass through the cell walls 13b separating the exhaust gas emission cells 11 and the second exhaust gas introduction cells 14 (switching of the main channel). Then, PMs are also accumulated on the surfaces of the cell walls 13 corresponding to the surfaces of the inner walls of the second exhaust gas introduction cells 14.

Subsequently, since exhaust gas can considerably freely pass through the cell walls, exhaust gas passes through inside the cell walls 13c separating the first exhaust gas introduction cells 12 and the second exhaust gas introduction cells 14 to flow into the exhaust gas emission cells 11 as shown in FIG. 6C. In this situation, exhaust gas enters the cell walls 13c from the first exhaust gas introduction cells 12 as well as from, the second exhaust gas introduction cells 14.

As described above, PMs accumulate on the entire surfaces of the cell walls 13a and 13c around the first exhaust gas introduction cells 12 corresponding to the inner walls of the first exhaust gas introduction cells 12, and gradually accumulate rather more widely and thinly in a larger amount on the entire surfaces of the cell walls 13b and 13c around the second exhaust gas introduction cells 14 corresponding to the inner walls of the second exhaust gas introduction cells 14. The first exhaust gas introduction cells 12 each have a smaller cross sectional area than each second exhaust gas introduction cell 14. Thus, in the first exhaust gas introduction cells 12, PMs accumulate in a thick layer where the passage resistance is high. For this reason, the introduced exhaust gas flows more easily into the second exhaust gas introduction cells 14 than into the first exhaust gas introduction cells 12 at an early stage (aforementioned switching of the main channel of exhaust gas), causing the aforementioned shift of the PM accumulation. Consequently, PMs accumulate more on the entire surfaces of the cell walls 13b and 13c around the second exhaust gas introduction cells 14 corresponding to the inner walls of the second exhaust gas introduction cells 14 rather than the surfaces of the cell walls 13a and 13c around the first exhaust gas introduction cells 12 corresponding to the inner walls of the first exhaust gas introduction cells 12. It is thus possible to make use of the entire surfaces of the cell walls 13b and 13c around the second exhaust gas introduction cells 14 corresponding to the inner walls of the second exhaust gas introduction cells 14 for accumulation of PMs earlier. Since the surface area of the cell walls 13b and 13c around the second exhaust gas introduction cells 14 corresponding to the inner walls of the second exhaust gas introduction cells 14 is larger than the surface area of the cell walls 13a and 13c around the first exhaust gas introduction cells 12 corresponding to the inner walls of the first exhaust gas introduction cells 12, when PMs accumulate on the entire peripheries of the cell walls 13b and 13c surrounding the second exhaust gas introduction cells 14, the accumulated layer is thin. Thus, the pressure loss due to exhaust gas increases at a low rate even after accumulation of PMs. Hence, a surprisingly excellent effect of maintaining the pressure loss at a low level can be achieved even though the amount of accumulated PMs increases.

As a result, vehicles carrying the honeycomb filter according to the embodiments of the present invention do not cause a disadvantageous phenomenon for driving that are derived from an increase in the pressure loss throughout the use area, and also have good fuel economy.

The honeycomb filter of the embodiments of the present invention preferably has the following structure. In the cross section perpendicular to the longitudinal direction of an exhaust gas emission cell and a first exhaust gas introduction cell which have polygonal cross sectional shapes and are adjacent to each other, a side, among the sides forming the cross sectional shape of the exhaust gas emission cell, which is adjacent to the first exhaust gas introduction cell across the cell wall in a manner facing the first exhaust gas introduction cell is parallel to a side, among the sides forming the cross sectional shape of the first exhaust gas introduction cell, which is adjacent to the exhaust gas emission cell across the cell wall in a manner facing the exhaust gas emission cell.

This indicates that the thickness is uniform at any part of the walls separating the exhaust gas emission cells and the first exhaust gas introduction cells. Thus, it is possible to achieve high fracture strength of the filter, easy passage of exhaust gas, and uniform accumulation of PMs, so that the pressure loss is reduced.

In the case where the vertex portions of the polygonal cross section are formed by curved lines, the curve portions are not considered as sides because naturally such portions do not form parallel lines.

Provided that, in the cross section perpendicular to the longitudinal direction of the cells, straight portions considered as sides are hypothetically extended, and intersections of the hypothetical straight lines are given as hypothetical vertices, the length of each side of the cross sectional shape excluding the curve portion is preferably not less than 80% the length of a hypothetical side of a polygon that is formed by connecting the hypothetical vertices. To put it the other way around, the length of the portion not considered as a side is preferably less than 20% the length of the hypothetical side.

In the case of the cell having a polygonal cross sectional shape, if the lengths of the sides are not less than 30% the respective lengths of the hypothetical sides, the main-channel-switching effect, which is an effect of the embodiments of the present invention, can be achieved by controlling the length of the sides.

The honeycomb filter of the embodiments of the present invention preferably has the following structure. In the cross section perpendicular to the longitudinal direction of an exhaust gas emission cell and a second exhaust gas introduction cell which is adjacent to the exhaust gas emission cell across a cell wall, in the case where the cells have polygonal cross sections, a side, among the sides forming the cross sectional shape of the exhaust gas emission cell, which is adjacent to the second exhaust gas introduction cell across the cell wall in a manner facing the second exhaust gas introduction cell is parallel to a side, among the sides forming the cross sectional shape of the second exhaust gas introduction cell, which is adjacent to the exhaust gas emission cell across the cell wall in a manner facing the exhaust gas emission cell.

This indicates that the thickness is uniform at any part of the walls separating the exhaust gas emission cells and the respective second exhaust gas introduction cells. Thus, it is possible to achieve high fracture strength of the filter, easy passage of exhaust gas, and uniform accumulation of PMs so that the pressure loss is reduced.

Meanwhile, in the case where the vertex portions of the polygonal cross sectional shape are formed by curved lines, the curve portions are not considered as sides because naturally such portions do not form parallel lines.

Provided that, in the cross section perpendicular to the longitudinal direction of the cells, straight portions considered as sides are hypothetically extended, and intersections of the hypothetical straight lines are given as hypothetical vertices, the length of each side of the cross sectional shape excluding the curve portion is preferably not less than 80% the length of a hypothetical side of a polygon that is formed by connecting the hypothetical vertices. To put it the other way around, the length of the portion not considered as a side is preferably less than 20% the length of the hypothetical side.

In the case of the cell having a polygonal cross sectional shape, if the lengths of the sides are not less than 80% the respective lengths of the hypothetical sides, the main-channel-switching effect, which is an effect of the embodiments of the present invention, can be achieved by controlling the length of the sides.

The honeycomb filter of the embodiments of the present invention, preferably has the following structure. In the cross section perpendicular to the longitudinal direction of a first exhaust gas introduction cell and a second exhaust gas introduction cell which is adjacent to the first exhaust gas introduction cell across a cell wall, in the case where the cells have polygonal cross sectional shapes, a side, among the sides forming the cross sectional shape of the first exhaust gas introduction cell, which is adjacent to the second exhaust gas introduction cell across the cell wall in a manner facing the second exhaust gas introduction cell, is parallel to a side, among the sides forming the cross sectional shape of the second exhaust gas introduction cell, which is adjacent to the first exhaust gas introduction cell across the cell wall in a manner facing the first exhaust gas introduction cell.

This indicates that the thickness is uniform at any part of the walls separating the first exhaust gas introduction cells and the second exhaust gas introduction cells. Thus, it is possible to achieve high fracture strength of the honeycomb filter, easy exhaust gas passage through the walls from the second exhaust gas introduction cells to the exhaust gas emission cells, and wide, thin and uniform accumulation of PMs on the inner cell walls of the second exhaust gas introduction cells, so that low pressure loss can be achieved after accumulation of PMs.

Meanwhile, in the case where the vertex portions of the polygonal cross section are formed by curved lines, the curve portions are not considered as sides because naturally such portions do not form parallel lines.

Provided that, in the cross section perpendicular to the longitudinal direction of the cells, straight portions considered as sides are hypothetically extended, and intersections of the hypothetical straight lines are given as hypothetical vertices, the length of each side of the cross sectional shape excluding the curve portion is preferably not less than 80% the length of a hypothetical side of a polygon that is formed by connecting the hypothetical vertices. To put it the other way around, the length of the portion not considered as a side is preferably less than 20% the length of the hypothetical side.

In the case of the cell having a polygonal cross sectional shape, if the lengths of the sides are not less than 80% the respective lengths of the hypothetical sides, the main-channel-switching effect, which is an effect of the embodiments of the present invention, can be achieved by controlling the length of the sides.

The honeycomb filter according to the embodiments of the present invention preferably has the following structure. In the case where the exhaust gas emission cell, the first exhaust gas introduction cell, and the second exhaust gas introduction cell, which are adjacent to one another across cell walls, each have a polygonal cross sectional shape in the cross section perpendicular to the longitudinal direction of the cells, (a) a side, among the sides forming the cross sectional shape of the exhaust gas emission cell, which is adjacent to the first exhaust gas introduction cell across the cell wall in a manner facing the first exhaust gas introduction cell, is parallel to a side, among the sides forming the cross sectional shape of the first exhaust gas introduction cell, which is adjacent to the exhaust gas emission cell across the cell wall in a manner facing the exhaust gas emission cell, (b) a side, among the sides forming the cross sectional shape of the exhaust gas emission cell, which is adjacent to the second exhaust gas introduction cell across the cell wall in a manner facing the second exhaust gas introduction cell, is parallel to a side, among the sides forming the cross sectional shape of the second exhaust gas introduction cell, which is adjacent to the exhaust gas emission cell across the cell wall in a manner facing the exhaust gas emission cell, and (c) a side, among the sides forming the cross sectional shape of the first exhaust gas introduction cell, which is adjacent to the second exhaust gas introduction cell across the cell wall in a manner facing the second exhaust gas introduction cell, is parallel to a side, among the sides forming the cross sectional shape of the second exhaust gas introduction cell, which is adjacent to the first exhaust gas introduction cell across the cell wall in a manner facing the first exhaust gas introduction cell.

Moreover, in the case where the first exhaust gas introduction cell, the second exhaust gas introduction cell, and the exhaust gas emission cell each have a polygonal cross sectional shape in the honeycomb filter according to the embodiments of the present invention, the distance set woes the parallel sides in the above condition (a), the distance between the parallel sides in the above condition (b), and the distance between the parallel sides in the above condition (c) are preferably the same in the structure simultaneously satisfying the conditions (a), (b), and (c). Here, the distance between the sides is defined as follows: a hypothetical perpendicular line is given from an arbitrary point P in one side to a point Q in the other side, and the distance between the point P and the point Q is defined as the distance between the parallel sides.

The honeycomb filter having the above structure has the highest fracture strength, has excellent thermal shock resistance upon regeneration, can best reduce the pressure loss, and can avoid thermal shock damage that occurs upon regeneration of PMs regardless of the presence or absence of accumulated PMs.

Meanwhile, in the case where the vertex portions of the polygonal cross section are formed by curved lines, the curve portions are not considered as sides because naturally such portions do not form parallel lines.

Provided that, in the cross section perpendicular to the longitudinal direction of the cells, straight portions considered as sides are hypothetically extended, and intersections of the hypothetical straight lines are given as hypothetical vertices, the length of each side of the cross sectional shape excluding the curve portion is preferably not less than 80% the length of a hypothetical side of a polygon that is formed by connecting the hypothetical vertices. To put it the other way around, the length of the portion not considered as a side is preferably less than 20% the length of the hypothetical side.

In the case of the cell having a polygonal cross sectional shape, if the lengths of the sides are not less than 80% the respective lengths of the hypothetical sides, the main-channel-switching effect, which is an effect of the embodiments of the present invention, can be achieved by controlling the length of the sides.

The honeycomb filter of the embodiments of the present invention is preferably used to purify PMs in exhaust gas discharged from internal combustion engines of automobiles. The honeycomb filter can reduce both of the initial pressure loss before accumulation of PMs and the transitional pressure loss caused by accumulation of PMs in the filter, and thereby the fuel economy of the engine can be enhanced.

The honeycomb filter of the embodiments of the present invention is most suitably used in automobiles whose internal combustion engines are diesel engines. The amount of PMs discharged from a diesel engine is larger than that from a gasoline engine. Thus, a demand for reducing the transitional pressure loss caused by accumulation of PMs in the filter is higher for diesel engines than for gasoline engines.

In the case of using the honeycomb filter of the embodiments of the present invention to purify PMs in exhaust gas discharged from internal combustion engines of automobiles, the honeycomb filter of the embodiments of the present invention is fixed inside an exhaust tube via a holding material.

In the honeycomb filter according to the embodiments of the present invention, in the cross section perpendicular to the longitudinal direction of the cells, each exhaust gas emission cell and each exhaust gas introduction cell preferably have a polygonal cross section, and a side forming the cross sectional shape of each first exhaust gas introduction cell faces one of the exhaust gas emission cells, a side forming the cross sectional shape of each second exhaust gas introduction cell faces one of the exhaust gas emission cells, and the length of the side forming the cross sectional shape of the second exhaust gas introduction cell is not more than 0.8 times the length of the side forming the cross sectional shape of the first exhaust gas introduction cell.

The honeycomb filter having the above structure enables easier passage of exhaust gas through the cell walls separating the exhaust gas emission cells and the first exhaust gas introduction cells, effective suppression of the initial pressure loss, and prevention of an increase in the rate of increase of the pressure loss after accumulation of PMs.

If the ratio of the length of the side of the second exhaust gas introduction cell to the length of the side of the first exhaust gas introduction cell exceeds 0.8, the two sides do not have a big difference in length. Consequently, the initial pressure loss is hardly suppressed.

In the honeycomb filter according to the embodiments of the present invention, in the direction perpendicular to the longitudinal direction of the cells, preferably, the exhaust gas emission cells are each octagonal, the first exhaust gas introduction cells are each square, and the second exhaust gas introduction cells are each octagonal.

The honeycomb filter having the above structure has the same shape as the honeycomb filter in FIGS. 6A to 6C that is described concerning the effects thereof. Thus, the honeycomb filter can effectively suppress the initial pressure loss, have a large surface area, for allowing PMs to accumulate thereon, and can maintain the pressure loss at a low level.

In the honeycomb filter according to the embodiments of the present invention, in the cross section perpendicular to the longitudinal direction of the cells, preferably, the cross sectional area of each second exhaust gas introduction cell is equal in site to the cross sectional area of each exhaust gas emission cell, and the cross sectional area of each first exhaust gas introduction cell is 20 to 50% the size of the cross sectional area of each second exhaust gas introduction cell.

The honeycomb filter having the above structure can provide difference between the resistance caused upon flowing of exhaust gas through the first exhaust gas introduction cells and the resistance caused upon flowing of exhaust gas through the second exhaust gas introduction cells, thereby enabling effective suppression of the pressure loss.

If the cross sectional area of the first exhaust gas introduction cells is less than 20% the size of the cross sectional area of the second exhaust gas introduction cells, the cross sectional area of the first exhaust gas introduction cells is too small. Consequently, high flow-through resistance occurs upon flowing of exhaust gas through the first exhaust gas introduction cells so that the pressure loss tends to be high. If the cross sectional area of the first exhaust gas introduction cells is more than 50% the size of the cross sectional area of the second exhaust gas introduction cells, the difference in the flow-through resistance of the first exhaust gas introduction cells and the flow-through resistance of the second exhaust gas introduction cells is small. Thus, the pressure loss is hardly reduced.

In the honeycomb filter according to the embodiments of the present invention, the cell walls defining rims of the cells preferably hare a uniform thickness in any part of the honeycomb filter.

The honeycomb filter having this structure can exert the aforementioned effects through its entire body.

In the honeycomb filter according to the embodiments of the present invention, in the direction perpendicular to the longitudinal direction of the cells, preferably the exhaust gas emission cells have octagonal cross sections, the first exhaust gas introduction cells have square cross sections, and the second exhaust gas introduction cells have octagonal cross sections, the cross sectional shape of each second exhaust gas introduction cell is congruent with the cross sectional shape of each exhaust gas emission cell, and the exhaust gas emission cells, the first exhaust gas introduction cells, and the second exhaust gas introduction cells are arranged in the following manner:

the exhaust gas emission cells are each surrounded by alternately arranged four pieces of the first exhaust gas introduction cells and four pieces of the second exhaust gas introduction, cells across the porous cell walls;

provided that hypothetical segments connecting geometric centers of gravity of the octagonal cross sections of the four second exhaust gas introduction cells surrounding the exhaust gas emission cell are given, an intersection of the two segments crossing a shape region including the cross sectional shape of the exhaust gas emission cell is identical with a geometric center of gravity of the octagonal cross section of the exhaust gas emission cell; and the four segments not crossing the shape region including the cross sectional shape of the exhaust gas emission cell form a square, and midpoints of the respective sides of the square are identical with geometric centers of gravity of the square cross sections of the four first exhaust gas introduction cells surrounding the exhaust gas emission cell; and a side facing the first exhaust gas introduction cell across a cell wall among the sides forming the cross sectional shape of the exhaust gas emission cell is parallel to a side facing the exhaust gas emission cell across the cell wall among the sides forming the cross sectional shape of the first exhaust gas introduction cell, a side facing the second exhaust gas introduction cell across a cell wall among the sides forming the cross sectional shape of the exhaust gas emission cell is parallel to a side facing the exhaust gas emission cell across the cell wall among the sides forming the cross sectional shape of the second exhaust gas introduction cell, a side facing the second exhaust gas introduction cell across a cell wall among the sides forming the cross sectional shape of the first exhaust gas introduction cell is parallel to a side facing the first exhaust gas introduction cell across the cell wall among the sides forming the cross sectional shape of the second exhaust gas introduction cell, and distances between the parallel sides are the same.

In the honeycomb filter according to the embodiments of the present invention, in the direction perpendicular to the longitudinal direction of the cells, the exhaust gas emission cells, the first exhaust gas introduction cells, and the second exhaust gas introduction cells ail preferably name a square cross section.

Even in the case where the first exhaust gas introduction cells and the second exhaust gas introduction cells all have a square cross section, relations concerning the size, position, or the like of the exhaust gas emission cells, the first exhaust gas introduction cells, and the second exhaust gas introduction cells are different. For example, since the cross sectional area of each first exhaust gas introduction cell is smaller than the cross sectional area of each exhaust gas emission cell, the honeycomb filter of the embodiments of the present invention is different from the honeycomb filter 110 (see FIGS. 22A and 22B) in the aforementioned background art, and can exert the aforementioned effects of the embodiments of the present invention.

In the honeycomb filter according to the embodiments of the present invention, in the direction perpendicular to the longitudinal direction of the cells, preferably the cross sectional area of each second exhaust gas introduction cell is equal in size to the cross sectional area of each exhaust gas emission cell, and the cross sectional area of each first exhaust gas introduction cell is 20 to 50% the size of the cross sectional area of each second exhaust gas introduction cell.

The honeycomb filter having the above structure can provide difference between the resistance caused upon flowing of exhaust gas through the first exhaust gas introduction cells and the resistance caused upon flowing of exhaust gas through the second exhaust gas introduction cells, thereby enabling effective suppression of the pressure loss.

If the cross sectional area of the first exhaust gas introduction cells is less than 20% the size of the cross sectional area of the second exhaust gas introduction cells, the cross sectional area of the first exhaust gas introduction cells is too small. Consequently, high flow-through resistance occurs upon flowing of exhaust gas through the first exhaust gas introduction cells so that the pressure loss tends to be high. If the cross sectional area of the first exhaust gas introduction cells is more than 50% the size of the cross sectional area of the second exhaust gas introduction cells, the difference in flow-through resistance between the first exhaust gas introduction cells and the second exhaust gas introduction cells is small. Thus, the pressure loss is hardly reduced.

In the honeycomb filter according to the embodiments of the present invention, in the direction perpendicular to the longitudinal direction of the cells, preferably, the exhaust gas emission cells have a square cross section, the first exhaust gas introduction cells have a square cross section, and the second exhaust gas introduction cells have a square cross section, the cross sectional shape of each second exhaust gas introduction cell is congruent with the cross sectional shape of each exhaust gas emission cell, the exhaust gas emission cells, the first exhaust gas introduction cells, and the second exhaust gas introduction cells are arranged in the following manner;

the exhaust gas emission cells are each surrounded by alternately arranged four pieces of the first exhaust gas introduction cells and four pieces of the second exhaust gas introduction cells across the porous cell walls;

provided that hypothetical segments connecting geometric centers of gravity of the square cross sections of the four second exhaust gas introduction cells surrounding the exhaust gas emission cell are given, an intersection of the two segments crossing a shape region including the cross sectional shape of the exhaust gas emission cell is identical with a geometric center of gravity of the square cross section of the exhaust gas emission cell; and the four segments not crossing the shape region including the cross sectional shape of the exhaust gas emission cell form a square, and midpoints of the sides of the square are identical with geometric centers of gravity of the square cross sections of the four first exhaust gas introduction cells surrounding the exhaust gas emission cell, and a side facing the first exhaust gas introduction cell across a cell wall among the sides forming the cross sectional shape of the exhaust gas emission cell is parallel to a side facing the exhaust gas emission cell across the cell wall among the sides forming the cross sectional shape of the first exhaust gas introduction cell, a side facing the second exhaust gas introduction cell across a cell wall among the sides forming the cross sectional shape of the first exhaust gas introduction cell is parallel to a side facing the first exhaust gas introduction cell across the cell wall among the sides forming the cross sectional shape of the second exhaust gas introduction cell, and distances between the parallel sides are the same.

In the honeycomb filter of the embodiments of the present invention, in the cross section perpendicular to the longitudinal direction of the aforementioned cells, preferably the vertex portions of the polygonal cells are formed by curved lines.

The honeycomb filter having cells with vertex portions formed by curved lines according to the above structure are not susceptible to concentration of stress derived from heat or the like in the corner portions of the cells. Thus, cracks hardly occur.

In the honeycomb filter according to the embodiments of the present invention, in the direction perpendicular to the longitudinal direction of the cells, the exhaust gas emission cells, the first exhaust gas introduction cells, and the second exhaust gas introduction cells are preferably point-symmetrical polygons each having not more than eight sides.

The cells each having a point-symmetrical polygonal shape with not more than eight sides can reduce the resistance caused upon flowing of exhaust gas through the cells, and thus can further reduce the pressure loss.

In the honeycomb filter according to the embodiments of the present invention, preferably, the exhaust gas introduction cells include first exhaust gas introduction cells and second exhaust gas introduction cells each having a larger cross sectional area than each first exhaust gas introduction cell in a direction perpendicular to the longitudinal direction of the cells, each exhaust gas emission cell has an equal or larger cross sectional area than each second exhaust gas introduction cell in a direction perpendicular to the longitudinal direction of the cells, in the cross section perpendicular to the longitudinal direction of the cells, the exhaust gas introduction cells and the exhaust gas emission cells are each in a shape formed by a curved line, and the thickness of the cell walls separating the first exhaust gas introduction cells and the exhaust gas emission cells is smaller than the thickness of the cell walls separating the second exhaust gas introduction cells and the exhaust gas emission cells.

In the honeycomb filter according to the embodiments of the present invention, in a case where the thickness of the cell walls separating the first exhaust gas introduction cells and the respective exhaust gas emission cells is smaller than the thickness of the cell walls separating the second exhaust gas introduction cells and the respective exhaust gas emission cells, exhaust gas easily passes through the cell walls separating the first exhaust gas introduction cells and the respective exhaust gas emission cells at an early stage. After accumulation of a certain amount of PMs, exhaust gas is likely to pass through the cell walls separating the second exhaust gas introduction cells and the respective exhaust gas emission cells. The second exhaust gas introduction cells have a larger cross sectional area than the first exhaust gas introduction cells, and the exhaust gas emission cells have an equal or larger cross sectional area than the respective second exhaust gas introduction cells. For this reason, the above effects of the embodiments of the present invention are exerted.

In the honeycomb filter according to the embodiments of the present invention, in the direction perpendicular to the longitudinal direction of the cells, preferably the exhaust gas introduction cells and the exhaust gas emission cells are each in a shape formed by curved lines, and the thickness of the cell walls separating the first exhaust gas introduction cells and the respect rue exhaust gas emission cells is 40 to 75% the thickness of the cell walls separating the second exhaust gas introduction cells and the exhaust gas emission cells.

In the honeycomb filter of the embodiments of the present invention, if the thickness of the cell walls separating the first exhaust gas introduction cells and the exhaust gas emission cells is 40 to 75% the thickness of the cell walls separating the second exhaust gas introduction cells and the exhaust gas emission cells, exhaust gas easily passes through the cell walls separating the first exhaust gas introduction cells and the exhaust gas emission cells at an initial stage. Then, after accumulation of a certain amount of PMs, exhaust gas passes through the cell walls separating the second exhaust gas introduction cells and the exhaust gas emission cells. Moreover, the second exhaust gas introduction cells each hare a larger cross sectional area than each first exhaust gas introduction cell, and each exhaust gas emission cell has an equal or larger cross sectional area than each second exhaust gas introduction cell. Thus, the aforementioned effects of the embodiments of the present invention can be exerted.

If the thickness of the cell walls separating the first exhaust gas introduction cells and the exhaust gas emission cells is less than 40% the thickness of the cell walls separating the second exhaust gas introduction cells and the exhaust gas emission cells, the cell walls separating the first exhaust gas introduction cells and the exhaust gas emission cells need to be extremely thin. Consequently, the honeycomb filter has low mechanical strength. If the thickness of the cell walls separating the first exhaust gas introduction cells and the exhaust gas emission cells is more than 75% the thickness of the cell walls separating the second exhaust gas introduction cells and the exhaust gas or emission cells, the former cells and latter cells do not have a big difference in the thickness. Consequently, the aforementioned pressure loss reduction effect may not be obtained.

In the honeycomb filter according to the embodiments of the present invention, in the direction perpendicular to the longitudinal direction of the cells, the exhaust gas emission cells, the first exhaust gas introduction cells, and the second exhaust gas introduction cells are preferably round.

In the honeycomb filter having the above structure, if the cross sectional shapes of the exhaust gas emission cells, first exhaust gas introduction cells, and the second exhaust gas introduction cells are all round, the effects of the embodiments of the present invention can be exerted.

In the honeycomb filter according to the embodiments of the present invention, in the direction perpendicular to the longitudinal direction of the cells, the exhaust gas emission cells and the second exhaust gas introduction cells each preferably have a convex square cross section formed by four outwardly curved lines, whereas the first exhaust gas introduction cells each preferably have a concave square cross section formed by four inwardly curved lines.

The term "convex square" herein refers to a shape formed by four outwardly curved lines in the same length. The shape seems to be a square having sides expanding outwardly from the geometrical center of gravity. The term "concave square" herein refers to a shame formed by four inwardly curved lines in the same length. The shape seems to be a square having sides bending toward the geometrical center of gravity.

The exhaust gas emission cells, the first exhaust gas introduction cells, and the second exhaust gas introduction cells in this honeycomb filter having this structure have the aforementioned structures. Thus, the exhaust gas emission cells each have a larger cross sectional area than each first exhaust gas introduction cells, and thereby providing a honeycomb filter having the relations concerning the sizes of the exhaust gas emission cells, first exhaust gas introduction cells, and second exhaust gas introduction cells according to the embodiments of the present invention. Consequently, the effects of the embodiments of the present invention can be exerted.

In the honeycomb filter according to the embodiments of the present invention, in the direction perpendicular to the longitudinal direction of the cells, the cross sectional area of each second exhaust gas introduction cell is preferably equal in size to the cross sectional area of each exhaust gas emission cell, and the cross sectional area of each first exhaust gas introduction cell is preferably 20 to 50% the size of the cross sectional area of each second exhaust gas introduction cell.

The honeycomb filter having the above structure can provide difference between the resistance caused upon flowing of exhaust gas through the first exhaust gas introduction cells and the resistance caused upon flowing of exhaust gas through the second exhaust gas introduction cells, thereby enabling effective suppression of the pressure loss.

If the cross sectional area of the first exhaust gas introduction cells is less than 20% the size of the cross sectional area of the second exhaust gas introduction cells, the cress sectional area of the first exhaust gas introduction cells is too small. Consequently, high flow-through resistance occurs upon flowing of exhaust gas through the first exhaust gas introduction cells so that the pressure loss tends to be high. If the cross sectional area of the first exhaust gas introduction cells is more than 50% the size of the cross sectional area of the second exhaust gas introduction cells, the difference between the flow-through resistance of the first exhaust gas introduction cells and the flow-through resistance of the second exhaust gas introduction cells is small. Thus, the pressure loss is hardly reduced.

In the honeycomb filter of the embodiments of the present invention, the exhaust gas introduction cells preferably consist only of the first exhaust gas introduction cells and the second exhaust gas introduction cells each having a larger cross sectional area than each first exhaust gas introduction cell in a direction perpendicular to the longitudinal direction of the cells.

This is because a smaller number of first exhaust gas introduction cells each having a smaller cross sectional area than each second exhaust gas introduction cell provides a larger effective introduction cell area, thereby allowing PMs to be thinly and widely accumulated.

The honeycomb filter of the embodiments of the present invention preferably includes a plurality of honeycomb fired bodies combined with one another by adhesive layers residing therebetween, the honeycomb fired bodies each having the exhaust gas emission cells, the first exhaust gas introduction cells, and the second exhaust gas introduction cells, and each having an outer wall on the periphery thereof.

With regard to the structure formed by combining a plurality of honeycomb fired bodies to one another with adhesive layers residing therebetween, since the cells forming one honeycomb fired body have the structures according to the embodiments of the present invention, an aggregate of the honeycomb fired bodies can exert the effects of the embodiments of the present invention.

Moreover, the honeycomb fired bodies each having a smaller volume enables to reduce the thermal stress that is generated upon production and usage thereof, preventing damage such as cracks.

Figure 2A:
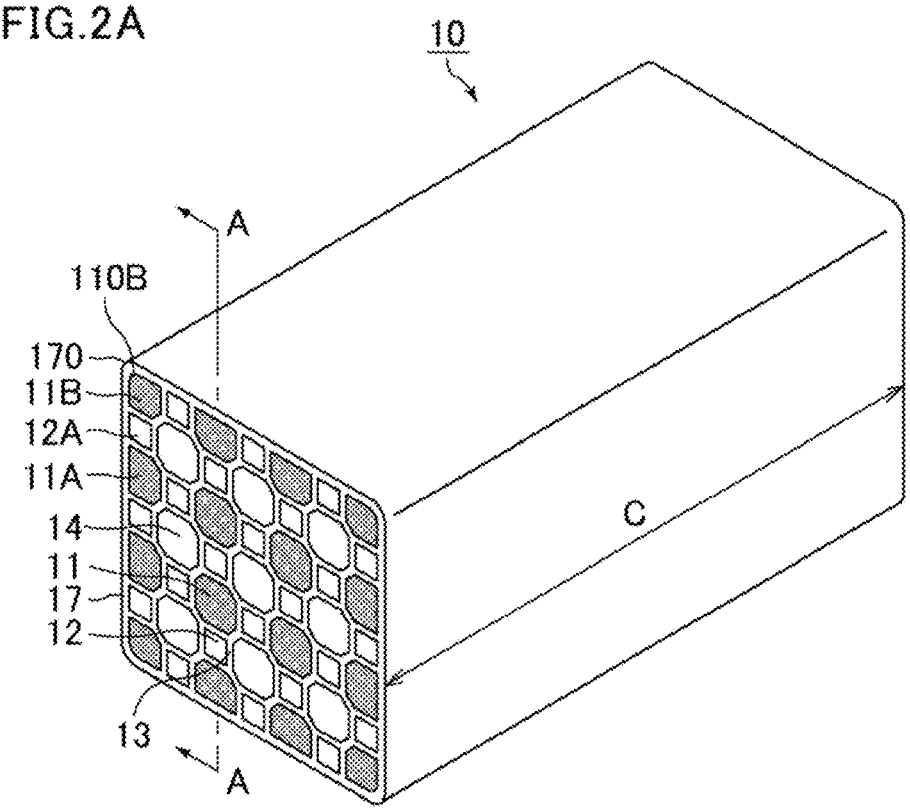
FIG. 2A is a perspective view schematically illustrating one example of a honeycomb fired body forming the honeycomb filter in FIG. 1.
Figure 14A:
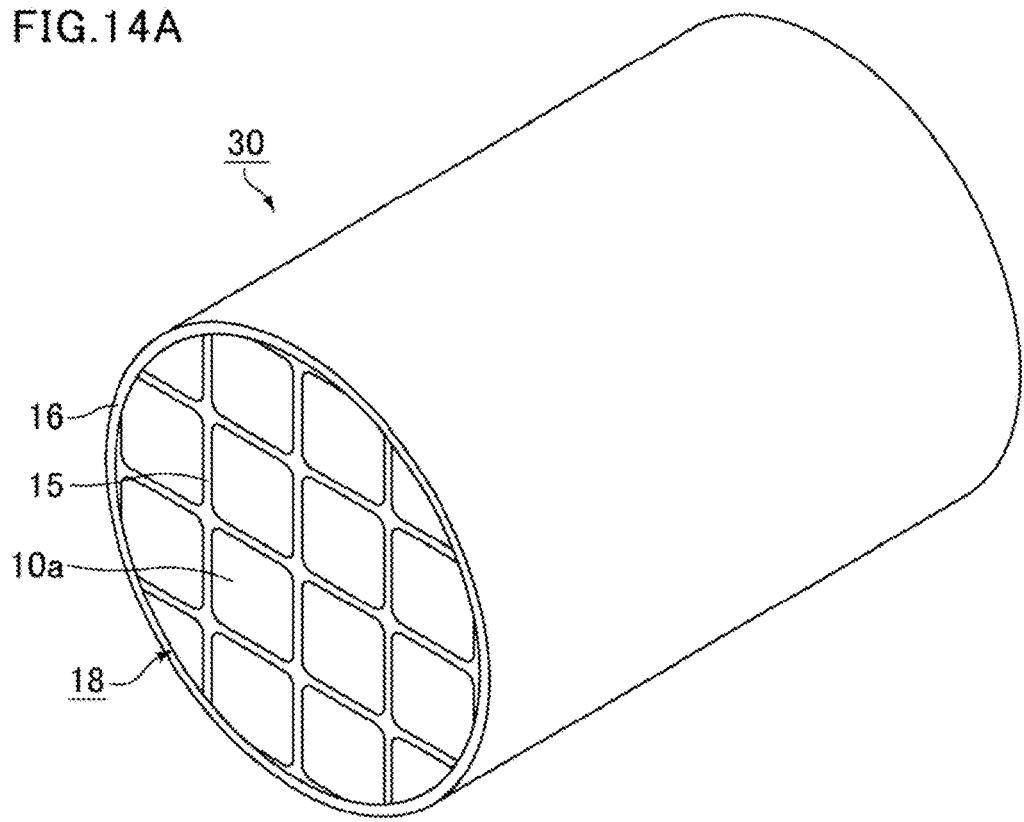
FIG. 14A is a perspective view schematically illustrating one example of a honeycomb filter according to a third embodiment of the present intention.
Figure 14B:
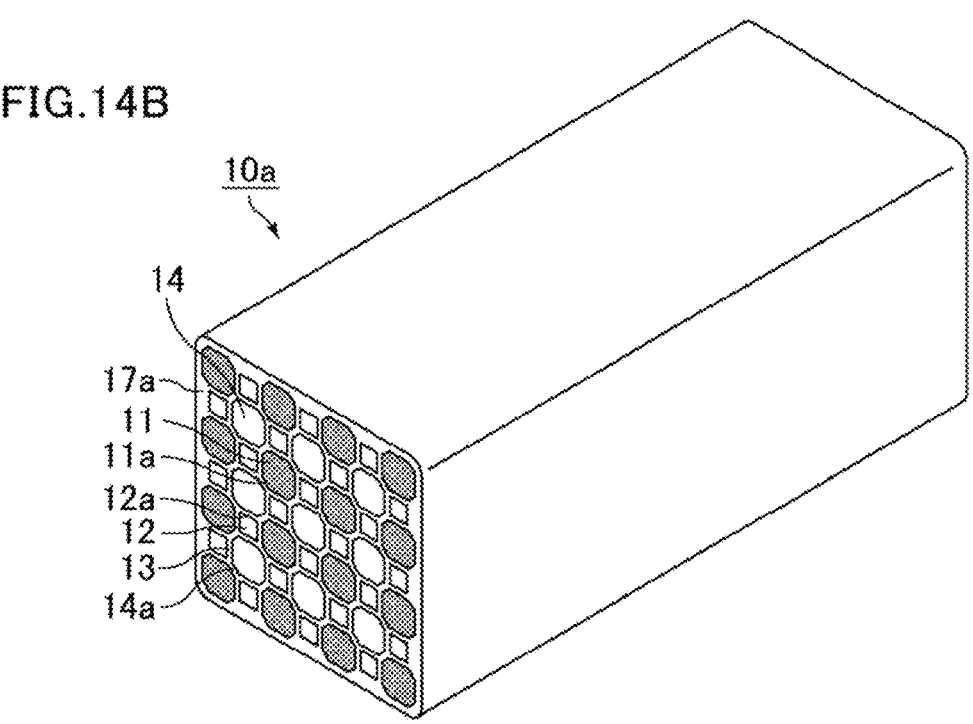
FIG. 14B is a perspective view illustrating a honeycomb fired body forming the honeycomb filter.

In the honeycomb filter of the embodiments of the present invention, the outer wall of the honeycomb fired body and the exhaust gas introduction cell adjacent to the outer wall have the following three patterns of shapes:

(1) as illustrated in FIGS. 14B and 16A, the thickness of the outer wall is not uniform, and the first exhaust gas introduction cell and the exhaust gas emission cell adjacent to the outer wall have the same shapes as the first exhaust gas introduction cell and the exhaust gas emission cell not adjacent to the outer wall, respectively;

(2) as illustrated in FIGS. 2A and 16B, the thickness of the outer wall is uniform, the first exhaust gas introduction cell adjacent to the outer wall has the same shape as the first exhaust gas introduction cell not adjacent to the outer wall, and the exhaust gas emission cell adjacent to the outer wall has a shape partially deformed, compared to the cross sectional shape of the exhaust gas emission cell not adjacent to the outer wall, in accordance with the line along the inner wall, which forms the outer wall, in the exhaust gas emission cell adjacent to the outer wall; and (3) as illustrated in FIGS. 15B and 16C, the thickness of the outer wall is uniform in accordance with the cross sectional shapes of the first exhaust gas introduction cell and the exhaust gas emission cell adjacent to the outer wall, and the first exhaust gas introduction cell and the exhaust gas emission cell adjacent to the cuter wall have the same shapes as the first exhaust gas introduction cell and the exhaust gas emission cell not adjacent to the outer wall, respectively, which means that the outer wall is bending in accordance with the cross sectional shapes of the first exhaust gas introduction cell and the exhaust gas emission cell adjacent to the enter wall.

In the honeycomb filter of the embodiments of the present invention, preferably, the cuter wall has corner portions and in the exhaust gas introduction cells and the exhaust gas emission cells adjacent to the outer wall, a side, which contacts the outer wall, is straight and parallel to a side corresponding to an outer periphery of the outer wall in a manner the thickness of the outer wall except for the corner portions is substantially uniform.

The pattern (2) in the above description of three patterns applies to the honeycomb filter of such an embodiment.

The aforementioned structure enables to enhance the strength of the honeycomb fired body by the outer wall but also suppress true partial variation of the volume ratio of the exhaust emission cells and the exhaust gas introduction cells in the honeycomb fired body. As a result, the flow of exhaust gas becomes more uniform, lowering the pressure loss.

According to the honeycomb filter of the embodiments of the present invention, the aforementioned honeycomb filter includes honeycomb fired bodies, and the honeycomb fired body preferably includes silicon carbide or silicon-containing silicon carbide.

The silicon carbide and silicon-containing silicon, carbide are materials excellent in heat resistance. Thus, the honeycomb filter is better in heat resistance.

In the honeycomb filter of the embodiments of the present invention, the thickness of the cell wall of the honeycomb filter is preferably 0.10 to 0.46 mm.

The cell wall having such a thickness is enough thick to capture PMs in the gas and effectively suppresses an increase of the pressure loss. As a result, the honeycomb filter of the embodiments of the present invention can sufficiently exert the effects of the embodiments of the present invention.

If the thickness is less than 0.10 mm, the cell wall is too thin, so that the mechanical strength of the honeycomb filter is lowered. If the thickness is more than 0.46 mm, the cell wall is too thick, so that the pressure loss upon passage of exhaust gas through the cell wall becomes greater.

In the honeycomb filter of the embodiments of the present invention, the cell walls preferably have pores having an average pore diameter of 15 to 25 µm.

In the honeycomb filter having the above structure, pores having a pore diameter of 40 µm or more are surely provided and pores having a pore diameter of 10 µm or less can be reduced, enabling to capture PMs at a high capturing efficiency while suppressing an increase in the pressure loss. If the average pore diameter of the pores an the cell walls is less than 15 µm, the proportion of pores having a pore diameter of 10 µm or less increases, possibly failing to improve the capturing efficiency. If the average pore diameter of the pores in the cell walls is more than 25 µm, since the pore diameter is too large, PM capturing efficiency is less likely to improve.

The honeycomb filter of the embodiments of the present invention preferably has a peripheral coat layer formed on the periphery thereof.

The periphery coat layer functions to protect cells inside thereof from mechanical damage. Thus, a honeycomb filter having excellent mechanical characteristics such as compression strength is obtained.

In the honeycomb filter of the embodiments of the present invention, in the cross section perpendicular to the longitudinal direct ion of the cells forming the honeycomb filter, preferably, the first exhaust gas introduction cells, the second exhaust gas introduction cells, and the exhaust gas emission cells each have a uniform cross sectional shape except for the plugged portion in a direction perpendicular to the longitudinal direction of the cells thoroughly from the end at the exhaust gas introduction side to the end at the exhaust gas emission side, the cross sectional shape of the first exhaust gas introduction cells is different from the cross sectional shape of the second exhaust gas introduction cells, and the cross sectional shape of the exhaust gas emission cells is different from the cross sectional shape of the first exhaust gas introduction cells. Here, "different" means "not congruent," but encompasses "similar." In other words, if the cross sectional shapes are similar to each other, the cross sectional shapes are considered different from each other.

Each first exhaust gas Introduction cell itself has a uniform cross sectional shape at any cross section thereof, each second exhaust gas introduction cell itself has a uniform cross sectional shape at any cross section thereof, and each exhaust gas emission cell has a uniform, cross sectional shape at any cross section thereof. Each first exhaust gas introduction cell has a different cross sectional shape from each second exhaust gas introduction cell. Each exhaust gas emission cell has a different cross sectional shape from each first exhaust gas introduction cell.

The honeycomb filter of the embodiments of the present invention preferably has the following structure. In the cross section perpendicular to the longitudinal direction of the cells, a cell unit having a cell structure described below is two-dimensionally repeated, where the first exhaust gas introduction cells and the second exhaust gas introduction cells surrounding each exhaust gas emission cell in the unit are shared between adjacent cell units.

cell structure: each exhaust gas emission cell is adjacently surrounded fully by the exhaust gas introduction cells across the porous cell walls, the exhaust gas introduction cells including first exhaust gas introduction cells and second exhaust gas introduction cells each having a larger cross sectional area than each first exhaust gas introduction cell in a direction perpendicular to the longitudinal direction of the cells, and each exhaust gas emission cell has an equal or larger cross sectional area than each second exhaust gas introduction cell in a direction perpendicular to the longitudinal direction of the cells, and the exhaust gas introduction cells and the exhaust gas emission cells have the following feature A or B in the cross section perpendicular to the longitudinal direction of the cells:

A: the exhaust gas introduction cells and the exhaust gas emission cells are each polygonal, and a side forming the cross sectional shape of each first exhaust gas introduction cell faces one of the exhaust gas emission cells, a side forming the cross sectional shape of each second exhaust gas introduction cell faces one of the exhaust gas emission cells, and the side of the first exhaust gas introduction cell is longer than the side of the second exhaust gas introduction cell, or a side forming the cross sectional shape of each first exhaust gas introduction cell faces one of the exhaust gas emission cells, and none of the sides forming the cross sectional shape of each second exhaust gas introduction cell faces the exhaust gas emission cells;

B: the exhaust gas introduction cells and the exhaust gas emission cells are each in a shape formed by a curved line, and the thickness or the cell walls separating the first exhaust gas introduction cells and the exhaust gas emission cells is smaller than the thickness of the cell walls separating the second exhaust gas introduction cells and the exhaust gas emission cells.

Such a honeycomb filter is preferable because the two-dimensional repetition of the cell unit forms a filter having a large capacity. The filter has an outer wall, and the cell units naturally do not spread outside the outer wall. The cell units are cut out properly to be fit into the shape of the outer wall.

The embodiments will new be described with reference to the accompanying drawings, wherein like reference numerals designate corresponding or identical elements throughout the various drawings.

The present invention is not limited to those embodiments, and may be modified within a scope not changing the gist of the present invention.

First Embodiment

The following will discuss a honeycomb filter according to the first embodiment of the present invention.

The honeycomb filter according to the first embodiment of the present invention includes a plurality of honeycomb fired bodies. Each honeycomb fired body includes exhaust gas emission cells each having an open end at an exhaust gas emission side and a plugged end at an exhaust gas introduction side, and exhaust gas introduction cells each having an open end at the exhaust gas introduction side and a plugged end at the exhaust gas emission side, the exhaust gas introduction cells including first exhaust gas introduction cells and second exhaust gas introduction cells, and has an outer wall en the periphery thereof. The honeycomb fired bodies are combined with one another by adhesive layers residing therebetween.

In terms of the cells other than the cells adjacent to the outer wall, the exhaust gas emission cells are each adjacently surrounded fully by the first exhaust gas introduction cells and the second exhaust gas introduction cells across the porous cell walls.

In the cross section perpendicular to the longitudinal direction of the cells, each second exhaust gas introduction cell has a larger cross sectional area than each first exhaust gas introduction cell, and each exhaust gas emission cell has the same cross sectional area as each second exhaust gas introduction cell. In other words, the exhaust gas emission cells have a larger average cross sectional area than the exhaust gas introduction cells in a direction perpendicular to the longitudinal direction of the cells, and the total volume of the exhaust gas introduction cells is larger than the total volume of the exhaust gas emission cells.

In the cross section, perpendicular to the longitudinal direction of the cells, the exhaust gas emission cells and the exhaust, gas introduction cells are each polygonal, and a side facing one exhaust gas emission cell among the sides forming the cross sectional shape of the first exhaust gas introduction cell is longer than a side facing one exhaust gas emission cell among the sides forming the cross sectional shape of the second exhaust gas introduction cell.

The cells adjacent to the outer wall include the first exhaust gas introduction cells and the exhaust gas emission cells arranged alternately with the first exhaust gas introduction cells. Each exhaust gas emission cell has a larger cross sectional area than each first exhaust gas introduction cell in a direction perpendicular to the longitudinal direction of the cells.

Specifically, the arrangement of two first exhaust gas introduction cells, one second exhaust gas introduction cell, and one exhaust gas emission cell is two-dimensionally repeated. Here, since the cross sectional areas thereof have the above relationships, the exhaust gas emission cells have a larger average cross sectional area than the exhaust gas introduction cells, and the total volume of the exhaust gas introduction cells is larger than the total volume of the exhaust gas emission cells.

The outer wall has corner portions. In the exhaust gas introduction cells and the exhaust gas emission cells adjacent to the outer wall, a side, which contacts the outer wall, is straight and parallel to a side corresponding to an outer periphery of the outer wall, and the exhaust gas emission cells adjacent to the outer wall each have a shape partially deformed in a manner that the thickness of the outer wall except for the corner portions is substantially uniform.

The exhaust gas introduction cells and the exhaust gas emission cells each have a uniform cross sectional shape except for the plugged portion, in a direction perpendicular to the longitudinal direction of the cells thoroughly from the end at the exhaust gas introduction side to the end at the exhaust gas emission side.

According to the pore structure of cell walls of the honeycomb filter according to the first embodiment of the present invention, the porosity is 55 to 70%, the proportion of pores having a pore diameter of 40 μm or more is 10% or more, and the proportion of pores having a pore diameter of 10 μm or less is 10% or less.

The cell walls have a porosity of preferably 55 to 65%, and more preferably 57 to 63%. In the pore diameter distribution of the cell walls, the proportion of pores having a pore diameter of 40 μm or more is preferably 12% or more, and the proportion of pores having a pore diameter of 10 μm or less is 8% or less.

Figure 8:
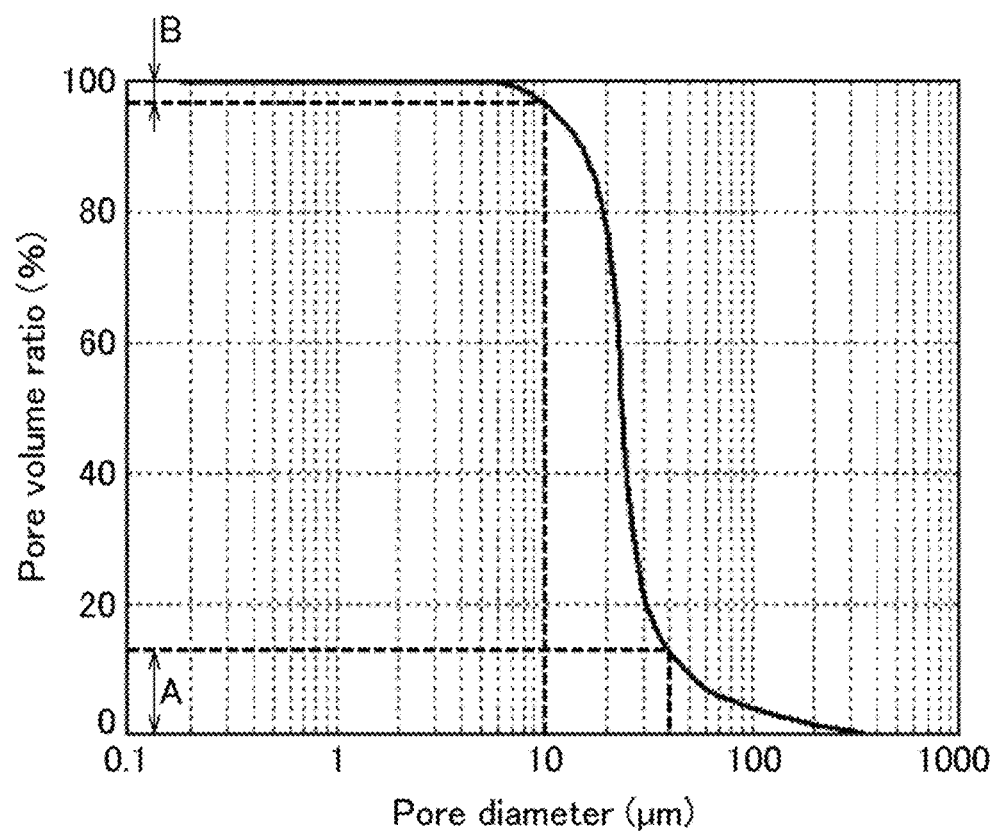
FIG. 8 is a graph showing one example of a pore diameter distribution of cell walls in the honeycomb filter according to the embodiment of the present invention.

FIG. 8 is graph showing one example of a pore diameter distribution of cell walls in the honeycomb filter according to the embodiment of the present invention. The pore diameter (μm) is logarithmically plotted on the X axis and the proportion of the integrated pore volume for each pore diameter in the total pore volume is plotted on the T axis as the pore volume ratio (%).

In the graph, the proportion or pores having a pore diameter of 40 μm or more is indicated by A (10% or more) and the proportion of pores having a pore diameter of 10 μm or less is indicated by B (10% or less).

The pore diameter distribution is measured, for example, using AutoPore IV9510 (Shimadzu Corporation). In the measurement, the contact angle is set to 130 degrees and the surface tension is set to 485 mN/m.

FIG. 1 is a perspective view schematically illustrating one example of the honeycomb filter according to the first embodiment of the present invention.

Figure 2B:
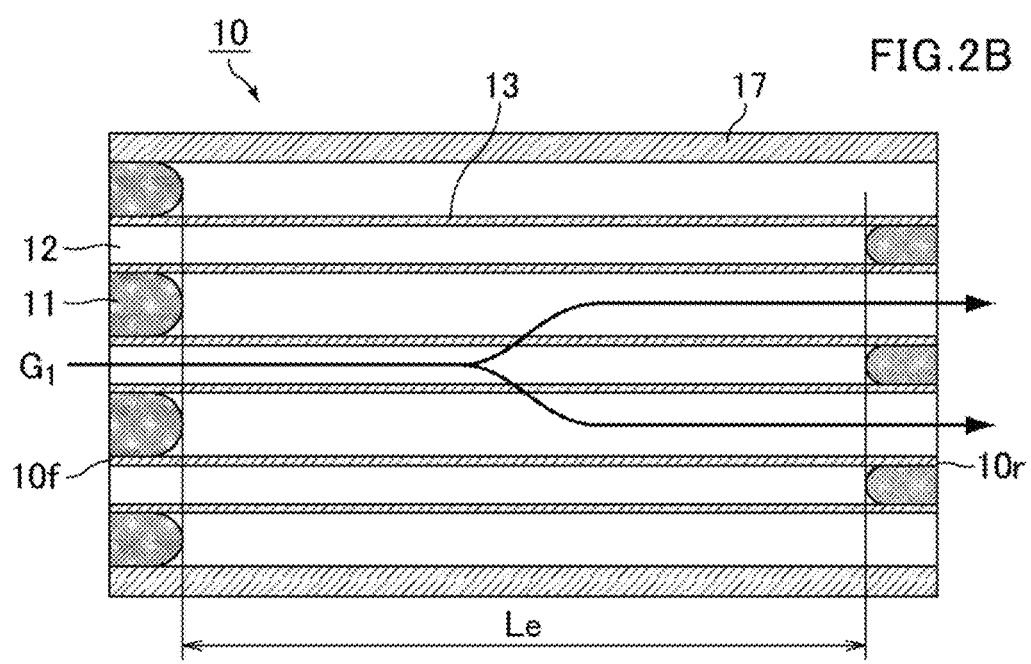
FIG. 2B is an A-A line cross sectional view of the honeycomb fired body in FIG. 2A.

FIG. 2A is a perspective view schematically illustrating one example of the honeycomb fired body forming the honeycomb filter shown in FIG. 1. FIG. 2B is an A-A line cross sectional view of the honeycomb fired body shown in FIG. 2A.

The honeycomb filter 20 shown in FIG. 1 includes a ceramic block 18 formed by combining a plurality of honeycomb fired bodies 10 with an adhesive layer 15 residing therebetween, and has a periphery coat layer 16 for preventing leakage of emission gas on the periphery of the ceramic block 18. The periphery coat layer 16 may be optionally formed.

Such a honeycomb filter including combined honeycomb fired bodies is also referred to as an aggregated honeycomb filter.

The honeycomb fired body 10 has a rectangular pillar shape, and is roundly cornered at the corner portions in end faces thereof as shown in FIG. 2A. This prevents thermal stress concentration at the corner portions to thereby present occurrence of damages such as cracks. The corner portions each may be chamfered in a manner to have a shape formed by straight lines.

In the honeycomb filter 20 according to the first embodiment, the exhaust gas emission cells each have an open end at the exhaust gas emission side and a plugged end at the exhaust gas introduction side, and the exhaust gas introduction cells each have an open end at the exhaust gas introduction side and a plugged end at the exhaust gas emission side. The plug is preferably made of the same material as the material of the honeycomb fired body.

In the honeycomb fired body 10 shown in FIG. 2A and FIG. 2B, the exhaust gas emissive cells 11 having an octagonal cross section are each adjacently surrounded fully by the first exhaust gas introduction cells 12 each having a square cross section and the second exhaust gas introduction cells 14 each having an octagonal cross section across porous cell walls therebetween. The first exhaust gas introduction cells 12 and the second exhaust gas introduction cells 14 are alternately arranged around each exhaust gas emission cell 11. Each second exhaust gas introduction cell 14 has a larger cross sectional area than each first exhaust gas introduction cell 12, and each exhaust gas emission cell 11 has the same cross sectional area as each second exhaust gas introduction cell 14. An outer wall 17 is forced on the periphery of the honeycomb fired body 10. Cells adjacent to the outer wall 17 include exhaust gas emission cells 11A and 11B and first exhaust gas introduction cells 12A.

Each second exhaust gas introduction cell 14 and exhaust gas emission cell 11 have octagonal cross sections, and the cross sections are congruent with each other.

In the exhaust gas emission cells 11A and 11B and the exhaust gas introduction cells 12A adjacent to the outer wall 17 in the honeycomb filter 20 according to the present embodiment, a side, which contacts the outer wall 17, is straight and parallel to a side corresponding to an outer periphery of the outer wall 17 in a manner that the thickness of the outer wall 17 is uniform except for the corner portions in the cross section perpendicular to the longitudinal direction of the cells.

The cross sections of the exhaust gas emission cells 11A adjacent to the outer wall 17 are partially cut so that the cross sectional shapes are changed from octagons to hexagons. The cross sectional shape of the first exhaust gas introduction cells 12A may be in a partially cut shape but is preferably congruent with the cross sectional shape of the first exhaust gas introduction cells 12.

The cross sections of second exhaust gas introduction cells 11B at the corner portions of the honeycomb fired body 10 have been changed from octagon to substantial pentagon including chamfered portions 110B formed by curved lines. The chamfered portions 110B of the exhaust gas emission cells 11B illustrated in FIG. 2A are chamfered to be curved but may be linearly chamfered.

The aforementioned structure enables to not only enhance the strength of the honeycomb fired body by the outer wall but also further reduce the partial variation in the volume ratio between the exhaust gas emission cells and the exhaust gas introduction cells in the honeycomb fired body. Consequently, the uniform flow of exhaust gas is improved. In the vicinity of the outer wall, exhaust gas smoothly flows into the first exhaust gas introduction cells 12 and the cell wall and outer wall effectively function as a filter, so that the pressure loss is reduced.

In the honeycomb fired body 10, the exhaust gas emission cells 11A and 11B and the exhaust gas introduction cells 2A are alternately arranged along the outer wall 17, and the exhaust gas emission cells 11 is orderly arranged inside the cells along the outer wall 17 with the first exhaust gas introduction cells 12 and the second exhaust gas introduction cells residing therebetween. As above, the exhaust gas emission cells 11, the first exhaust gas introduction cells 12, and the second exhaust gas introduction cells 14 are arranged in a significantly ordered manner.

Each exhaust gas emission cell 11 and each second exhaust gas introduction cell 14 have the same octagonal shape. The octagon is point-symmetry with respect to the center of gravity. In the octagon, all hypotenuse sides (14a in FIGS. 6A to 6C) have the same length, and all vertical or horizontal sides (14b in FIGS. 6A to 6C) have the same length. Moreover, four first sides (the hypotenuse aides) and four second sides (the vertical or horizontal sides) are alternately arranged. The first sides and the second sides form an angle of 135°.

The term "hypotenuse side" generally refers to the longest side that is opposite to the right angle in a right-angled triangle. However, for convenience for explanation, a "hypotenuse side" herein refers to a side such as the side 14a and the side 11b that has a certain angle, except for 90° and 0°, to below-mentioned four hypothetical segments. For differentiation from this term, the term "vertical or horizontal side" herein refers to a side such as the side 14b and the side 11a that is parallel to or vertical to the below-mentioned four hypothetical segments.

The hypothetical segments mentioned in the explanation of the terms "hypotenuse side" and "vertical or horizontal sides" refer to four hypothetical segments (the four segments form a square) that do not cross the cross sectional figure of the exhaust gas emission cell 11, among hypothetical segments that connect geometric centers of gravity of the respective cross sectional figures of the four second exhaust gas introduction cells arranged around the exhaust gas emission cell 11.

Each first exhaust gas introduction cell 12 has a square cross section.

In the cross section of the three kinds of cells which are adjacent to each other, namely, the exhaust gas emission cell 11, the second exhaust gas introduction cell 14, and the first exhaust gas introduction cell 12, the side 11a facing the first exhaust gas introduction cell 12 across the cell wall 13 among the sides of the octagonal exhaust gas emission cell 11 is parallel to the side 12a fusing the exhaust gas emission cell 11 across the cell wall 13 among the sides of the square first exhaust gas introduction cell 12.

Also, the side 11b facing the octagonal second exhaust gas introduction cell 14 across the cell wall 13 among the sides of the octagonal exhaust gas emission cells 11 is parallel to the side 14a facing the exhaust gas emission cell 11 across the cell wall 13 among the sides of the octagonal second exhaust gas introduction cell 14. Moreover, the side 12b facing the second exhaust gas introduction cell 14 across the cell wall 13 among the sides of the first exhaust gas introduction cell 12 is parallel to the side 14b facing the first exhaust gas introduction cell 12 across the cell wall 13 among the sides of the second exhaust gas introduction cell 14. Furthermore, the distances between the parallel sides of all the above pairs are the same (see FIGS. 6A to 6C). That is, the distance between the parallel sides 11a and 12a, the distance between the parallel sides 11b and 14a, and the distance between the parallel sides 12b and 14b are the same.

Additionally, the exhaust gas emission cells 11, the first exhaust gas introduction cells 12, and the second exhaust gas introduction cells 14 are arranged in a manner satisfying the conditions below.

Among the hypothetical, segments connecting the geometric centers of gravity of the octagonal shapes of the four second exhaust gas introduction cells 14 surrounding the exhaust gas emission cell 11, an intersection of the two segments crossing the octagonal shape region of the exhaust gas emission cell 11 is identical with the geometric center of gravity of the octagonal cross section of the exhaust gas emission cell 11.

Moreover, among the hypothetical segments connecting the geometric centers of gravity of the octagonal shapes of the four second exhaust gas introduction cells 14, the four segments not crossing the octagonal shape region of the exhaust gas emission cell 11 forms a square, and midpoints of the respective sides of the square are identical with the geometric centers of gravity of the respective square shapes of the four first exhaust gas introduction cells 12 surrounding the exhaust gas emission cell 11.

As described above, the octagonal exhaust gas emission cell 11 is adjacently surrounded by alternately arranged four pieces of the first square exhaust gas introduction cells 12 and four pieces of the second octagonal exhaust gas introduction cells 14 across the cell walls 13 to form a single unit. The unit is two-dimensionally repeated, where the first exhaust gas introduction cells 12 and the second exhaust gas introduction cells 14 in the unit are shared between adjacent cell units, to form a honeycomb filter. Since the units share the first exhaust gas introduction cells 12 and the second exhaust gas introduction cells 14, the first exhaust gas introduction cell 12 and the second exhaust gas introduction cell 14, that adjoin the exhaust gas emission cell 11 across the cell walls 13, also adjoin the exhaust gas emission cell 11 in the adjacent unit across the cell wall 13.

Figure 7:
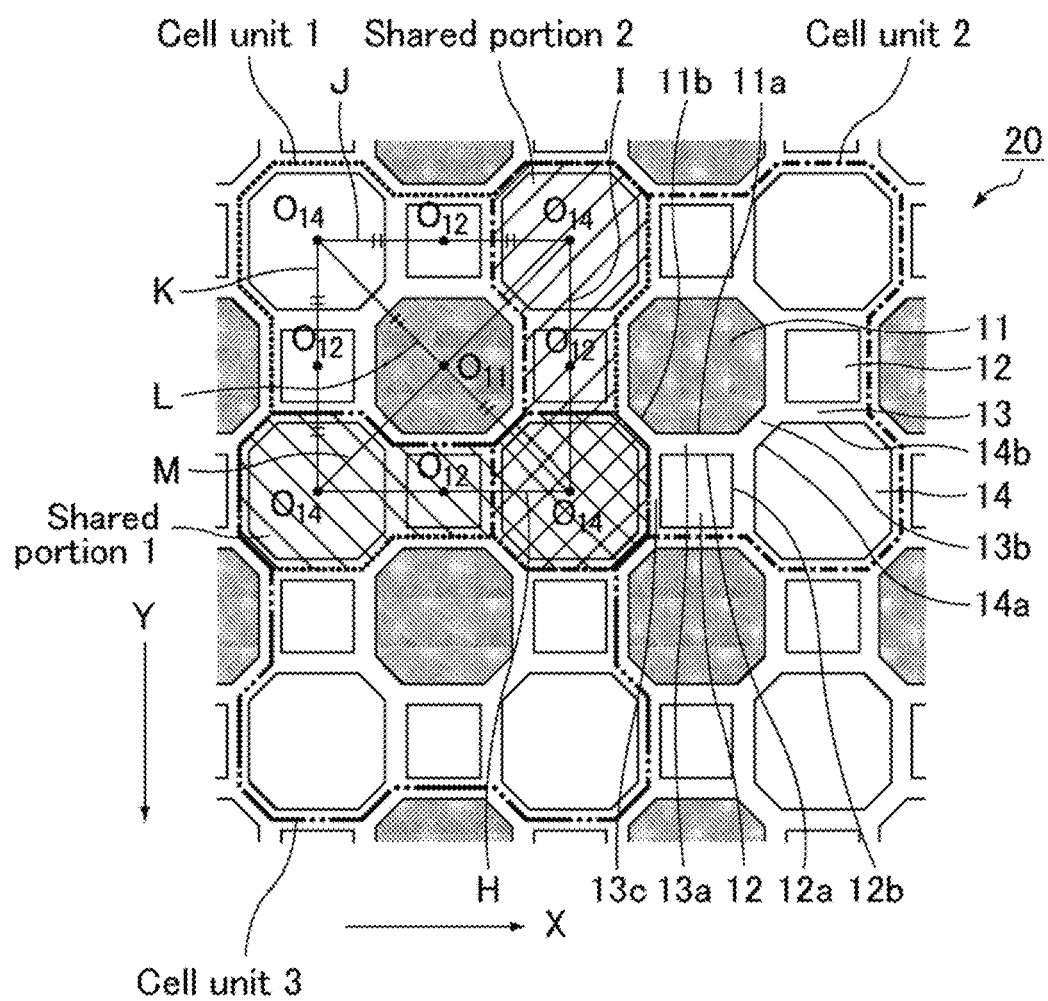
FIG. 7 is an enlarged cross sectional view perpendicular to the longitudinal direction of the honeycomb filter.

FIG. 7 is an enlarged cross sectional view perpendicular to the longitudinal direction of the honeycomb filter. FIG. 7 illustrates how each cell unit (cell structure) is two-dimensionally, i.e. in X and Y directions shown in FIG. 7, repeated in the case where the second exhaust gas introduction cells 14 and the exhaust gas emission cells 11 are octagonal, the first exhaust gas introduction cells 12 are square in the cross section of the cells, and the aforementioned conditions are satisfied, and also illustrates now the first exhaust gas introduction cells 12 and the second exhaust gas introduction cells 14 are shared between the cell units (cell structure).

A cell unit 1, a cell unit 2, and a cell unit 3 each have a structure in which the exhaust gas emission cell 11 is fully surrounded by alternately arranged four pieces of the first exhaust gas introduction cells 12 and four pieces of the second exhaust gas introduction calls 14 across the cell walls 13 in a manner satisfying the aforementioned conditions. The cell unit 2 has the same structure as that of the cell unit 1. The cell unit 2 is adjacent to the cell unit 1 in the X direction while sharing one piece of the first exhaust gas introduction cell 12 and two pieces of the second exhaust gas introduction cells 14 with the cell unit 1. The cells shared between the cell unit 1 and the cell unit 2 are depicted as "shared portion 2" in FIG. 7. The cell unit 3 has the same structure as that of the cell unit 1. The cell unit 3 is adjacent to the cell unit 1 in the Y direction while sharing one piece of the first exhaust gas introduction cell 12 and two pieces of the second exhaust gas introduction cells 12 with the cell unit 1. The cells shared between the cell unit 1 and the cell unit 3 are depicted as "shared portion 1" in FIG. 7.

Meanwhile, FIG. 7 shows four segments by H, I, J, and K that do not cross the octagonal shape region of the exhaust gas emission cell 11, and hypothetical two segments L and M that cross the octagonal shape region of the exhaust gas emission cell 11, among hypothetical segments connecting the geometric centers of gravity of the respective octagonal shapes of the four pieces of the second exhaust gas introduction cells 14. The "shared portion 2" is depicted by cross-hatching with segments in the same direction as that of the segment M, end the "shared portion 1" is depicted, by cross-hatching with segments in the same direction as that of the segment L.

As shown in FIG. 7, an intersection of the two segments L and M is identical with the geometric center of gravity of the exhaust gas omission cell 11.

With regard to the cell shapes in the honeycomb filter 20 shown in FIGS. 1, 2A, 2B and 6A to 6C, the exhaust gas emission cells 11 and the second exhaust gas introduction cells 14, except for the exhaust gas emission cells 11A and 11B adjacent to the outer wall 17, each have an octagonal cross section, and the first exhaust gas introduction cells 12 and 12A each have a square cross section. However, the cross sectional shapes of the exhaust gas emission cells and the exhaust gas introduction cells of the present invention are not limited to the above shapes, and may be all square as mentioned below, or may be combinations of other polygons.

Moreover, the exhaust gas emission cells 11, the first exhaust gas introduction cells 12, and the second exhaust gas introduction cells 14, which are polygons in the cross section thereof, may be roundly cornered so that the vertex portions are formed by curved lines in the cross section.

Examples of the curved lines include curved lines obtained by dividing a circle into quarters, and curved lines obtained by dividing an ellipse into four equal parts linearly along the long axis and the axis perpendicular to the long axis. In particular, the vertex portions of the cells having a rectangular cross section are preferably formed by curved lines in the cross section. This prevents stress concentration at the corner portions, thereby preventing cracks in the cell walls.

Furthermore, the honeycomb filter 20 may partially include cells formed by curved lines such as a cell having a circle cross section.

The following description is not applicable to the exhaust gas emission cells 11A and 11B adjacent to the outer wall 17.

The cross sectional area of each first exhaust gas introduction cell 12 is preferably 20 to 50%, and more preferably 22 to 45% the rise of the cross sectional area of each second exhaust gas introduction cell 14.

In the honeycomb filter 20 shown in FIGS. 1, 2A, 2B, and 6A to 6C, the cross sectional area of each exhaust gas emission cell 11 is equal to the cross sectional area of each second exhaust gas introduction cell 14; however, the cross sectional area of each exhaust gas emission cell 11 may be larger than the cross sectional area of each second exhaust gas introduction cell 14.

The cross sectional area of each exhaust gas emission cell 11 is preferably 1.05 to 1.5 times the size of the cross sectional area of each second exhaust gas introduction cell 14.

Moreover, the side 12a facing the exhaust gas emission cell 11 among the aides forming the cross sectional shape of the first exhaust gas introduction cell 12 is longer than the side 14a facing the exhaust gas emission cell 11 among the sides forming the cross sectional shape of the second exhaust gas introduction cell 14. The sides 12a and 14a are sides facing the exhaust gas emission cell 11 according to the aforementioned definition of the embodiments of the present invention.

The ratio of the length of the side 14a of the second exhaust gas introduction cell 14 to the length of the side 12a of the first exhaust gas introduction cell 12 (length of the side 14a/length of the side 12a) is not particularly limited, and is preferably not more than 0.8, more preferably not more than 0.7, and still more preferably not more than 0.5.

As shown in FIG. 2B, exhaust gas $G_1$ (exhaust gas is represented by an arrow $G_1$ which shows the flow of exhaust gas in FIG. 2B) having flowed into the first exhaust gas introduction cells 12 or the second exhaust gas introduction cells 14 inevitably passes through the cell walls 13 which separates the exhaust gas emission cells 11 and the respective first exhaust gas introduction cells 12 or the respective second exhaust gas introduction cells 14, and then flows out of the exhaust gas emission cells 11. Upon passage of exhaust gas $G_1$ through the cell walls 13, PMs and the like in the exhaust gas are captured so that the cell walls 13 function as filters.

The exhaust gas emission cells 11, the first exhaust gas introduction cells 12, and the second exhaust gas introduction cells 14 allow flow of gas such as exhaust gas as described above. For flow of exhaust gas in the direction shown in FIG. 2B, an end at a first end face 10f of the honeycomb fired body 10 (the end on the side at which the exhaust gas emission cells 11 are plugged) is referred to as an exhaust gas introduction side end, an end at a second end face 10r of the honeycomb fired body 10 (the end on the side at which the first exhaust gas introduction cells 12, and the second exhaust gas introduction cells 14 are plugged) is referred to as an exhaust gas emission side end.

The honeycomb filter 20 having the aforementioned structure can not only maintain high capturing efficiency to reduce the initial pressure loss as compared with conventional honeycomb filters but also can reduce the rate of increase in the pressure loss even after accumulation of a considerable amount of PMs on the cell walls as explained in the effects of the honeycomb filter according to the embodiments of the present invention. The honeycomb filter 20 can significantly reduce the pressure loss throughout the use iron the initial stage to after accumulation of PMs in close to the limit amount.

In the honeycomb filter 20 having the structure illustrated in FIGS. 2A and 2B, since the thickness or the outer wall 17 is uniform over the whole length, the strength of the honeycomb fired body is enhanced by the outer wall end the partial variation in the volume ratio is further reduced between the exhaust gas emission cells and the exhaust gas introduction cells in the honeycomb fired body. Consequently, the uniform flow of exhaust gas is improved so that the pressure loss can be reduced.

In terms of the cells adjacent to the outer wall 17, since the exhaust gas emission cells 11A and 11B are each adjacent to the exhaust gas introduction cell 12A, exhaust gas can pass through the inside of the outer wall 17, which means that part of the outer wall 17 can be used as a filter. As a result, the pressure loss is further reduced.

Moreover, since the outer wall 17 is chamfered, stress is prevented from concentrating on the corner portions of the honeycomb fired body 10, so that cracks hardly occur in the corner portions of the honeycomb fired body 10. When the cross sectional shape of the exhaust gas emission cell 11B positioned at the corner portion is a pentagon formed by straight lines, not having the chamfered portion 110B formed by curved lines, the exhaust gas emission cell 11B positioned close to the corner portion of the honeycomb fired body 10 is likely to have a stress concentrated thereon to easily have cracks. In the honeycomb filter 20, however, since the exhaust gas emission cells 11B each have the chamfered portion 110B, cracks hardly occurs therein.

The honeycomb filter 20 according to the first embodiment includes a plurality of honeycomb fired bodies 10. Examples of the material for the honeycomb fired bodies 10 include carbide ceramics such as silicon carbide, titanium carbide, tantalum carbide, and tungsten carbide; nitride ceramics such as aluminum nitride, silicon nitride, boron nitride, and titanium nitride; oxide ceramics such as alumina, zirconia, cordierite, mullite, and aluminum titanate; and silicon-containing silicon carbide, and the like. Silicon carbide or silicon-containing silicon carbide is preferable among the examples as they are excellent in heat resistance, mechanical strength, thermal conductivity and the like.

Meanwhile, the silicon-containing silicon carbide is a mixture of silicon carbide and silicon metal, and is preferably silicon-containing silicon carbide including 60 wt % or more of silicon carbide.

The thickness of the cell walls separating the cells is preferably uniform at any part in the honeycomb fired body 10 forming the honeycomb filter 20 according to the first embodiment. The thickness of the cell walls is preferably 0.10 to 0.46 mm, and more preferably 0.12 to 0.35 mm. The thickness of the outer wall 11 is preferably 0.10 to 0.50 mm.

Meanwhile, the thickness of the cell wall is a value measured as the thickness D shown in FIG. 3B based on the aforementioned definition.

The thickness of the plugged portion is preferably 1.0 to 5.0 mm.

The average pore diameter of pores in the cell walls is preferably 15 to 25 μm in the honeycomb fired body 10 forming the honeycomb filter 20 according to the first embodiment.

The number of the cells per unit area is preferably 31 to 62 pcs/cm$^2$ (200 to 400 pcs/inch$^2$) in the cross section of the honeycomb fired body 10.

The honeycomb filter 20 according to the embodiments of hive present invention is formed by combining, with an adhesive layer residing therebetween, a plurality of the honeycomb fired bodies each having an outer wall on the periphery thereof. An adhesive layer that combines the honeycomb fired bodies is prepared by applying an adhesive paste that contains an inorganic binder and inorganic particles, and drying the adhesive paste. The adhesive layer may further contain at least one of an inorganic fiber and a whisker.

The adhesive layer preferably has a thickness of 0.5 to 2.0 mm.

The honeycomb filter according to the first embodiment of the present invention may have a periphery coat layer on the periphery thereof. The material of the periphery coat layer is preferably the same as the materials of the adhesive layer.

The periphery coat layer preferably has a thickness of 0.1 to 3.0 mm.

The following will discuss a method of manufacturing the honeycomb filter according to the first embodiment of the present invention.

The method described below uses a silicon carbide as ceramic powder.

(1) A molding process for manufacturing a honeycomb molded body is performed by extrusion molding a wet mixture containing ceramic powder and a binder.

Specifically, silicon carbide powders having different average particle sizes serving as ceramic powder, an organic binder, a pore-forming material, a liquid plasticizer, a lubricant, and water are mixed to prepare a wet mixture for manufacturing a honeycomb molded body.

Examples of the pore-forming material include balloons that are fine hollow spheres including oxide-based ceramics, spherical acrylic particles, graphite, and starch.

The balloons are not particularly limited, and examples thereof include alumina balloon, glass micro balloon, shirasu balloon, fly ash balloon (FA balloon), and mullite balloon. Alumina balloon is preferable among these.

To provide a honeycomb filter having a porosity of 55% or more but not more than 70% in which a proportion of pores having a pore diameter of 40 μm or more is 10% or more and a proportion of pores having a pore diameter of 10 μm or less is 10% or less, preferably a pore-forming material having an average pore diameter of 30 to 50 μm is mixed with silicon carbide powder as ceramic powder at a ratio of 10 to 25 wt %. The pore-forming material more preferably has a pore diameter of 35 to 45 μm. The pore diameter is still more preferably 1.5 to 2.5 times as large as the average pore diameter of the aimed honeycomb filter. The proportions of the pore-forming materials having a pore diameter of 20 μm or less and those having a pore diameter of 60 μm or more are each preferably 5% or less. The mixing ratio of the pore-forming material to the silicon carbide powder as ceramic powder is more preferably 15 to 20 wt %.

Then, the wet mixture is charged into an extrusion molding machine and extrusion-molded to manufacture honeycomb molded bodies in predetermined shapes.

Here, a honeycomb molded body is manufactured with a die that can make a cross sectional shape having the cell structure (shapes and arrangement of the cells) shown in FIGS. 2A and 2B.

(2) The honeycomb molded bodies are cut at a predetermined length and dried with use of a drying apparatus such as a microwave drying apparatus, a hot-air drying apparatus, a dielectric drying apparatus, a reduced-pressure drying apparatus, a vacuum drying apparatus, or a freeze drying apparatus. Then, predetermined cells are plugged by filling the cells with a plug material paste to be a plug material (plugging process).

Here, the wet mixture may be used as the plug material paste.

(3) Then, the honeycomb molded body is heated at 300° C. to 650° C. in a degreasing furnace to remove organic matters in the honeycomb molded body (degreasing process). The degreased honeycomb molded body is transferred to a firing furnace and fired at 2000° C. to 2200° C. (firing process). In this manner, the honeycomb fired body having the configuration as shown in FIGS. 2A and 2B is manufactured.

The plug material paste filled into the end of the cells is fired by heating to be a plug material.

Conditions for cutting, drying, plugging, degreasing, and firing may be conditions conventionally used for manufacturing honeycomb fired bodies.

(4) A plurality of the honeycomb fired bodies are stacked in series with the adhesive paste residing therebetween on a support table to combine the honeycomb fired bodies (combining process) so that a honeycomb aggregate body including the plurality of stacked honeycomb fired bodies is manufactured.

The adhesive paste contains, for example, an inorganic binder, an organic binder, and inorganic particles. The adhesive paste may further contain inorganic fibers and/or whisker.

Examples of the inorganic particles in the adhesive paste include carbide particles, nitride particles, and the like. Specific examples thereof include inorganic particles made from silicon carbide, silicon nitride, boron nitride, and the like. Each of these may be used alone, or two or more of these may be used in combination. Among the inorganic particles, silicon carbide particles are preferable due to their superior thermal conductivity.

Examples of the inorganic fibers and/or whisker in the adhesive paste include inorganic fibers and/or whisker made from silica-alumina, mullite, alumina, and silica. Each of these may be used alone or two or more of these may be used in combination. Alumina fibers are preferable among the inorganic fibers. The inorganic fibers may be biosoluble fibers.

Furthermore, balloons that are fine hollow spheres including oxide-based ceramics, spherical acrylic particles, graphite, or the like may be added to the adhesive paste, if necessary. The balloons are not particularly limited, and examples thereof include alumina balloon, glass micro balloon, shirasu balloon, fly ash balloon (FA balloon), mullite balloon, and the like.

(5) The honeycomb aggregate body is then heated to solidify the adhesive paste, whereby a rectangular pillar-shaped ceramic block is manufactured.

The heating and solidifying of the adhesive paste may be performed under conditions that have been conventionally employed for manufacturing honeycomb filters.

(6) The ceramic block is subjected to cutting (cutting process).

Specifically, the periphery of the ceramic block is cut with a diamond cutter, whereby a ceramic block whose periphery is cut into a substantially round pillar shape is manufactured.

(7) A peripheral coating material paste is applied to the peripheral face of the substantially round pillar-shaped ceramic block, and is dried and solidified to form a periphery coat layer (periphery coat layer forming process).

The adhesive paste may be used as the peripheral coating material paste. Alternatively, the peripheral coating material paste may be a paste having a composition different from that of the adhesive paste.

The periphery coat layer is not necessarily formed and may be formed, if necessary.

The peripheral shape of the ceramic block is adjusted by the periphery coat layer, and thereby a round pillar-shaped honeycomb filter is obtained.

The honeycomb filter including the honeycomb fired bodies can be manufactured through the aforementioned processes.

Although the honeycomb filter having a predetermined shape is manufactured by cutting, the honeycomb filter may also be allowed to have a predetermined shape such as round-pillar shape as follows: honeycomb fired bodies of a plurality of shapes, each having an outer wall on the periphery thereof, are manufactured in the honeycomb fired body manufacturing process, and then the honeycomb fired bodies of a plurality of shapes are combined with one another with the adhesive layer residing therebetween. In this case, the cutting process can be omitted.

Hereinafter, the effects of the honeycomb filter according to the first embodiment of the present invention are listed.

(1) The honeycomb filter according to the embodiment includes cell walls having a porosity of 55% or more but not more than 70%, wherein the pore volume of pores having a pore diameter of 40 µm or more occupies 10% or more of the total pore volume, and the pore volume of pores having a pore diameter of 10 µm or less occupies 10% or less of the total volume. Accordingly, a large amount of a catalyst can be used in the coating and exhaust gas having flowed into exhaust gas introduction cells easily passes through cell wall to flow into exhaust gas emission cells. Moreover, a decrease in the proportion of pores having a small pore diameter enables to avoid a local increase in the passage rate of exhaust gas passing through the cell walls, enhancing the capturing efficiency. In addition, since the filtration area is large, such as effect is further enhanced.

(2) The honeycomb filter according to the embodiment can not only reduce the initial pressure loss as compared with conventional honeycomb filters but also reduce the rate of increase in the pressure loss even after accumulation of a considerable amount of PMs on the cell walls. The honeycomb filter can significantly reduce the pressure loss throughout the use from the initial stage to after accumulation of PMs in close to the limit amount.

(3) In the honeycomb filter according to the present embodiment, the cross sectional area of each first exhaust gas introduction cell may be 20 to 50% the size of the cross sectional area of each second exhaust gas introduction cell.

This setting of the cross sectional area ratio of the first exhaust gas introduction cell and the second exhaust gas introduction cell can provide difference between the resistance caused upon flexing of exhaust gas through the first exhaust gas introduction cells and the resistance caused upon flowing of exhaust gas through the second exhaust gas introduction cells, thereby enabling effective reduction of the pressure loss.

(4) In the honeycomb filter according to the present embodiment, the ratio of the length of the side of the second exhaust gas introduction cell facing the exhaust gas emission cell to the length of the side of the first exhaust gas introduction cell facing the exhaust gas emission cell may be not more than 0.8.

The aforementioned ratio of the length of the side of the first exhaust gas introduction cell to the length of the side of the second exhaust gas introduction cell enables easier passage of exhaust gas through the cell walls separating the exhaust gas emission cells and the first exhaust gas introduction cells, effective suppression of the initial pressure loss, and prevention of an increase in the rate of increase of the pressure loss after accumulation of PMs.

(5) In the honeycomb filter according to the present embodiment, the material of the honeycomb fired bodies may include silicon carbide or silicon-containing silicon carbide. Such a material enables to provide a honeycomb filter having excellent heat resistance.

(6) In the honeycomb filter according to the present embodiment, the thickness of the cell walls separating the cells may be uniform at any part.

This setting for the entire thickness of the cell walls enables to provide a honeycomb filter having the same effects at any part thereof.

(7) In the honeycomb filter according to the present embodiment, the thickness of the cell walls may be 0.10 to 0.46 mm.

The cell walls having the aforementioned thickness are sufficient for capturing PMs in exhaust gas, and also enable efficient suppression of increase in the pressure loss.

(8) In the honeycomb filter according to the present embodiment, the average pore diameter of poxes in the cell walls may be 15 to 25 μm in the honeycomb fired body forming the honeycomb filter.

The above average pore diameter of pores in the cell walls enables to capture PMs at a high capturing efficiency while suppressing an increase in the pressure loss.

(9) In the honeycomb filter according to the present embodiment, the exhaust gas introduction cells and the exhaust gas emission cells each have a uniform cross sectional shape except for the plugged portion in a direction perpendicular to the longitudinal direction of the cells thoroughly from the end at the exhaust gas introduction side to the end at the exhaust gas emission side.

Thus, the entire honeycomb filter can exert the same or similar effects so that disadvantages caused by local shape variations in the honeycomb filter can be prevented.

(10) In the honeycomb filter according to the present embodiment, cracks tend not to be caused by thermal shock that occurs upon burn-removal (regeneration) of accumulated PMs in the honeycomb filter.

In the honeycomb filter according to the present embodiment, the plugged portions provided at the end at the exhaust gas emission side, namely the plugged portions in the first exhaust gas introduction cells and the second exhaust gas introduction cells are present in vertical and horizontal rows. Each plugged portion has a width equal to or larger than the length of one side of the first exhaust gas introduction cell. In ordinary regeneration of honeycomb filters, heat burns firstly PMs accumulated at the exhaust gas introduction side of a honeycomb filter. Then, burning of PMs is transferred by exhaust gas flow to the emission side of the honeycomb filter so that all the PMs are burned. For this reason, positions closer to the emission side of the honeycomb filter are exposed to higher temperatures, and easily have temperature difference along the diameter direction of the honeycomb filter. Thus, cracks occur due to the thermal stress. Such cracks are prominent in the case where the cross sectional areas are different among the cells, and also in the case where the cross sections of the exhaust gas introduction cells where PMs accumulate have square cross section(s). In contrast, in the honeycomb filter according to the embodiment of the present invention, the plugged portions aligned in vertical and horizontal rows at the exhaust gas emission side function as thermally conductive layers and as layers for dissipating heat to outside. Thus, the temperature difference is small along the diameter direction at the end of the exhaust gas emission side of the honeycomb filter. This reduces the thermal stress to prevent occurrence of cracks. Moreover, in the honeycomb filter according to the present invention, the amount of the plug in the second exhaust gas introduction cells, in which a larger amount of PMs accumulate compared with the first exhaust gas introduction cells, is large due to the size of the cross sectional area, and thereby the thermal capacity of the plugged portions increase. Such plugged portions can prevent an increase in the temperature of the second exhaust gas introduction cells, where the heat of burning PMs is higher, even in consideration of each cell. This reduces the temperature difference in the diameter direction of the honeycomb filter, thereby presumably reducing the thermal stress to be caused.

Thus, the honeycomb fitter according to the present embodiment can prevent cracks during the regeneration even though it includes exhaust gas introduction cells having square cross sections.

(11) In the honeycomb filter according to the embodiment, the aforementioned structure enables to not only enhance the strength of the honeycomb fired body by the outer wall but also further reduce the partial variation in the volume ratio between the exhaust gas emission cells and the exhaust gas introduction cells in the honeycomb fired body. Consequently, the uniform flow of exhaust gas is improved so that the pressure loss can be reduced.

Hereinafter, examples are given for more specifically describing the first embodiment of the present invention. However, the present invention is not limited only to the examples.

Example 1

A mixture was obtained by mixing 40.6% by weight of a silicon carbide coarse powder having an average particle size of 22 μm, 17.4% by weight of a silicon carbide fine powder having an average particle size of 0.5 μm, and 10.6% by weight of an acrylic resin having an average particle size of 40 μm as a pore forming material. To the mixture were added 6.4% by weight of an organic binder (methylcellulose), 3.0% by weight of a lubricant (UNILUB, manufactured by NOF Corporation), 1.4% by weight of glycerin, and 20.6% by weight of water and then kneaded to prepare a wet mixture. Thereafter, the wet mixture was extrusion-molded (molding process).

This process provided a raw honeycomb molded body which had the same shape as that of the honeycomb fired body 10 shown in FIG. 2A and in which the cells were not plugged.

Next, the raw honeycomb molded body was dried using a microwave drying apparatus to obtain dried honeycomb molded bodies. Then, predetermined cells of the dried honeycomb molded body were plugged by filling the cells with a plug material paste.

Specifically, the cells are plugged in a manner that the end at the exhaust gas introduction side and the end at the exhaust gas emission side are plugged at the positions shown in FIG. 6A.

The wet mixture was used as the plug material paste. Thereafter, the dried honeycomb molded body, which has predetermined cells filled with the plug material paste, was dried with a drying apparatus again.

Subsequently, the dried honeycomb molded bodies after plugging of cells were decreased at 400° C. (decrease treatment) and then fired at 2200° C. (firing treatment) under normal pressure argon atmosphere for three hours.

In this manner a rectangular pillar-shaped honeycomb fired body was manufactured.

The measurement mentioned below of the length of sides and the cross sectional area can be performed by the aforementioned image analysis of an electron microscope photograph and by use of the aforementioned grain size distribution measurement software (Mac-View (version 3.5), produced by Mouretech Co. Ltd.).

The manufactured honeycomb fired body was the honeycomb fired body 10 shown in FIGS. 2A and 2B formed of a silicon carbide sintered body hawing a porosity of 63%, an average pore diameter of 23 μm, a size of 34.3 mm×34.3 mm×150 mm, the number of cells (cell density) of 290 pcs/inch$^2$, a thickness of cell walls of 0.33 mm, and a thickness of each plugged portion of 3 mm.

Figure 12A:
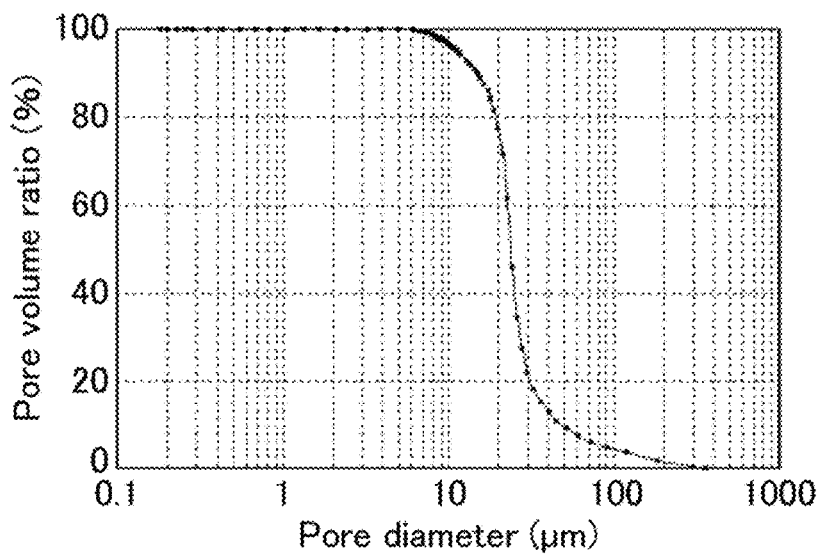
FIG. 12A is a graph showing a pore diameter distribution of a honeycomb filter of Example 1.

The pore distribution of the honeycomb fired body is shown in FIG. 12A. The proportion of pores having a pore diameter of 40 μm or more was 12.7% and the proportion of pores having a pore diameter of 10 μm or less was 3.3%.

The porosity and the pore diameter distribution were measured, for example, using AutoPore IV9510 (Shimadzu Corporation). In the measurement, the contact angle was set to 130 degrees and the surface tension was set to 485 mN/m.

Specifically, each base material was cut into a cube having a size of about 0.8 cm, ultrasonically cleaned in ion-exchanged water, and then dried to give a measurement sample. The measurement was performed in a measurement range of 0.2 to 500 μm. In the range of 100 to 500 μm, the measurement was performed for each pressure of 0.1 psia. In the range of 0.2 to 100 μm, the measurement was performed for each pressure of 0.25 psia.

The exhaust gas emission cell 11 was adjacently surrounded fully by the first exhaust gas introduction cells 12 and 12A and the second exhaust gas introduction cells 14 in the cross section perpendicular to the longitudinal direction of the manufactured honeycomb fired body 10.

The first exhaust gas introduction cells 12 and 12A had square cross sections, and the length of sides forming the cross sections of the first exhaust gas introduction cells 12 and 12A was 0.78 mm.

The second exhaust gas introduction cells 14 had octagonal cross sections. The length of the hypotenuse side of the second exhaust gas introduction cells facing the exhaust gas emission cell 11 was 0.39 mm, and the vertical or horizontal sides not facing the exhaust gas emission cell 11 were 0.97 mm.

In other words, the length of the side facing the exhaust gas emission cell 11 among the sides forming the cross sectional shape of the second exhaust gas introduction sell 14 was 0.40 times as long as the side facing the exhaust gas emission cell 11 among the sides forming the first exhaust gas introduction cell 12.

In the exhaust gas emission cells 11B at the four corners, the length of sides adjacent to the outer wall 17 was 1.15 mm, the length of the vertical or horizontal sides was 0.87 mm, the length of the hypotenuse sides was 0.39 mm, and the cross sectional area was 1.28 mm$^2$.

In the exhaust gas emission cells 11A, the length of the side adjacent to the outer wall 17 was 1.52 mm, the length of the vertical side parallel to the side adjacent to the outer wall 17 was 0.97 mm, the length of the horizontal side connected at a right angle to the side adjacent to the outer wall 17 was 0.87 mm, the length of the hypotenuse side was 0.39 mm, and the cross sectional area was 1.67 mm$^2$.

The exhaust gas emission cell 11 had an octagonal cross section, and the shape of the cross section was the same as that of the second exhaust gas introduction cell 14. The length of the hypotenuse side facing the second exhaust gas introduction cell 14 was 0.39 mm, and the vertical or horizontal sides facing the first exhaust gas introduction cells 12 was 0.97 mm.

The thickness of the outer wall 17 was 0.37 mm.

The cross sectional area of the first exhaust gas introduction cell 12 was 0.60 mm$^2$, and the cross sectional areas of the second exhaust gas introduction cell 14 and the exhaust gas emission cell 11 were both 2.15 mm$^2$. In other words, the cross sectional area of the first exhaust gas introduction cell 12 was 28% the size of the cross sectional area of the second exhaust gas introduction cell 14.

Moreover, the cross sectional area of the exhaust gas emission cell 11 was equal in size to the cross sectional area of the second exhaust gas introduction cell 14, and was larger than the cross sectional area of the first exhaust gas introduction cell 12.

The honeycomb fixed body was in a rectangular pillar shape that was roundly cornered at the corner portions in end faces thereof.

Next, a plurality of the honeycomb fired bodies were combined using an adhesive paste containing 30% by weight of alumina fibers having an average fiber length of 20 μm, 21% by weight of silicon carbide particles having an average particle size of 0.6 μm, 15% by weight of silica sol, 5.6% by weight of carboxymethyl cellulose, and 28.4% by weight of water. Subsequently, the adhesive layer was dried and solidified at 120° C. to form an adhesive layer, and thereby a pillar-shaped ceramic block was manufactured.

The periphery of the pillar-shaped ceramic block was cut out using a diamond cutter to manufacture a substantially round pillar-shaped ceramic block.

Subsequently, a sealing material paste having the same composition as that of the adhesive paste was applied to the peripheral face of the ceramic block. The sealing material paste was dried and solidified at 120° C. to form a periphery coat layer. In this manner a round pillar-shaped honeycomb filter was manufactured.

The diameter of the honeycomb filter car 143.8 mm, and the length in the longitudinal direction was 150 mm.

Comparative Example 1

A raw honeycomb molded body was obtained in the same molding process as in Example 1. Subsequently the raw honeycomb molded body was dried using a microwave drying apparatus to manufacture a dried honeycomb molded body. Then, predetermined cells of the dried honeycomb molded body were plugged by filling the cells with a plug material paste.

The positions of the cells to be plugged were changed from those in Example 1 as follows. The octagonal cells were all plugged in the end face corresponding to the end at the exhaust gas emission side, and the square cells were all plugged in the end face corresponding to the end at the exhaust gas introduction side so that the cells were alternately plugged in both of the end faces.

Consequently, a honeycomb molded body was obtained in which the end at the exhaust gas introduction side and the end at the exhaust gas emission side were plugged at the positions shown in FIG. 23B.

A honeycomb fired body 130 shown in FIGS. 23A and 23B were manufactured through the same processes as in Example 1 so that a honeycomb filter 120 was manufactured.

In the cross section of the manufactured honeycomb fired body 130 in the direction perpendicular to the longitudinal direction of the cells, all the exhaust gas introduction cells 132 had an octagonal cross section except for the exhaust gas introduction cells 132A and 132B which were adjacent to the outer wall 137.

The sides facing the exhaust gas emission cell 131 were vertical or horizontal sides having a length of 0.97 mm.

The sides facing other exhaust gas introduction cells 132, 132A, and 132B were hypotenuse sides having a length of 0.39 mm.

All the exhaust gas emission cells 131 and 131A had a square cross section. The length of the sides forming the cross sections of the exhaust gas emission cells 131 and 131A was 0.78 mm.

In the exhaust gas introduction cells 132B at the four corners, the length of sides adjacent to the outer wall 137 was 1.15 mm, the length of the vertical or horizontal sides was 0.87 mm, the length of the hypotenuse sides was 0.39 mm, and the cross sectional area was 1.28 mm$^2$.

In the exhaust gas introduction cells 132A, the length of the side adjacent to the outer wall 137 was 1.52 mm, the length of the vertical side parallel to the side adjacent to the outer wall 17 was 1.13 mm, the length of the horizontal line connected at a right angle to the side adjacent to the outer wall 17 was 0.97 mm, the length of the hypotenuse side was 0.39 mm, and the cross sectional area was 1.67 mm$^2$.

The thickness of the cell walls 133 was 0.33 mm, and the thickness of the outer walls was 0.37 mm.

The cross sectional area of the exhaust gas introduction cell 132 was 2.15 mm$^2$, and the cross sectional area of the exhaust gas emission cell 131 was 0.60 mm$^2$. In other words, the cross sectional area of the exhaust gas introduction cell 132 was larger than the cross sectional area of the exhaust gas emission cell 131.

Figure 9:
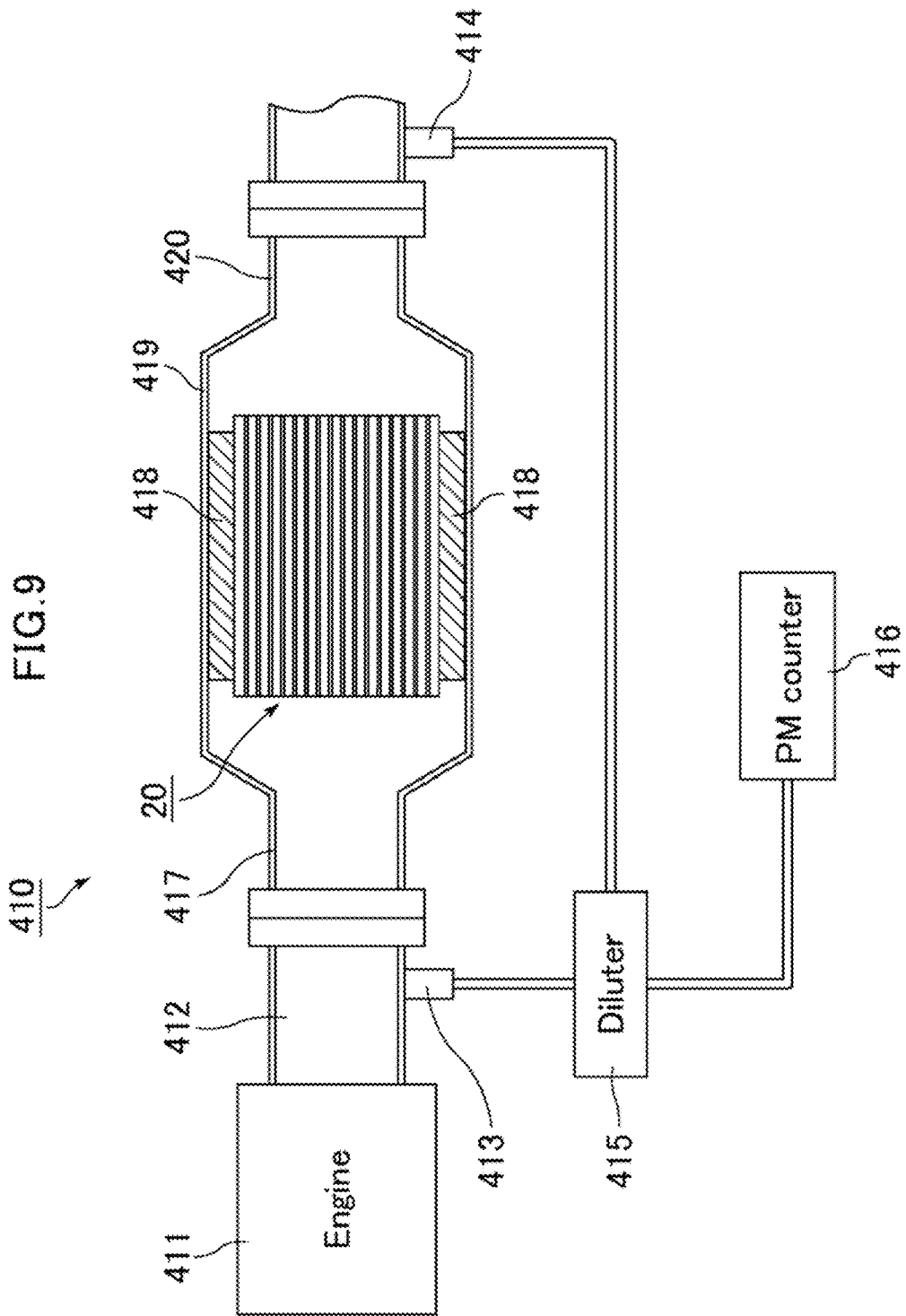
FIG. 9 is an explanatory diagram schematically illustrating a method for measuring the capturing efficiency.
Figure 10:
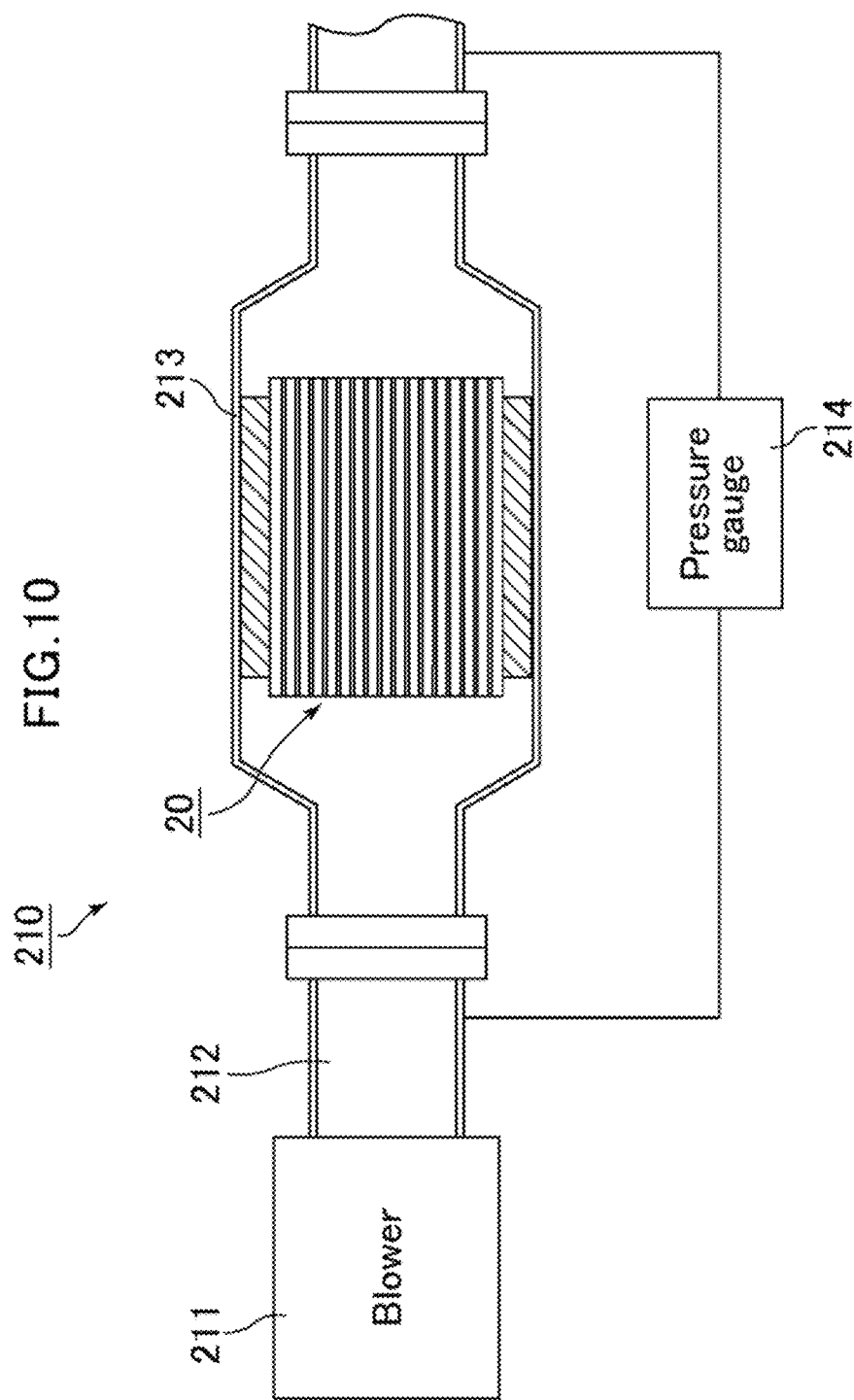
FIG. 10 is an explanatory diagram schematically illustrating a method for measuring the initial pressure loss.

The honeycomb filters manufactured in Example 1 and Comparative Example 1 were measured for a capturing efficiency using a capturing efficiency measuring apparatus as shown in FIG. 9, an initial pressure loss using an initial pressure loss measuring apparatus as shown in FIG. 10, and a relation between the amount of captured PMs and the pressure loss using a pressure loss measuring apparatus as shown in FIG. 11.

(Measurement of Capturing Efficiency)

FIG. 9 is an explanatory diagram schematically illustrating a method, for measuring the capturing efficiency.

A capturing efficiency measuring apparatus 410 has the following structure: a honeycomb filter 20 fixed inside a metal casing 419 is disposed in an exhaust gas tube 412 of a 1.6-liter diesel engine 411, branch pipes 413 and 414 is provided through which exhaust gas before and after passing through the honeycomb filter 20 is partially sampled to flow into a diluter 415 for dilution, and a PM counter 416 is attached to measure the amount of PMs in the diluted exhaust gas.

Comparison of the amount of PMs in exhaust gas before and after flowing through the honeycomb fitter 20 enables calculation of the capturing efficiency by the honeycomb filter 20.

The capturing efficiency was 91% in the first embodiment but 86% in the comparative embodiment 1.

(Measurement of Initial Pressure Loss)

FIG. 10 is an explanatory diagram schematically illustrating a device for measuring the initial pressure loss.

An initial pressure loss measuring apparatus 210 includes a blower 211, an exhaust gas pipe 212 connected to the blower 211, a metal casing 213 in which the honeycomb filter 20 is fixed, and a pressure gauge 214 in which pipes are arranged so that the pressure in front and back of the honeycomb filter 20 can be measured. Specifically, in the initial pressure loss measuring apparatus 210, the pressure loss is measured by flowing gas through the honeycomb filter 20 and measuring the pressure in front and back of the honeycomb filter.

The blower 211 was operated three times to flow gas at a rate of 300 m$^3$/h, 450 m$^3$/h, and 600 m$^3$/h. In each operation, the pressure loss in five minutes from the start was measured.

Figure 12B:
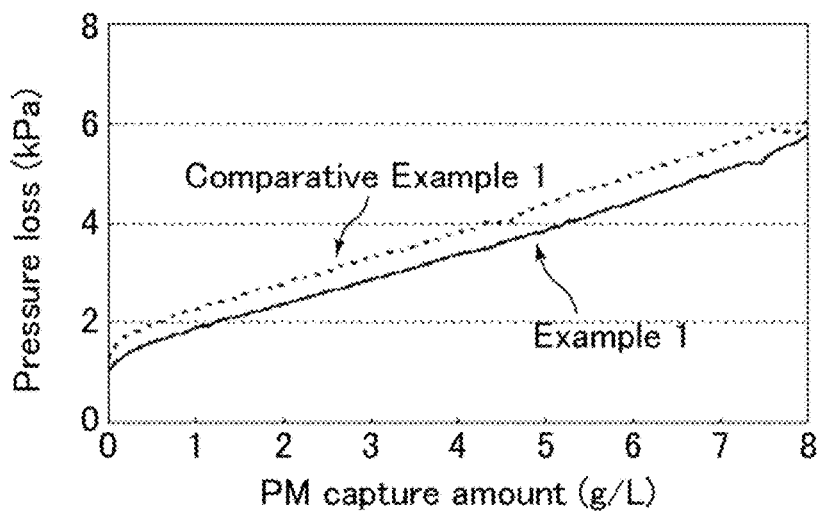
FIG. 12B is a graph showing a relation between PM capture amount and the pressure loss that are measured in Example 1 and Comparative Example 1.
Figure 12C:
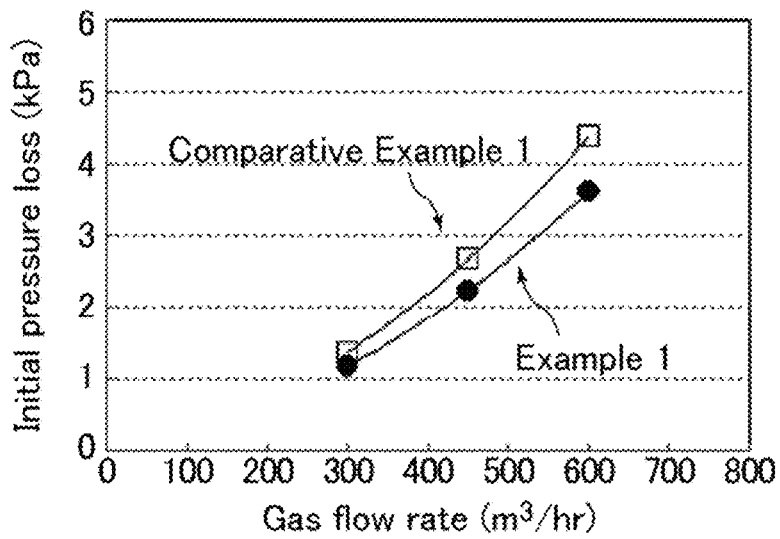
FIG. 12C is a graph showing a relation between the gas flow rate and the initial pressure loss.

FIG. 12C is a graph showing a relation between the gas flow rate and the initial pressure loss measured in Example 1 and Comparative Example 1.

The graph in FIG. 12C clearly shows that, in the honeycomb filter according to Comparative Example 1, the initial pressure loss was 1.36 Pa, 2.67 Pa, and 4.38 Pa for the gas flow rate of 300 m$^3$/h, 450 m$^3$/h, and 600 m$^3$/h, respectively. In the honeycomb filter according to Example 1, the initial pressure loss was 1.17 Pa, 2.23 Pa, and 3.62 Pa for the gas flow rate of 300 m$^3$/h, 450 m$^3$/h, and 600 m$^3$/h, respectively, which was lower than that in Comparative Example 1. In particular, as the flow rate increases, the difference with Comparative Example 1 becomes more significant.

FIG. 11 is an explanatory diagram schematically illustrating a method for measuring the pressure loss.

The pressure loss measuring apparatus 310 has the following structure: a honeycomb filter 20 fixed inside a metal casing 313 is disposed in an exhaust gas tube 312 of a 1.6-liter diesel engine 311, and a pressure gauge 314 is attached in a manner such that it can detect the pressure in front and back of the honeycomb filter 20. The honeycomb filter 20 is disposed such that the end at the exhaust gas introduction side is closer to the exhaust gas tube 312 of the diesel engine 311. Namely, the honeycomb filter 20 is disposed to allow exhaust gas to flow in the cells which are open at the exhaust gas introduction side end.

The diesel engine 311 was operated with the number of rotation of 3100 rpm and a torque of 50 Nm to allow exhaust gas to flow into the honeycomb filter 20 so that PMs were captured by the honeycomb filter.

Then, a relation was determined between the amount (g/L) of captured PMs per liter of an apparent volume of the honeycomb filter and the pressure lose (kPa).

FIG. 12B is a graph showing the relation between the PM capture amount and the pressure loss measured in Example 1 and Comparative Example 1.

The graph in FIG. 12B clearly shows that the initial pressure loss, i.e. the pressure loss when the PM capture amount was 0 g/L, was as low as 1.1 kPa, and the pressure loss was as low as 5.7 kPa even when the PM capture amount was 8 g/L in the honeycomb filter of Example 1.

Thus, the honeycomb filter of Example 1 had a significant effect of achieving, in addition to a lower initial pressure loss, a lower pressure loss as compared to the honeycomb filter of Comparative Example 1 at any time when the PM capture amount was 0 g/L to 8 g/L. In the honeycomb filter of Comparative Example 1, the initial pressure loss, i.e. the pressure loss when the PM capture amount was 0 g/L was 1.3 kPa, and the pressure loss was 6.0 kPa when the PM capture amount was 8 g/L.

Second Embodiment

The following will discuss a honeycomb filter according to the second embodiment of the present invention.

The honeycomb filter according to the second embodiment of the present invention includes a single honeycomb fired body having an outer wall on the periphery thereof. The honeycomb fired body includes exhaust gas emission cells each having an open end at an exhaust gas emission side and a plugged end at an exhaust gas introduction side, and exhaust gas introduction cells each having an open end at the exhaust gas introduction side and a plugged end at the exhaust gas emission side, the exhaust gas introduction cells including first exhaust gas introduction cells and second exhaust gas introduction cells.

The exhaust gas emission cells are each adjacently surrounded fully by the first exhaust gas introduction cells and the second exhaust gas introduction cells across the porous cell walls.

In the cross section perpendicular to the longitudinal direction of the cells, each second exhaust gas introduction cell has a larger cross sectional area than each first exhaust gas introduction cell, and each exhaust gas emission cell has the same cross sectional area as each second exhaust gas introduction cell.

In the cross section perpendicular to the longitudinal direction of the cells, the exhaust gas emission cells and the exhaust gas introduction cells are each polygonal, and a side facing one exhaust gas emission cell among the sides forming the cross sectional shape of the first exhaust gas introduction cell is longer than a side facing one exhaust gas emission cell among the sides forming the cross sectional shape of the second exhaust gas introduction cell.

The exhaust gas introduction cells and the exhaust gas emission cells each hare a uniform cross sectional shape except for the plugged portion, in a direction perpendicular to the longitudinal direction of the cells thoroughly from the end at the exhaust gas introduction side to the end at the exhaust gas emission side.

In terms of the pore structure of the cell walls in the honeycomb filter according to the second embodiment of the present invention, the porosity is 55 to 70%, the proportion of pores having a pore diameter of 40 μm or more is 10% or more, and the proportion of pores having a pore diameter of 10 μm or less is 10% or less.

Namely, the honeycomb filter according to the second embodiment has the serve structure as that of the honeycomb filter according to the first embodiment except that the honeycomb filter according to the second embodiment is formed of a single honeycomb fired body having an outer well on the periphery thereof. Such a honeycomb filter formed of a single honeycomb fired body is referred to also as an integrated honeycomb filter.

Figure 13A:
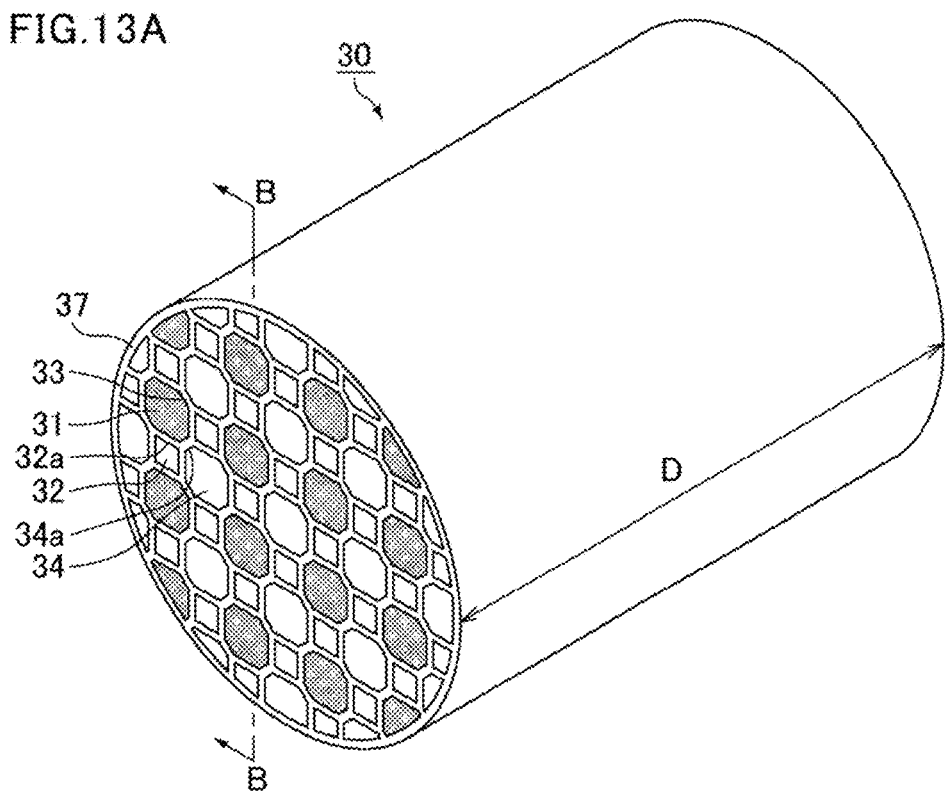
FIG. 13A is a perspective view schematically illustrating one example of a honeycomb filter according to a second embodiment of the present invention.
Figure 13B:
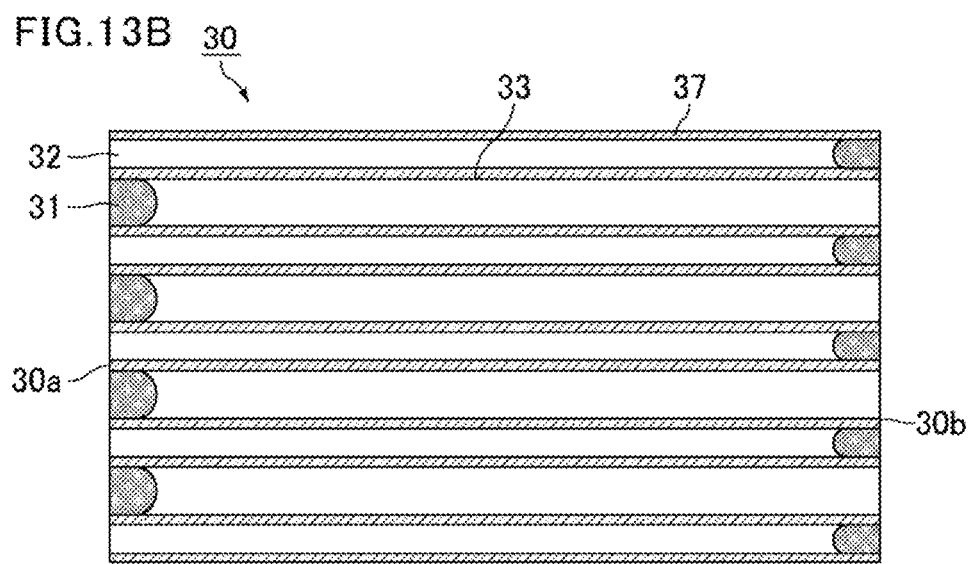
FIG. 13B is a B-B line cross sectional view of the honeycomb filter in FIG. 13A.

FIG. 13A is a perspective view schematically illustrating one example of the integrated honeycomb filter according to the second embodiment of the present invention. FIG. 13B is a B-B line cross sectional view of the integrated honeycomb filter.

In the honeycomb filter 30 shown in FIG. 13A and FIG. 13B, exhaust gas emission cells 31 having an octagonal cross section are each adjacently surrounded fully by first exhaust gas introduction cells 32 each having a square cross section and second exhaust gas introduction cells 34 each having an octagonal cross section across porous cell walls therebetween. The first exhaust gas introduction cells 32 and the second exhaust gas introduction cells 34 are alternately arranged around each exhaust gas emission cell 31. Each second exhaust gas introduction cell 34 has a larger cross section than each first exhaust gas introduction cell 32, and each exhaust gas emission cell 31 has the same cross sectional area as each second exhaust gas introduction cell 34.

The length of a side 32a facing the exhaust gas emission cell 31 among the sides forming the cross sectional shape of the first exhaust gas introduction cell 32 is longer than a side 34a facing the exhaust gas emission cell 11 among the sides forming the cross sectional shape of the second exhaust gas introduction cell 34.

The honeycomb filter 30 according to the present embodiment is formed of a single honeycomb fired body, and has an outer wall 37 on the periphery of the honeycomb fired body. Preferable examples of the material forming the honeycomb filter 30 according to the present embodiment include cordierite and aluminum titanate. These materials have a low coefficient of thermal expansion. Thus, cracks or the like caused by thermal stress during regeneration or the like rarely occur even in a large scale honeycomb filter.

The features of the embodiment other than those mentioned above are the same as the features described in relation to the first embodiment, and thus the explanation thereof is omitted.

The honeycomb filter 30 according to the present embodiment can be manufactured by using the honeycomb fired body manufactured in the first embodiment as it is, or can be manufactured in the same manner as in the first embodiment of the present invention, except that a periphery coat layer is formed on the periphery thereof. This embodiment does not require the processes (4), (5), and (6) in the method for manufacturing the honeycomb filter according to the first embodiment of the present invention. Furthermore, the process (7) is not necessary in the case of not forming the periphery coat layer.

The honeycomb filer 30 according to the present embodiment is substantially the same as the honeycomb filter 20 according to the first embodiment concerning the manners of basic arrangement of cells, shapes, plugging, and the like. Thus, the honeycomb filter 30 according to the present embodiment can exert the same effects as the effects (1) to (10) described in relation to the first embodiment.

Third Embodiment

The following will discuss a honeycomb filter according to the third embodiment of the present invention.

The honeycomb filter according to the third embodiment of the present invention includes a plurality of honeycomb fired bodies having an outer wall on the periphery thereof, the honeycomb fired bodies combined with one another by adhesive layers residing therebetween. Each honeycomb fired body includes exhaust gas emission cells each having an open end at an exhaust gas emission side and a plugged end at an exhaust gas introduction side, and exhaust gas introduction cells each having an open end at the exhaust gas introduction side and a plugged end at the exhaust gas emission side, the exhaust gas introduction cells including first exhaust gas introduction cells and second exhaust gas introduction cells. In the honeycomb filter, the diameter is longer than the length.

The exhaust gas emission cells are each adjacently surrounded fully by the first exhaust gas introduction cells and the second exhaust gas introduction cells across the porous cell walls.

In the cross section perpendicular to the longitudinal direction of the cells, each second exhaust gas introduction cell has a larger cress sectional area than each first exhaust gas introduction cell, and each exhaust gas emission cell has the same cross sectional area as each second exhaust gas introduction cell.

In the cross section perpendicular to the longitudinal direction of the cells, the exhaust gas emission cells and the exhaust gas introduction cells are each polygonal, and a side facing one exhaust gas emission cell among the sides forming the cross sectional shape of the first exhaust gas introduction cell is longer than a side facing one exhaust gas emission cell among the sides forming the cross sectional shape of the second exhaust gas introduction cell.

In relation to the cells adjacent to the outer wall, the exhaust gas emission cells and the first exhaust gas introduction cells are alternately arranged.

The exhaust gas introduction cells and the exhaust gas emission cells each have a uniform cross sectional shape except for the plugged portions, in a direction perpendicular to the longitudinal direction of the cells thoroughly from the end at the exhaust gas introduction side to the end at the exhaust gas emission side.

In terms of the pore structure of the cell walls in the honeycomb filter according to the third embodiment of the present invention, the porosity is 55 to 70%, the proportion of pores having a pore diameter of 40 μm or more is 10% or more, and the proportion of pores having a pore diameter of 10 μm or less is 10% or less.

Namely, the honeycomb filter according to the third embodiment has the same structure as that of the honeycomb filter according to the first embodiment. They are the same in terms of the basic shape and arrangement of the cells but different in that, in the honeycomb filter according to the third embodiment, the cross sectioned shape of the cells adjacent to the outer wall is the same as the cross sectional shape of the cells other than the cells adjacent to the outer wall.

FIG. 14A is a perspective view schematically illustrating one example of a honeycomb filter according to a third embodiment of the present invention. FIG. 14B is a perspective view illustrating a honeycomb fired body forming the honeycomb filter.

The cross sectional shape and arrangement of the cell walls in a honeycomb fired body 10a included in a honeycomb filter 30 shown in FIGS. 14A and 14B are basically the same as those of the cell walls in the honeycomb fired body 10 included in the honeycomb filer 20 shown in FIGS. 2A and 2B. Exhaust gas emission cells 11 having an octagonal cross sectional shape are each adjacently surrounded fully by first exhaust gas introduction cells 12 having a square cross sectional shape and second exhaust gas introduction cells 14 having an octagonal cross sectional shape across porous cell walls. The first exhaust gas introduction cells 12 and the second exhaust gas introduction cells 14 are alternately arranged around the exhaust gas emission cells 11. Each second exhaust gas introduction cell 14 has a larger cross sectional area than each first exhaust gas introduction cell 12. Each exhaust gas emission cell 11 has the same cross sectional area as each second exhaust gas introduction cell 14. The honeycomb fired body 10 has an outer wall 17a on the periphery thereof. The cells adjacent to the outer wall 17a include the first exhaust gas introduction cells 12 and the exhaust gas emission cells 11.

A side 12a facing one exhaust gas emission cell 11 among the sides forming the cross sectional shape of the first exhaust gas introduction cell 12 is longer than a side 14a facing one exhaust gas emission cell 11 among the sides forming the cross sectional shape of the second exhaust gas introduction cell 14.

The honeycomb fired body 10a is different from the honeycomb fired body 10 included in the honeycomb filter 20 shown in FIG. 1 in that, as shown in FIG. 14B, the exhaust gas emission cells 11 and the first exhaust gas introduction cells 12 adjacent to the outer wall respectively have the same cross sectional shapes as the exhaust gas emission cells 11 and the first exhaust gas introduction cells 12 other than the cells adjacent to the outer wall.

The following will discuss a modified example of the honeycomb filter according to the third embodiment of the present invention.

FIG. 15A is a perspective view schematically illustrating one modified example of a honeycomb fired body forming the honeycomb filter according to the third embodiment of the present invention. FIG. 15B is an end face view of the honeycomb fired body forming the honeycomb filter in FIG. 15A.

In the honeycomb fired body 10b included in a honeycomb filter shown in FIGS. 15A and 15B, all the first exhaust gas introduction cells 12 have the same shape and all the second exhaust gas introduction cells 14 have the same shape. A side 170b corresponding to an outer periphery of an outer wall 17b changes in accordance with the shapes of the first exhaust gas introduction cells 12 and the exhaust gas emission cells 11 adjacent to the outer wall 17b. The thickness of the outer wall 17b is uniform.

In other words, to make the thickness of the outer wall 17b uniform, the side 170b corresponding to the outer periphery of the outer wall 17b becomes rugged along with the shapes of the first exhaust gas introduction cells 12 and the exhaust gas emission cells 11 adjacent to the outer wall 17b.

FIG. 15C is an end face view illustrating another modified example of a honeycomb fired body forming the honeycomb filter according to the third embodiment of the present invention.

In a honeycomb fired body 10c included in a honeycomb fiber shown in FIG. 15C, all the cells adjacent to an outer wall 17c are exhaust gas introduction cells. The shape of a second exhaust gas introduction cell 14A is, compared to the shape of an exhaust gas introduction cell not adjacent to the outer wall 17c, partially deformed to be hexagonal in accordance with the line along the inner wall, which forms the outer wall 17c, in first exhaust gas introduction cells 12A adjacent to the outer wall 17c. Similarly, an exhaust gas emission cell 14B at the corner portion is partially deformed to be pentagonal.

As above, all the cells adjacent to the outer wall may be exhaust gas introduction cells with an aim of enhancing the aperture ratio of the exhaust gas introduction cells.

The features of the embodiment other than those mentioned above are the same as the features described in relation to the first embodiment, and thus the explanation thereof is omitted.

The honeycomb filter according to the present embodiment can be manufactured by the same method as described in the first embodiment of the present invention, except that the shape of the mold used in the extrusion molding is changed.

Being similar to the honeycomb filter 20 of the first embodiment in the basic arrangement and shapes of the cells and the state of plugs, the honeycomb filter according to the present embodiment can exert the same effects as the effects (1) to (12) mentioned in the first embodiment.

Fourth Embodiment

The following will discuss a honeycomb filter according to the fourth embodiment of the present invention. Features not described below are substantially the same as those in the honeycomb filter according to the first embodiment.

The honeycomb filter according to the fourth embodiment of the present invention includes a plurality of honeycomb fired bodies each having an outer wall on the periphery thereof. Each, honeycomb fired body includes exhaust gas emission cells each having an open end at an exhaust gas emission side and a plugged end at an exhaust gas introduction side, and exhaust gas introduction cells each having an open end at the exhaust gas introduction side and a plugged end at the exhaust gas emission side, the exhaust gas introduction cells including first exhaust gas introduction cells and second exhaust gas introduction cells. The honeycomb fired bodies are combined with one another by adhesive layers residing therebetween.

The exhaust gas emission cells are each adjacently surrounded fully by the first exhaust gas introduction cells and the second exhaust gas introduction cells across the porous cell walls.

In the cross section perpendicular to the longitudinal direction of the cells, each second exhaust gas introduction cell has a larger cross sectional area than each first exhaust gas introduction cell, and each exhaust gas emission cell has the same cross sectional area as each second exhaust gas introduction cell.

In the cross section perpendicular to the longitudinal direction of the cells, the exhaust gas emission calls, the first exhaust gas introduction cells, and the second exhaust gas introduction cells are each square, and one of the sides forming the cross sectional shape of the first exhaust gas introduction cell faces one exhaust gas emission cell, and none of the sides forming the cross sectional shape of the second exhaust gas introduction cell faces the sides forming the exhaust gas emission cell.

The cells adjacent to the outer wall include the first exhaust gas introduction cells and the exhaust gas emission cells.

The exhaust gas introduction cells and the exhaust gas emission cells each have a uniform cross sectional shape except for the plugged portion in a direction perpendicular to the longitudinal direction of the cells thoroughly from the end at the exhaust gas introduction side to the end at the exhaust gas emission side.

In terms of the pore structure of the cell walls in the honeycomb filter according to the fourth embodiment of the present invention, the porosity is 55 to 70%, the proportion of pores having a pore diameter of 40 μm or more is 10% or more, and the proportion of pores having a pore diameter of 10 μm or less is 10% or less.

In other words, the honeycomb filter according to the fourth embodiment has substantially the same structure as the honeycomb filter according to the first embodiment, except that all the exhaust gas emission cells, the first exhaust gas introduction cells, and the second exhaust gas introduction cells each have a square cross section, and also except for the features mentioned below.

FIG. 16A is an end face view schematically illustrating one example of the cell arrangement in an end face of the honeycomb fired body forming the honeycomb filter according to the fourth embodiment of the present invention.

In a honeycomb fired body 40 included in the honeycomb filter shown in FIG. 16A, exhaust gas emission cells 41 having a square cross section are each adjacently surrounded fully by first exhaust gas introduction cells 42 each having a square cross section and second exhaust gas introduction cells 44 each having a square cross section across porous cell walls therebetween. The first exhaust gas introduction cells 42 and the second exhaust gas introduction cells 44 are alternately arranged around each exhaust gas emission cell 41. Each second exhaust gas introduction cell 44 has a larger cross sectional area than each first exhaust gas introduction cell 42, and each exhaust gas emission cell 41 has the same cross sectional area as each second exhaust gas introduction cell 44.

In the cross section of the three kinds of adjacent cells, namely, the exhaust gas emission cell 41, the second exhaust gas introduction cell 44, and the first exhaust gas introduction cells 42, a side 41a facing the first exhaust gas introduction cell 42 across a cell wall 43 among the sides of the square exhaust gas emission cell 41 is parallel to a side 42a facing the exhaust gas emission cell 41 across the cell wall 43 among the sides of the square first exhaust gas introduction cell 42.

Moreover, a side 42b facing the second exhaust gas introduction cell 44 across the cell wall 43 among the sides of the first exhaust gas introduction cell 12 is parallel to a side 44b facing the first exhaust gas introduction cell 42 across the cell wall 43 among the sides of the second exhaust gas introduction cell 44. Furthermore, the distances between the parallel sides of all the above pairs are the same. That is, the distance between the parallel sides 41a and 42a, and the distance between the parallel sides 42b and 44b, are the same.

The square exhaust gas emission cell 41 is adjacently surrounded by alternately arranged four pieces of the first square exhaust gas introduction cells 42 and four pieces of the second square exhaust gas introduction cells 44 across the cell walls 43. The cross sectional area of the second exhaust gas introduction cell 44 is larger than the cross sectional area of the first exhaust gas introduction cell 42.

Furthermore, the exhaust gas emission cells 41, the first exhaust gas introduction cells 42, and the second exhaust gas introduction cells 44 are each arranged in a manner satisfying the conditions below.

Namely, among hypothetical segments connecting geometric centers of gravity of the square shapes of the four second exhaust gas introduction cells 44 surrounding the exhaust gas emission cell 41, an intersection of the two segments crossing the square, shape region of the exhaust gas emission cell 41 is identical with the geometric center of gravity of the square cross section of the exhaust gas emission cell 41.

Moreover, among the hypothetical segments connecting the geometric centers of gravity of the square shapes of the four second exhaust gas introduction cells 44, the four segments not crossing the square shape region, of the exhaust gas emission cell 41 forms a square, and midpoints of the respective sides of the square are identical with the geometric centers of gravity of the respective square shapes of the four first exhaust gas introduction cells 42 surrounding the exhaust gas emission cell 41.

As described above, the square exhaust gas emission cell 41 is adjacently surrounded by alternately arranged four pieces of the first square exhaust gas introduction cells 42 and four pieces of the second square exhaust gas introduction cells 44 across the cell walls 43 to form a single unit. The unit is two-dimensionally repeated, where the first exhaust gas introduction cells 42 and the second exhaust gas introduction cells 44 in the unit are shared between adjacent cell units, to form a honeycomb filter. The units share the first exhaust gas introduction cells 42 and the second exhaust gas introduction cells 44. Thus, the first exhaust gas introduction cell 42 and the second exhaust gas introduction cell 44, which face the exhaust gas emission cell 41 across the cell walls 43, face the exhaust gas emission cell 41 in the adjacent unit across the cell wall 43.

Figure 17:
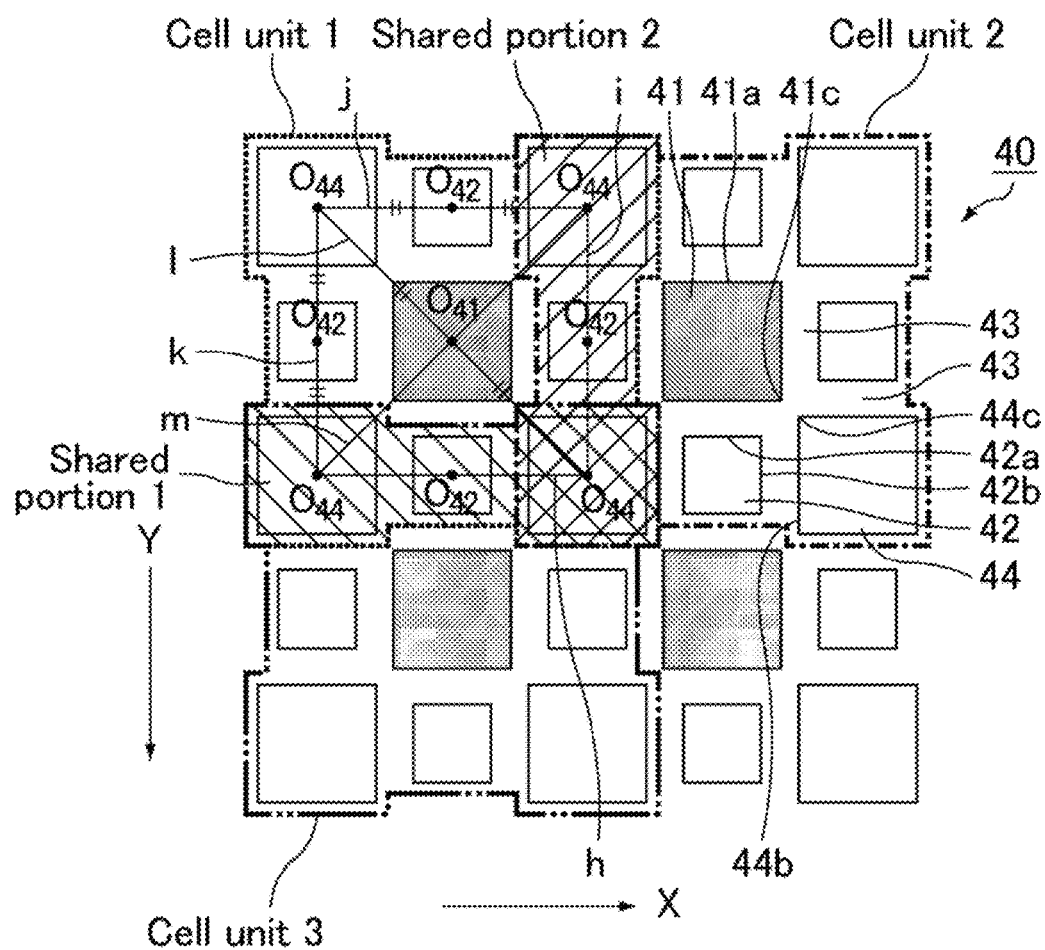
FIG. 17 is an enlarged cross sectional view perpendicular to the longitudinal direction of the honeycomb filter.

FIG. 17 is an enlarged cross sectional view perpendicular to the longitudinal direction of the honeycomb filter. FIGS. 16A to 16C illustrate how each cell unit (cell structure) is two-dimensionally, i.e. in X and Y directions shown in FIG. 17, repeated in the case where the first exhaust gas introduction cells 42, the second exhaust gas introduction cells 44, and the exhaust gas emission cells 41 are square and the aforementioned conditions are satisfied, and also illustrates how the first exhaust gas introduction cells 42 and the second exhaust gas introduction cells 44 in the unit are shared between the cell units (cell structure). A cell unit 1, a cell unit 2, and a cell unit 3 each have a structure in which the exhaust gas emission cell 41 is fully surrounded by alternately arranged four pieces of the first exhaust gas introduction cells 42 and four pieces of the second exhaust gas introduction cells 44 across the cell walls 43 in a manner satisfying the aforementioned conditions.

The cell unit 2 has the same structure as that of the cell unit 1. The cell unit 2 is adjacent to the cell unit 1 in the X direction while sharing one piece of the first exhaust gas introduction, cell 42 and two pieces of the second exhaust gas introduction cells 44 with the cell unit 1. The cells shared between the cell unit 1 and the cell unit 2 are depicted as "shared portion 2" in FIG. 17. The cell unit 3 has the same structure as that of the cell unit 1. The cell unit 3 is adjacent to the cell unit 1 in the Y direction while sharing one piece of the first exhaust gas introduction cell 42 and two pieces of the second exhaust gas introduction cells 42 with the cell unit 1. The cells shared between the cell unit 1 and the cell unit 3 are depicted as "shared portion 1" in FIG. 17.

Meanwhile, FIG. 17 shoes four segments h, i, j, and k that do not cross the square shape region of the exhaust gas emission cell 41, and hypothetical two segments l and m that cross the square shape region of the exhaust gas emission cell 41, among hypothetical segments connecting the geometric centers of gravity of the square shapes of the four pieces of the second exhaust gas introduction cells 44. The "shared portion 2" is depicted by cross-hatching with segments in the same direction as that of the segment m, and the "shared portion 1" is depicted by cross-hatching with segments in the same direction as that of the segment l.

As shown in FIG. 17, an intersection of the two segments l and m is identical with the geometric center of gravity of the exhaust gas emission cell 41.

In the cross section of the cells, one of sides forming the cross sectional shape of the first exhaust gas introduction cell 42 faces one exhaust gas emission cell 41. Also, the second exhaust gas introduction cell 44 and the exhaust gas emission cell 41 are arranged, so that they face each other at their corner portions. Thus, none of the sides forming the cross sectional shape of the second exhaust gas introduction cell 44 faces the sides forming the exhaust gas emission cell 41. The cells adjacent to an outer wall 47 include the first exhaust gas introduction cells 12 and the exhaust gas emission cells 41.

None of the sides forming the cross section of the second exhaust gas introduction cell faces exhaust gas emission cells in the present embodiment, and thus exhaust gas more easily flows into the first exhaust gas introduction cells at an initial stage as compared to the first embodiment. For this reason, PMs accumulate earlier on the inner cell walls of the first exhaust gas introduction cells corresponding to the cell walls separating the first exhaust gas introduction cells and the exhaust gas emission cells. Consequently, the aforementioned switching of the main channel occurs further earlier. Therefore, PMs tend to uniformly accumulate on the inner cell walls of the first exhaust gas introduction cells and the inner cell walls of the second exhaust gas introduction cells so that the pressure loss can be further reduced after accumulation of a certain amount of PMs. In the honeycomb filter according to the present embodiment, cracks tend not to be caused by thermal shook that occurs upon burn-removal (regeneration) of PMs accumulated on the honeycomb filter.

In the honeycomb filter according to the present embodiment, the plugged portions provided at the end at the exhaust gas emission side, namely the plugged portions in the first exhaust gas introduction cells and the second exhaust gas introduction cells are present in vertical and horizontal rows. Each plugged portion has a width equal to or larger than the length of one side of the first exhaust gas introduction cell. In ordinary regeneration of honeycomb filters, heat burns firstly PMs accumulated at the exhaust gas introduction side of a honeycomb filter. Then, burning of PMs is transferred by exhaust gas flow to the emission side of the honeycomb filter so that all the PMs are burned. For this reason, positions closer to the emission side of the honeycomb filter are exposed to higher temperatures, and easily have temperature difference along the diameter direction of the honeycomb filter. Thus, cracks occur due to the thermal stress. Such cracks are prominent in the case where the cross sectional areas are different among the cells, and also in the case where the cross sections of the exhaust gas introduction cells where PMs accumulate have square cross section(s). In contrast, in the honeycomb filter according to the embodiment of the present invention, the plugged portions aligned in vertical and horizontal rows at the exhaust gas emission side function as thermally conductive layers and as layers for dissipating heat to outside. Thus, the temperature difference is small along the diameter direction of the honeycomb filter. This reduces the thermal stress to be caused to prevent occurrence of cracks. Moreover, in the honeycomb filter according to the embodiment of the present invention, the amount of the plug in the second exhaust gas introduction cells, in which a larger amount of PMs accumulate compared with the first exhaust gas introduction cells, is large due to the size of the cross sectional area, and thereby the thermal capacity of the plugged portions increase. Such plugged portions can prevent an increase in the temperature of the second exhaust gas introduction cells, where the heat of burning PMs is higher, even in consideration of each cell. This reduces the temperature difference in the diameter direction of the honeycomb filter, thereby reducing the thermal stress to be caused.

Thus, the honeycomb filter according to the present embodiment can prevent cracks during the regeneration even though it includes exhaust gas introduction cells having square cross sections.

The cross sectional area of each first exhaust gas introduction cell 42 is preferably 20 to 50% the size, and mere preferably 22 to 45% the size of the cross sectional area of each second exhaust gas introduction cell 44.

In the honeycomb fired body shown in FIGS. 16A to 16C, the cross sectional area of each exhaust gas emission cell 41 is equal to the cross sectional area of each second exhaust gas introduction cell 44; however, the cross sectional area of each exhaust gas emission cell 41 may be larger than the cross sectional area of each second exhaust gas introduction cell 44.

The cross sectional area of each exhaust gas emission cell 41 is preferably 1.05 to 1.5 times the size of the cross sectional area of each second exhaust gas introduction cell 44.

The following describes the thickness of the cell walls in the cross section of the honeycomb fired body 40 included in the honeycomb filter according to the fourth embodiment based on the aforementioned definition of the cell walls. Supposing that a straight line $Z_{42}$ connecting the center of gravity $O_{41}$ of the exhaust gas emission cell 41 and the center of gravity $O_{42}$ of the first exhaust gas introduction cell 42 is given, the thickness of the cell wall 43 at a part overlapped with the straight line $Z_{42}$ (the thickness between the side 42a and the side 41a) is determined as thickness $X_1$. Supposing that a straight line $Z_{44}$ connecting the center of gravity $O_{44}$ of the second exhaust gas introduction cell 44 and the center of gravity $O_{41}$ of the exhaust gas emission cell 41 is given, the thickness of the cell wall 43, which separates the second exhaust gas introduction cell 44 and the exhaust gas emission cell 41, at a part overlapped with the straight line $Z_{44}$ (the length between a corner portion 44c of the second exhaust gas introduction cell 44 and a corner portion 41c of the exhaust gas emission cell 41) is determined as thickness $Y_1$.

The thickness of the cell walls of the honeycomb fired body 40 included in the honeycomb filter varies depending on the parts as shown in FIG. 16A; however, the thicknesses, including the thickness $X_1$ and the thickness $Y_1$, may be set to be within a range of 0.10 to 0.46 mm.

The following will discuss a modified example of the honeycomb filter according to the fourth embodiment of the present invention.

FIG. 16B is an end face view illustrating one modified example of a honeycomb fired body forming the honeycomb filter according to the fourth embodiment of the present invention.

In the honeycomb fired body 40a included in the honeycomb filter shown in FIG. 16B, the shape of an exhaust gas emission cell 41A adjacent to an outer wall 47a is, compared to the shape of an exhaust gas emission cell 41 not adjacent to the outer wall 47a, partially deformed to be rectangle in accordance with the line along the inner wall, which forms the outer wall, in the first exhaust gas introduction cells 42A adjacent to the outer wall 47a. An exhaust gas emission cell 41B at the corner portion has a square shape with a smaller cross sectional area compared to the exhaust gas emission cell 41 not adjacent to the outer wall 47a.

With such shapes of the cells, the boundary between the outer wall 47a and the exhaust gas emission cells 41A and 41B and the first exhaust gas introduction cells 42A adjacent to the outer wall 47a is formed linearly, and the thickness of the outer wall 17a is uniform.

The following will discuss another modified example of the honeycomb filter according to the fourth embodiment of the present invention.

FIG. 16C is an end face view illustrating another modified example of a honeycomb fired body forming the honeycomb filter according to the fourth embodiment of the present invention.

In a honeycomb fired body 40b included in the honeycomb filter shown in FIG. 16C, all the first exhaust gas introduction cells have the same shape, and all the exhaust gas emission cells 41 have the same shape. A side 470b corresponding to an outer periphery of an outer wall 47b changes in accordance with the shapes of the first exhaust gas introduction cells 42 and the exhaust gas emission cells 41 adjacent to the outer wall 47b. The thickness of the outer wall 47b is uniform.

In other words, to make the thickness of the outer wall 47b uniform, the side 470b corresponding to the outer periphery of the outer wall 47b becomes rugged along with the shapes of the first exhaust gas introduction cells 42 and the exhaust gas emission cells 41 adjacent to the outer wall 47b.

The features of the embodiment other than those mentioned above are the same as the features described in relation to the first embodiment, and thus the explanation thereof is omitted.

The honeycomb filter according to the present embodiment can be manufactured in the same manner as in the first embodiment of the present invention, except that a die having a different shape is used in the extrusion molding process.

In the honeycomb filter according to the present embodiment, unlike the first embodiment, the exhaust gas emission cells 41 and the second exhaust gas introduction cells 44 have square cross sections, and all the sides forming the cross sectional shape of the second exhaust gas introduction cells 44 do not face the exhaust gas emission, cells 41. Among the sides forming the cross sectional shape of the first exhaust gas introduction cells 42, a side 42a faces one of the exhaust gas emission cells 41. Thus, like the honeycomb filter according to the first embodiment, it is considered that exhaust gas easily flows into the first exhaust gas introduction cells 12 at an initial stage. After accumulation of a certain amount of PMs, exhaust gas tends to flows into the second exhaust gas introduction cells 44.

The honeycomb filter according to the present embodiment is substantially the same as the honeycomb filter 20 according to the first embodiment concerning basic arrangement of cells, manner of plugging, size difference among the cross sectional areas of the cells, or the like. Thus, the honeycomb filter 40 according to the present embodiment can exert the same effects as the effects (1) to (5) and (7) to (10) described in relation to the first embodiment.

Fifth Embodiment

The following will discuss a honeycomb filter according to the fifth embodiment of the present invention. Features not described below are substantially the same as those in the honeycomb filter according to the first embodiment.

The honeycomb filter according to the fourth embodiment of the present invention includes a plurality of honeycomb fired bodies each having an outer wall on the periphery thereof. Each honeycomb fired body includes exhaust gas emission cells each having an open end at an exhaust gas emission side and a plugged end at an exhaust gas introduction side, and exhaust gas introduction cells each having an open end at the exhaust gas introduction side and a plugged end at the exhaust gas emission side, the exhaust gas introduction cells including first exhaust gas introduction cells and second exhaust gas introduction cells each having a larger cross sectional area than each first exhaust gas introduction cell in a direction perpendicular to the longitudinal direction of the cells. The honeycomb fired bodies are combined with one another by adhesive layers residing therebetween.

In the honeycomb filter according to the fifth embodiment of the present invention, in the cross section perpendicular to the longitudinal direction of the cells, the cross sectional area of each exhaust gas emission cell is equal in size to the cross sectional area of each second exhaust gas introduction cell. The exhaust gas emission cells and the exhaust gas introduction cells are each in a shape formed by a curved line in the cross section perpendicular to the longitudinal direction of the cells, and all the exhaust gas emission cells, the first exhaust gas introduction cells, and the second exhaust gas introduction cells have round cross sectional shapes.

The cells adjacent to the outer wall include the first exhaust gas introduction cells and the exhaust gas emission cells.

In terms of the pore structure of the cell walls in the honeycomb filter according to the fifth embodiment of the present invention, the porosity is 55 to 70%, the proportion of pores having a pore diameter of 40 μm or more is 10% or more, and the proportion of pores having a pore diameter of 10 μm or less is 10% or less.

The honeycomb filter according to the fifth embodiment of the present invention has substantially the same features as the features of the honeycomb filter according to the first embodiment of the present invention, except that the cross sectional shapes of the exhaust gas emission cells, the second exhaust gas introduction cells, and the first exhaust gas introduction cells are different in the direction perpendicular to the longitudinal direction of the cells.

FIG. 18 is an enlarged end face view schematically illustrating one example of the cell arrangement in an end face of a honeycomb fired body forming the honeycomb filter according to a fifth embodiment of the present invention.

A honeycomb fired body 50 in a honeycomb filter according to the fifth embodiment of the present invention includes exhaust gas emission cells 51, first exhaust gas introduction cells 52, cell walls 53, and second exhaust gas introduction cells 54.

The exhaust gas emission cells 51 are each adjacently surrounded fully by the first exhaust gas introduction cells 52 and the second exhaust gas introduction cells 54 across porous cell walls 53 residing therebetween. The cells adjacent to the outer wall include the exhaust gas emission cells 51 and the first exhaust gas introduction cells 52.

In the honeycomb fired body forming the honeycomb filter shown in FIG. 18, in the cross section perpendicular to the longitudinal direction of the cells, the cross sectional area of each second exhaust gas introduction cell 54 is equal in size to the cross sectional area of each exhaust gas emission cell 51, and the cross sectional area of each first exhaust gas introduction cells 52 is smaller than the cross sectional area of each second exhaust gas introduction cell 54. The cross sectional area of each first exhaust gas introduction cell 52 is preferably 20 to 50% the size of the cross sectional area of each second exhaust gas introduction cell 54.

All the exhaust gas emission cells 51, the first exhaust gas introduction cells 52, and the second exhaust gas introduction cells 54 have round cross sectional shapes.

The following describes the thickness of the cell walls in the cross section of the honeycomb fired body 50 included in the honeycomb filter according to the fifth embodiment shown in FIG. 1 based on the aforementioned definition of the cell walls. Supposing that a straight line $Z_{52}$ connecting the center of gravity $O_{51}$ of the exhaust gas emission call 51 and the center of gravity $O_{52}$ of the first exhaust gas introduction cell 52 is given, the thickness of the cell wall 53 at a part overlapped with the straight line is determined as thickness $X_2$. Supposing that a straight line $Z_{34}$ connecting the center of gravity $O_{54}$ of the second exhaust gas introduction cell 54 and the center of gravity $O_{51}$ of the exhaust gas emission cell 51 is given, the thickness of the cell wall 53, which separates the second exhaust gas introduction cell 54 and the exhaust gas emission cell 51, at a part overlapped with the straight line $Z_{54}$ is determined as thickness $Y_2$.

In the honeycomb fired body 50 according to the present embodiment, the thickness $X_2$ of the cell wall 53 separating the first exhaust gas introduction cell 52 and the exhaust gas emission cell 51 is smaller than the thickness $Y_2$ of the cell wall 53 separating second exhaust gas introduction cell 54 and the exhaust gas emission cell 51.

This embodiment provides a shape that can have a larger difference between the thickness of the cell walls separating the first exhaust gas introduction cells and the exhaust gas emission cells and the thickness of the cell walls separating the second exhaust gas introduction cells and the exhaust gas emission cells. For this reason, the exhaust gas more easily flows into the first exhaust gas introduction cells at an initial stage as compared to the first embodiment. Thus, PMs accumulate earlier on the inner cell walls of the first exhaust gas introduction calls corresponding to the cell walls separating the first exhaust gas introduction cells and the exhaust gas emission cells. Consequently, the aforementioned switching of the main channel occurs further earlier. Therefore, PMs tend to uniformly accumulate on the inner cell walls of the first exhaust gas introduction cells and the inner cell walls of the second exhaust gas introduction cells so that the pressure loss can be further reduced after accumulation of a certain amount of PMs.

The thickness $X_2$ of the cell wall 53 separating the first exhaust gas introduction cell 52 and the exhaust gas emission cell 51 is preferably 40 to 75% the thickness $Y_2$ of the cell wall 53 separating the second exhaust gas introduction cell 54 and the exhaust gas emission cell 51.

In the honeycomb fired body 50 included in the honeycomb filter according to the present embodiment, the thickness of the cell wall 53 separating the first exhaust gas introduction cell 52 and the second exhaust gas introduction cell 54 may be determined in the same manner as the thickness of the cell wall 53 separating the first exhaust gas introduction cell 52 and the exhaust gas emission cell 51.

In the honeycomb fired body 50 included in the honeycomb filter shown in FIG. 18, the thickness of the cell wall 53 separating the first exhaust gas introduction cell 52 and the second exhaust gas introduction cell 54 is smaller than the thickness of the cell wall 53 separating the first exhaust gas introduction cell 52 and the exhaust gas emission cell 51.

In the honeycomb fired body according to the fifth embodiment of the present invention, as shown in FIG. 18, the shape of each first exhaust gas introduction cell adjacent to the outer well may be the same as that of each first exhaust gas introduction cell not adjacent to the outer wall, and the shape of each exhaust gas emission cell adjacent to the outer wall may be the same as that of each exhaust gas emission cell not adjacent to the outer wall. Alternatively, the exhaust gas emission cell may have a side partially deformed in accordance with the line connecting the outermost points on the inner walls of the first exhaust gas introduction cells adjacent to the outer walls so that the thickness of the outer wall except for the corner portions is substantially uniform.

In the honeycomb filter according to the fifth embodiment of the present invention, the thickness of the outer wall may be uniform in accordance with the shapes of the first exhaust gas introduction cells and the exhaust gas emission cells adjacent to the outer wall, and the shapes of the first exhaust gas introduction cells and the exhaust gas emission cells adjacent to the outer wall may be the same as the exhaust gas emission cells not adjacent to the outer wall, respectively. In other words, the outer wall is bending in accordance with the shapes of the first exhaust gas introduction cells and the exhaust gas emission cells to maintain the uniform thickness in this case.

The features of the embodiment other than those mentioned above are the same as the features described in relation to the first embodiment, and thus the explanation thereof is omitted.

The honeycomb filter according to the present embodiment can be manufactured in the same manner as in the first embodiment of the present invention, except that a die having a different shape is used in the extrusion molding process.

Hereinafter, the effects of the honeycomb filter according to the fifth embodiment of the present invention are listed.

The honeycomb filter described in the first embodiment of the present invention has a feature that the side 12a facing the exhaust gas emission cell 11 among the sides forming the cross sectional shape of the first exhaust gas introduction cell 12 is longer than the side 14a facing the exhaust gas emission cell 11 among the sides forming the cross sectional shape of the second exhaust gas introduction cell 14. Meanwhile, the honeycomb filter according to the fourth embodiment has a feature that all the exhaust gas emission cells, the first exhaust gas introduction cells, and the second exhaust gas introduction cells have round cross sectional shapes, and the thickness of the cell walls separating the first exhaust gas introduction cells and the exhaust gas emission cells is smaller than the thickness of the cell walls separating the second exhaust gas introduction cells and the exhaust gas emission cells. The fifth embodiment is different on the above points from the first embodiment. Other features are substantially the same.

A smaller thickness of the cell walls may lead to easier passage of exhaust gas through the cell walls so that the pressure loss is reduced even in the case where all the exhaust gas emission cells, the first exhaust gas introduction cells, and the second exhaust gas introduction cells have round cross sectional shapes. Thus, the length of sides forming cross sections of the cells may be considered to correspond to the thickness of the cell walls separating the cells. Hence, the honeycomb filter according to the fourth embodiment of the present invention can exert the same effects as the effects (1) to (3), (5) and (7) to (9) described in relation to the first embodiment.

Sixth Embodiment

The following will discuss a honeycomb filter according to the sixth embodiment of the present invention. Features not described below are substantially the same as those in the honeycomb filter according to the first embodiment.

The honeycomb filter according to the sixth embodiment of the present invention includes a plurality of honeycomb fired bodies each having an outer wall on the periphery thereof. Each honeycomb fired body includes exhaust gas emission cells each having an open end at an exhaust gas emission side and a plugged end at an exhaust gas introduction side, and exhaust gas introduction cells each having an open end at the exhaust gas introduction side and a plugged end at the exhaust gas emission side, the exhaust gas introduction cells including first exhaust gas introduction cells and second exhaust gas introduction cells each having a larger cross sectional area than each first exhaust gas introduction cell in a direction perpendicular to the longitudinal direction of the cells. The honeycomb fired bodies are combined with one another by adhesive layers residing therebetween.

In the honeycomb filter according to the sixth embodiment of the present invention, in the cross section perpendicular to the longitudinal direction of the cells, the cross sectional area of the exhaust gas emission cells is equal in size to the cross sectional area of the second exhaust gas introduction cells. In the cross section perpendicular to the longitudinal direction of the cells, the exhaust gas emission cells and the exhaust gas introduction cells are each in a shape termed by curved lines; and the exhaust gas emission cells and the second exhaust gas introduction cells each have a convex square cross section formed by four outwardly curved lines, whereas the first exhaust gas introduction cells each have a concave square cross section formed by four inwardly curved lines. The cells adjacent to the outer wall include the exhaust gas emission cells and the first exhaust gas introduction cells.

In terms of the pore structure of the cell walls in the honeycomb filter according to the sixth embodiment of the present invention, the porosity is 55 to 70%, the proportion of pores having a pore diameter of 40 µm or more is 10% or more, and the proportion of pores having a pore diameter of 10 µm or less is 10% or less.

The honeycomb filter according to the sixth embodiment of the present invention has substantially the same features as the features of the honeycomb filter according to the first embodiment of the present invention, except that the cross sectional shapes of the exhaust gas emission cells, the second exhaust gas introduction cells, and the first exhaust gas introduction cells are different in the direction perpendicular to the longitudinal direction of the cells.

FIG. 19 is an end face view schematically illustrating one example of the cell arrangement in an end face of a honeycomb fired body forming the honeycomb filter according to the sixth embodiment of the present invention.

A honeycomb fired body 60 included in a honeycomb filter according to the sixth embodiment of the present invention includes exhaust gas emission cells 61, first exhaust gas introduction cells 62, cell walls 63, and second exhaust gas introduction cells 64. The exhaust gas emission cells 61 are each adjacently surrounded fully by the first exhaust gas introduction cells 62 and the second exhaust gas introduction cells 64 across porous cell walls 63 residing therebetween.

In the honeycomb fired body forming the honeycomb filter shown in FIG. 19, in the cross section perpendicular to the longitudinal direction of the cells, the cross sectional area of each second exhaust gas introduction cell 64 is equal in size to the cross sectional area of each exhaust gas emission cell 61, and the cross sectional area of each first exhaust gas introduction cell 62 is smaller than the cross sectional area of each second exhaust gas introduction cell

64. The cross sectional area of each first exhaust gas introduction cell 62 is preferably 20 to 50% the size of the cross sectional area of each second exhaust gas introduction cell 64.

The exhaust gas emission cells 61 and the second exhaust gas introduction cells 64 each have a convex square cross section formed by four outwardly curved lines.

Figure 20A:
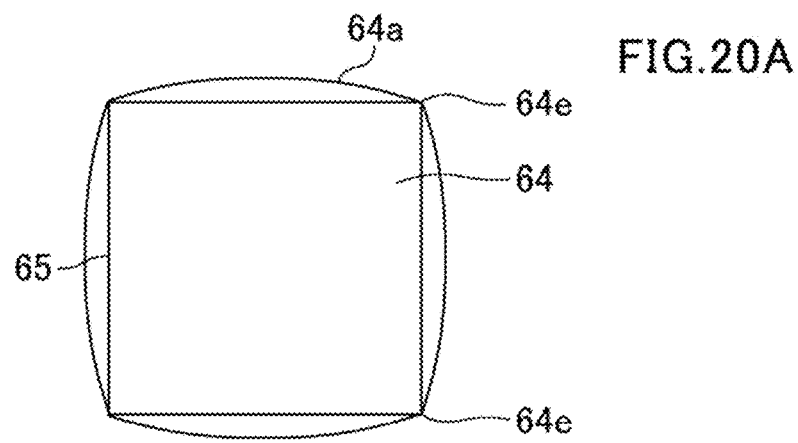
FIG. 20A is an explanatory diagram schematically illustrating one example of a convex square cell shape.
Figure 20B:
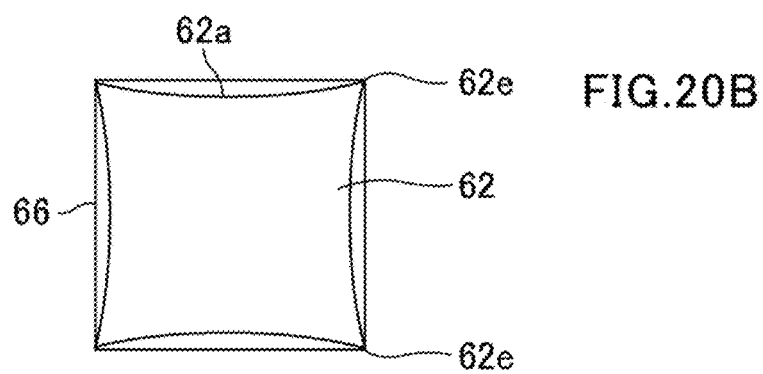
FIG. 20B is an explanatory diagram schematically illustrating one example of a concave square cell shape.
Figure 20C:
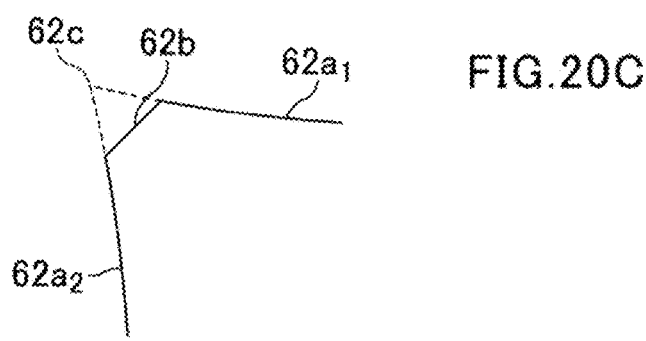
FIG. 20C is an explanatory diagram schematically illustrating one example of the concave square shape in Which a vertex portion is chamfered.
Figure 20D:
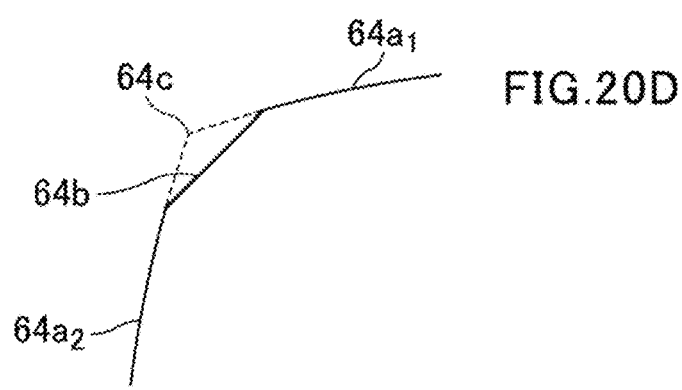
FIG. 20D is an explanatory diagram schematically illustrating one example of the convex square shape in which a vertex portion is chamfered.

FIG. 20A is an explanatory diagram schematically illustrating one example of the convex square cell shape. FIG. 20B is an explanatory diagram schematically illustrating one example of the concave square cell shape. FIG. 20C is an explanatory diagram schematically illustrating one example of the concave square shape in which a vertex portion is chamfered. FIG. 20D is an explanatory diagram schematically illustrating one example of the convex square shape in which a vertex portion is chamfered.

FIG. 20A shows a second exhaust gas introduction cell 64 having a convex square cross section, and a square 65 formed by connecting four vertices 64e of the second exhaust gas introduction cell 64.

In the explanation of the embodiments of the present invention, the convex square refers to a figure that is substantially square having four curved sides. The sides are curved outwardly from the square formed by connecting the four vertices of the substantially square figure.

FIG. 20A shows that the sides 64a forming the cross section of the second exhaust gas introduction cell 64 are curved (convex) outwardly from the geometric center of gravity of the convex square toward outside the square 65.

Although FIG. 20A illustrates the cross section of the second exhaust gas introduction cell 64 as an example of the convex square cell shape, the cross section of the exhaust gas emission cell 61 is substantially the same as the cross section of the second exhaust gas introduction cell 64.

The first exhaust gas introduction cells 62 each have a concave square cross section formed by four inwardly curved lines.

FIG. 20B shows a first exhaust gas introduction cell 62 having a concave square cross section, and a square 66 formed by connecting four vertices 62e of the first exhaust gas introduction cell 62.

In the explanation of the embodiments of the present invention, the concave square refers to a figure that is substantially square having four curved sides. The sides are curved (concaved) inwardly from the square formed by connecting the four vertices of the substantially square figure toward the geometric center of gravity of the concave square.

FIG. 20B shows that the sides 62a forming the cross section of the first exhaust gas introduction cell 62 are curved (concaved) from the square 60 towards the geometric center of gravity of the concave square.

According to the present embodiment, the first exhaust gas introduction cells each have an acute angle portion that causes resistance by inhibiting gas flow, whereas the second exhaust gas introduction cells each have obtuse angles that allow easy gas flow. Thus, in comparison to the first embodiment, after only a small amount of PMs are accumulated on the inner cell walls separating the second exhaust gas introduction cells and the exhaust gas emission cells, exhaust gas easily flows into the first exhaust gas introduction cells. Therefore, PMs tend to uniformly accumulate on the inner walls of the first exhaust gas introduction cells and the inner walls of the second exhaust gas introduction cells so that the pressure less after accumulation of a certain amount of PMs can be further reduced.

In the explanation of the embodiments of the present invention, the convex square and the concave square include shapes that are chamfered at the vertex portions thereof.

FIG. 20C shows a shape in which a side 62a1 and a side 62a2, which are curved lines forming the concave square, are not directly connected, and the side 62a1 is connected to the side 62a2 via a chamfered portion 62b that is chamfered with a straight line.

In the case where the curved sides forming the concave square are connected via the chamfered portion, an intersection 62c of hypothetical curved lines extended respectively from the side 62a1 and the side 62a2 as shown by a dotted line in FIG. 16C is defined as a vertex.

FIG. 20D shows a shape in which a side 64a1 and a side 64a2, which are curved lines forming the convex square, are not directly connected each other, and the side 62a1 is connected to the side 62a2 via a chamfered portion 64b that is chamfered by a straight line.

In the case where the curved sides forming the convex square are connected each other via the chamfered portion, an intersection 64c of hypothetical curved lines extended respectively from the side 64a1 and the side 64a2 as shown by a dotted line in FIG. 20D is defined as a vertex.

Whether the cross section formed by curved lines is a convex square or a concave square can be determined by hypothetically depicting a square by connecting the vertices (intersections 62c or intersections 64c).

The chamfered portion is not limited to the one chamfered with a straight line, but may be one chamfered with a curved line.

In the honeycomb filter of the present embodiment, the thickness of the cell walls 63 between the first exhaust gas introduction cells 62 and the exhaust gas emission cells 61 is smaller than the thickness of the cell walls 63 between the second exhaust gas introduction cells 64 and the exhaust gas emission cells 61.

The following describes the thickness of the cell walls in the cross section of the honeycomb fired body 60 included in the honeycomb filter according to the sixth embodiment shown in FIG. 19 based on the aforementioned definition of the cell walls. Supposing that a straight line $Z_{62}$ connecting the center of gravity $O_{61}$ of the exhaust gas emission cell 61 and the center of gravity $O_{62}$ of the first exhaust gas introduction cell 62 is given, the thickness of the cell wall 63 at a part overlapped with the straight line (thickness between the side 62a and the side 61a) is determined as thickness $X_3$. Supposing that a straight line $Z_{64}$ connecting the center of gravity $O_{64}$ of the second exhaust gas introduction cell 64 and the center of gravity $O_{61}$ of the exhaust gas emission cell 61 is given, a thickness of the cell wall 63, which separates the second exhaust gas introduction cell 64 and the exhaust gas emission cell 61, at a part overlapped with the straight line $Z_{64}$ (distance between a vertex 64e of the second exhaust gas introduction cell 64 and a vertex 61e of the exhaust gas emission cell 61) is determined as thickness $Y_3$.

In the honeycomb fired body 60 included in the honeycomb filter according to the present embodiment, the thickness $X_3$ of the cell wall 63 separating the first exhaust gas introduction cell 62 and the exhaust gas emission cell 61 is smaller than the thickness $Y_3$ of the cell wall 63 separating the second exhaust gas introduction cell 64 and the exhaust gas emission cell 61.

In the honeycomb fired body 60 included in the honeycomb filter according to the present embodiment, the thickness of the cell wall separating the first exhaust gas introduction cell 62 and the second exhaust gas introduction cell 64 may be determined in the same manner as the thickness of the cell nail separating the first exhaust gas introduction cell 62 and the exhaust gas emission cell 61.

In the honeycomb fired body 60 included in the honeycomb filter shown in FIG. 19, the thickness of the cell wall 63 separating the first exhaust gas introduction cell 62 and the second exhaust gas introduction cell 64 is uniform, and is equal to the thickness of the cell wall 63 separating the first exhaust gas introduction cell 62 and the exhaust gas emission cell 61.

In the honeycomb filter according to the sixth embodiment of the present invention, the thickness of the outer wall may be uniform, the shape of the first exhaust gas introduction cells adjacent to the outer wall may have the same shape as the first exhaust gas introduction cells not adjacent to the outer wall, and the exhaust gas emission cell adjacent to the outer wall may have the same shape as the exhaust gas emission cell not adjacent to the outer wall. With an aim of making the thickness of the outer wall substantially uniform, except for the corner portions, a side adjacent to the outer wall of the exhaust gas emission cell may be partially deformed along with the line connecting the outermost points on the inner walls of the first exhaust gas introduction cells adjacent to the outer wall.

In the honeycomb filter according to the sixth embodiment of the present invention, the thickness of the outer wall may be uniform along with the shape of the exhaust gas introduction cells adjacent to the outer wall, and the shapes of the first exhaust gas introduction cells and the exhaust gas emission cells adjacent to the outer wall may be the same as those of the first exhaust gas introduction cells and the exhaust gas emission cells not adjacent to the outer wall, respectively. In other words, the outer wall is bending in accordance with the shapes of the first exhaust gas introduction cells and the exhaust gas emission cells to maintain the uniform thickness in this case.

The honeycomb filter according to the present embodiment can be manufactured in the same manner as in the first embodiment of the present invention, except that a die having a different shape is used in the extrusion molding process.

Hereinafter, the effects of the honeycomb filter according to the sixth embodiment of the present invention are listed.

The honeycomb filter described in the first embodiment of the present invention has a feature that the side 12a facing the exhaust gas emission cell 11 among the sides forming the cross sectional shape of the first exhaust gas introduction cell 12 is larger than the side 14a facing the exhaust gas emission cell 11 among the sides forming the cross sectional shape of the second exhaust gas introduction cell 14. Meanwhile, the honeycomb filter according to the sixth embodiment has a feature that the thickness of the cell walls separating the first exhaust gas introduction cells and the exhaust gas emission cells is smaller than the thickness of the cell walls separating the second exhaust gas introduction cells and the exhaust gas emission cells. The sixth embodiment is different on the above points from the first embodiment. Other features are substantially the same.

A smaller thickness of the cell walls may lead to easier passage of exhaust gas through the cell walls so that the pressure loss may be reduced. Thus, the length of the sides forming the cross sections of the cells may correspond to the thickness of the cell walls separating the cells. Hence, the honeycomb filter according to the sixth embodiment of the present invention can exert the same effects as the effects (1) to (3), (5), and (7) to (11) described in relation to the first embodiment.

Obviously, numerous modifications and variations of the present invention are possible in light of the above teachings. It is therefore to be understood that within the scope of the appended claims, the invention may be practiced otherwise than as specifically described herein.

The invention claimed is:

1. A honeycomb filter comprising:
a plurality of cells through which exhaust gas is to flow and which include exhaust gas introduction cells and exhaust gas emission cells, the exhaust gas introduction cells each having an open end at an exhaust gas introduction side and a plugged end at an exhaust gas emission side, the exhaust gas emission cells each having an open end at the exhaust gas emission side and a plugged end at the exhaust gas introduction side;
porous cell walls defining rims of the plurality of cells, the porous cell walls each having a porosity of 55% or more but not more than 70%, the porous cell walls including pores with a pore diameter of 40 μm or more which have a pore volume occupying 10% or more of a total pore volume of the porous cell walls, the porous cell walls being free from pores with a pore diameter of 10 μm or less or including pores with the pore diameter of 10 μm or less which have a pore volume occupying 10% or less of the total pore volume;
the exhaust gas introduction cells and the exhaust gas emission cells each having a uniform cross sectional shape except for a plugged portion in a cross section perpendicular to a longitudinal direction of the plurality of cells thoroughly from the exhaust gas introduction side to the exhaust gas emission side;
the exhaust gas emission cells having an average cross sectional area larger than an average cross sectional area of the exhaust gas introduction cells in the cross section perpendicular to the longitudinal direction of the plurality of cells; and
a total volume of the exhaust gas introduction cells being larger than a total volume of the exhaust gas emission cells,
wherein each of the exhaust gas emission cells is adjacently surrounded fully by the exhaust gas introduction cells across the porous cell walls,
wherein the exhaust gas introduction cells include first exhaust as introduction cells and second exhaust as introduction cells the second exhaust as introduction cells each having a cross sectional area larger than a cross sectional area of each of the first exhaust gas introduction cells in the cross section perpendicular to the longitudinal direction of the plurality of cells,
wherein each of the exhaust gas emission cells has a cross sectional area equal to or larger than the cross sectional area of each of the second exhaust gas introduction cells in the cross section perpendicular to the longitudinal direction of the plurality of cells, and
wherein, in the cross section perpendicular to the longitudinal direction of the plurality of cells, the exhaust gas introduction cells and the exhaust gas emission cells each have a polygonal shape, and
wherein, in the cross section perpendicular to the longitudinal direction of the plurality of cells,
a side forming a cross sectional shape of each of the first exhaust gas introduction cells faces one of the exhaust gas emission cells, a side forming a cross sectional shape of each of the second exhaust gas introduction cells faces one of the exhaust gas emission cells, and the side of each of the first exhaust gas introduction cells is longer than the side of each of the second exhaust gas introduction cells, or a side forming a cross sectional shape of each of the first exhaust gas introduction cells faces one of the exhaust gas emission cells, and none of sides forming a cross sectional shape of each of the second exhaust gas introduction cells faces the exhaust gas emission cells.

2. The honeycomb filter according to claim 1, wherein, in the cross section perpendicular to the longitudinal direction of the plurality of cells, the exhaust gas introduction cells and the exhaust gas emission cells each have the polygonal shape, and wherein, in the cross section perpendicular to the longitudinal direction of the plurality of cells, length of the side forming the cross sectional shape of each of the second exhaust gas introduction cells is not more than 0.8 times length of the side forming the cross sectional shape of each of the first exhaust gas introduction cells.

3. The honeycomb filter according to claim 1, wherein, in the cross section perpendicular to the longitudinal direction of the plurality of cells, the exhaust gas emission cells are each octagonal, the first exhaust gas introduction cells are each square, and the second exhaust gas introduction cells are each octagonal.

4. The honeycomb filter according to claim 1, wherein, in the cross section perpendicular to the longitudinal direction of the plurality of cells, the cross sectional area of each of the second exhaust gas introduction cells is equal in size to the cross sectional area of each of the exhaust gas emission cells, and wherein the cross sectional area of each of the first exhaust gas introduction cells is 20 to 50% size of the cross sectional area of each of the second exhaust gas introduction cells.

5. The honeycomb filter according to claim 3, wherein the porous cell walls separating the plurality of cells have a uniform thickness in any part of the honeycomb filter.

6. The honeycomb filter according to claim 3, wherein, in the cross section perpendicular to the longitudinal direction of the plurality of cells, the exhaust gas emission cells have octagonal cross sections, the first exhaust gas introduction cells have square cross sections, and the second exhaust gas introduction cells have octagonal cross sections, wherein, in the cross section perpendicular to the longitudinal direction of the plurality of cells, the cross sectional shape of each of the second exhaust gas introduction cells is congruent with a cross sectional shape of each of the exhaust gas emission cells, wherein, in the cross section perpendicular to the longitudinal direction of the plurality of cells, the exhaust gas emission cells, the first exhaust gas introduction cells, and the second exhaust gas introduction cells are arranged in a manner that the exhaust gas emission cells are each surrounded by alternately arranged four pieces of the first exhaust gas introduction cells and four pieces of the second exhaust gas introduction cells across the porous cell walls, provided that hypothetical segments connecting geometric centers of gravity of the octagonal cross sections of the four pieces of the second exhaust gas introduction cells surrounding a reference exhaust gas emission cell of the exhaust gas emission cells are given, an intersection of two segments crossing the reference exhaust gas emission cell is identical with a geometric center of gravity of an octagonal cross section of the reference exhaust gas emission cell, and four segments not crossing the reference exhaust gas emission cell form a square, and midpoints of respective sides of the square are identical with geometric centers of gravity of the square cross sections of the four pieces of the first exhaust gas introduction cells surrounding the reference exhaust gas emission cell, wherein, in the cross section perpendicular to the longitudinal direction of the plurality of cells, a side facing one of the first exhaust gas introduction cells across a first cell wall among sides forming the cross sectional shape of one of the exhaust gas emission cells is parallel to a side facing one of the exhaust gas emission cells across the first cell wall among sides forming the cross sectional shape of one of the first exhaust gas introduction cells, wherein, in the cross section perpendicular to the longitudinal direction of the plurality of cells, a side facing one of the second exhaust gas introduction cells across a second cell wall among sides forming the cross sectional shape of one of the exhaust gas emission cells is parallel to a side facing one of the exhaust gas emission cells across the second cell wall among sides forming the cross sectional shape of one of the second exhaust gas introduction cells, wherein, in the cross section perpendicular to the longitudinal direction of the plurality of cells, a side facing one of the second exhaust gas introduction cells across a third cell wall among sides forming the cross sectional shape of one of the first exhaust gas introduction cells is parallel to a side facing one of the first exhaust gas introduction cells across the third cell wall among sides forming the cross sectional shape of one of the second exhaust gas introduction cells, and wherein, in the cross section perpendicular to the longitudinal direction of the plurality of cells, distances between parallel sides are the same.

7. The honeycomb filter according to claim 1, wherein, in the cross section perpendicular to the longitudinal direction of the plurality of cells, the exhaust gas emission cells, the first exhaust gas introduction cells, and the second exhaust gas introduction cells are all square.

8. The honeycomb filter according to claim 7, wherein, in the cross section perpendicular to the longitudinal direction of the plurality of cells, the cross sectional area of each of the second exhaust gas introduction cells is equal in size to the cross sectional area of each of the exhaust gas emission cells, and wherein, in the cross section perpendicular to the longitudinal direction of the plurality of cells, the cross sectional area of each of the first exhaust gas introduction cells is 20 to 50% size of the cross sectional area of each of the second exhaust gas introduction cells.

9. The honeycomb filter according to claim 7, wherein, in the cross section perpendicular to the longitudinal direction of the plurality of cells, the exhaust gas emission cells have square cross sections, the first exhaust gas introduction cells have square cross sections, and the second exhaust gas introduction cells have square cross sections, wherein, in the cross section perpendicular to the longitudinal direction of the plurality of cells, the cross sectional shape of each of the second exhaust gas introduction cells is congruent with a cross sectional shape of each of the exhaust gas emission cells, wherein, in the cross section perpendicular to the longitudinal direction of the plurality of cells, the exhaust gas emission cells, the first exhaust gas introduction cells, and the second exhaust gas introduction ells are arranged in a manner that the exhaust gas emission cells are each surrounded by alternately arranged four pieces of the first exhaust gas introduction cells and four pieces of the second exhaust gas introduction cells across the porous cell walls, provided that hypothetical segments connecting geometric centers of gravity of the square cross sections of the four pieces of the second exhaust gas introduction cells surrounding a reference exhaust gas emission cell of the exhaust gas emission cells are given, an intersection of two segments crossing the reference exhaust gas emission cell is identical with a geometric center of gravity of a square cross section of the reference exhaust gas emission cell, and four segments not crossing the reference exhaust gas emission cell form a square, and midpoints of respective sides of the square are identical with geometric centers of gravity of the square cross sections of the four pieces of the first exhaust gas introduction cells surrounding the reference exhaust gas emission cell, wherein, in the cross section perpendicular to the longitudinal direction of the plurality of cells, a side facing one of the first exhaust gas introduction cells across a first cell wall among sides forming the cross sectional shape of one of the exhaust gas emission cells is parallel to a side facing one of the exhaust gas emission cells across the first cell wall among sides forming the cross sectional shape of one of the first exhaust gas introduction cells, wherein, in the cross section perpendicular to the longitudinal direction of the plurality of cells, a side facing one of the second exhaust gas introduction cells across a third cell wall among sides forming the cross sectional shape of one of the first exhaust gas introduction cells is parallel to a side facing one of the first exhaust gas introduction cells across the third cell wall among sides forming the cross sectional shape of one of the second exhaust gas introduction cells, and wherein, in the cross section perpendicular to the longitudinal direction of the plurality of cells, distances between parallel sides are the same.

10. The honeycomb filter according to claim 1,
wherein, in the cross section perpendicular to the longitudinal direction of the plurality of cells, vertex portions of the polygonal shape are formed by curved lines.

11. The honeycomb filter according to claim 1,
wherein, in the cross section perpendicular to the longitudinal direction of the plurality of cells, the exhaust gas emission cells, the first exhaust gas introduction cells, and the second exhaust gas introduction cells are point-symmetrical polygons each having not more than eight sides.

12. The honeycomb filter according to claim 1,
wherein the exhaust gas introduction cells consist only of the first exhaust gas introduction cells, and
the second exhaust gas introduction cells having the cross sectional area larger than the cross sectional area of each of the first exhaust gas introduction cells in the cross section perpendicular to the longitudinal direction of the plurality of cells.

13. The honeycomb filter according to claim 1,
wherein the honeycomb filter comprises a plurality of honeycomb fired bodies,
wherein each of the plurality of honeycomb fired bodies has the exhaust gas emission cells, the first exhaust gas introduction cells, and the second exhaust gas introduction cells,
wherein each of the plurality of honeycomb fired bodies has an outer wall on an outer periphery of each of the plurality of honeycomb fired bodies, and
wherein the plurality of honeycomb fired bodies are combined with one another by adhesive layers residing between the plurality of honeycomb fired bodies.

14. The honeycomb filter according to claim 13,
wherein the outer wall has corner portions, and
wherein a side, which contacts the outer all, of each of the exhaust gas introduction cells and the exhaust gas emission cells adjacent to the outer wall is straight and parallel to a side corresponding to an outer periphery of the outer wall in a manner that a thickness of the outer wall is uniform except for the corner portions in the cross section perpendicular to the longitudinal direction of the plurality of cells.

15. The honeycomb filter according to claim 1,
wherein the honeycomb filter comprises honeycomb fired bodies, and
wherein the honeycomb fired bodies include one of silicon carbide and silicon-containing silicon carbide.

16. The honeycomb filter according to claim 1,
wherein the porous cell walls have a thickness of 0.10 to 0.46 mm.

17. The honeycomb filter according to claim 1,
wherein the porous cell walls have pores having an average pore diameter of 15 to 25 μm.

18. The honeycomb filter according to claim 1, further comprising:
a periphery coat layer provided on a periphery of the honeycomb filter.

19. The honeycomb filter according to claim 1,
wherein, in the cross section perpendicular to the longitudinal direction of the plurality of cells, the first exhaust gas introduction cells, the second exhaust gas introduction cells, and the exhaust gas emission cells each have a uniform cross sectional shape except for the plugged portion thoroughly from the exhaust gas introduction side to the exhaust gas emission side,
wherein, in the cross section perpendicular to the longitudinal direction of the plurality of cells, the cross sectional shape of each of the first exhaust gas introduction cells is different from the cross sectional shape of each of the second exhaust gas introduction cells, and
wherein, in the cross section perpendicular to the longitudinal direction of the plurality of cells, the cross sectional shape of each of the exhaust gas emission cells is different from the cross sectional shape of each of the first exhaust gas introduction cells.

20. The honeycomb filter according to claim 1,
wherein, in the cross section perpendicular to the longitudinal direction of the plurality of cells, a cell unit is two-dimensionally repeated in a manner that the first exhaust gas introduction cells and the second exhaust gas introduction cells surrounding each of the exhaust gas emission cells in the cell unit are shared between adjacent cell units, wherein the cell unit has a cell structure such that each of the exhaust gas emission cells is adjacently surrounded fully by the exhaust gas introduction cells across the porous cell walls, the exhaust gas introduction cells include the first exhaust gas introduction cells and the second exhaust gas introduction cells, each of the second exhaust gas introduction cells has the cross sectional area larger than the cross sectional area of each of the first exhaust gas introduction cells in the cross section perpendicular to the longitudinal direction of the plurality of cells, and each of the exhaust gas emission cells has the cross sectional area equal to or larger than the cross sectional area of each of the second exhaust gas introduction cells in the cross section perpendicular to the longitudinal direction of the plurality of cells, and wherein, in the cross section perpendicular to the longitudinal direction of the plurality of cells, the exhaust gas introduction cells and the exhaust gas emission cells have one of a first structure such that the exhaust gas introduction cells and the exhaust gas emission cells each have the polygonal shape, a side forming the cross sectional shape of each of the first exhaust gas introduction cells faces one of the exhaust gas emission cells, a side forming the cross sectional shape of each of the second exhaust gas introduction cells faces one of the exhaust gas emission cells, and the side of each of the first exhaust gas introduction cells is longer than the side of each of the second exhaust gas introduction cells, or the exhaust gas introduction cells and the exhaust gas emission cells each have the polygonal shape, a side forming the cross sectional shape of each of the first exhaust gas introduction cells faces one of the exhaust gas emission cells, and none of sides forming the cross sectional shape of each of the second exhaust gas introduction cells faces the exhaust gas emission cells, and a second structure such that the exhaust gas introduction cells and the exhaust gas emission cells are each in a shape formed by a curved line, the porous cell walls include first porous cell walls separating the first exhaust gas introduction cells and the exhaust gas emission cells, and second porous cell walls separating the second exhaust gas introduction cells and the exhaust gas emission cells, and a thickness of each of the first porous cell walls is smaller than a thickness of each of the second porous cell walls.

* * * * *